US012553776B2

(12) United States Patent
Ang et al.

(10) Patent No.: US 12,553,776 B2
(45) Date of Patent: Feb. 17, 2026

(54) DEVICE HAVING A METAMATERIAL-BASED FOCUSING ANNULUS LENS ABOVE A MEMS COMPONENT AND METHOD OF MANUFACTURING THEREOF

(71) Applicant: Meridian Innovation Pte Ltd, Singapore (SG)

(72) Inventors: Wan Chia Ang, Singapore (SG); Ilker Ender Ocak, Singapore (SG); Piotr Kropelnicki, Singapore (SG)

(73) Assignee: Meridian Innovation Pte Ltd, Singapore (SG)

( * ) Notice: Subject to any disclaimer, the term of this patent is extended or adjusted under 35 U.S.C. 154(b) by 1128 days.

(21) Appl. No.: 17/612,200

(22) PCT Filed: May 28, 2020

(86) PCT No.: PCT/SG2020/050311
§ 371 (c)(1),
(2) Date: Nov. 17, 2021

(87) PCT Pub. No.: WO2020/242384
PCT Pub. Date: Dec. 3, 2020

(65) Prior Publication Data
US 2022/0196480 A1  Jun. 23, 2022

Related U.S. Application Data

(63) Continuation-in-part of application No. 17/156,639, filed on Jan. 25, 2021, now Pat. No. 11,990,498, and
(Continued)

(51) Int. Cl.
*G01J 5/0806* (2022.01)
*G01J 5/00* (2022.01)
(Continued)

(52) U.S. Cl.
CPC ............ *G01J 5/0806* (2013.01); *G01J 5/024* (2013.01); *G01J 5/045* (2013.01); *G02B 1/002* (2013.01); *G01J 2005/0077* (2013.01)

(58) Field of Classification Search
CPC ...... G01J 5/0806; G01J 5/0815; G01J 5/0225; G01J 5/023; G01J 5/024; G01J 5/022;
(Continued)

(56) References Cited

U.S. PATENT DOCUMENTS 5,701,008 A * 12/1997 Ray .................. G01J 5/045
250/353
6,335,478 B1   1/2002 Chou et al.
(Continued)

FOREIGN PATENT DOCUMENTS

CN     101140185 A    3/2008
CN     104310300 A    1/2015
(Continued)

OTHER PUBLICATIONS

J. H. Smith et al., Embedded Micromechanical Devices for the Monolithic Integration of MEMS with CMOS, IEEE International Electron Devices Meeting, Dec. 10-13, 1995, pp. 1-5, Sandia National Labs., Albuquerque, New Mexico, U.S.A.
(Continued)

*Primary Examiner* — Younes Boulghassoul
(74) *Attorney, Agent, or Firm* — HORIZON IP PTE LTD.

(57) ABSTRACT

A complementary metal oxide semiconductor (CMOS) device embedded with microelectromechanical system (MEMS) components in a MEMS region. The MEMS components, for example, are infrared (IR) thermosensors. The device is encapsulated with a CMOS compatible IR transparent cap to hermetically seal the device using wafer-level vacuum packaging techniques. The cap includes an
(Continued)

integrated focusing system with a metalens module for focusing IR radiation onto the sensors.

19 Claims, 36 Drawing Sheets

Related U.S. Application Data a continuation-in-part of application No. 17/439,797, filed on Sep. 15, 2021, and a continuation-in-part of application No. 17/440,175, filed on Sep. 16, 2021, now Pat. No. 11,845,653, and a continuation-in-part of application No. 17/440,784, filed on Sep. 19, 2021, now Pat. No. 12,168,603.

(60) Provisional application No. 62/854,319, filed on May 28, 2020.

(51) Int. Cl.
 *G01J 5/02* (2022.01)
 *G01J 5/04* (2006.01)
 *G02B 1/00* (2006.01)

(58) Field of Classification Search
 CPC .. G01J 5/045; G01J 5/046; G01J 5/048; G01J 5/20; G01J 5/12; G01J 2005/123; G01J 2005/202; B81C 1/00246; B81C 1/00317; B81C 1/00222; B81C 2203/0714; B81C 2203/0728; B81C 2203/0735; B81C 2203/0742; B81B 7/02
 See application file for complete search history.

(56) References Cited

U.S. PATENT DOCUMENTS

| | | | |
|---|---|---|---|
| 6,803,250 B1 | 10/2004 | Yaung et al. | |
| 7,755,048 B2 | 7/2010 | Hsu | |
| 9,324,760 B2 | 4/2016 | Vasseur et al. | |
| 9,505,611 B1 | 11/2016 | Liu et al. | |
| 9,577,001 B2 | 2/2017 | Enichlmair et al. | |
| 2004/0140570 A1* | 7/2004 | Higashi | H10F 39/806 |
| | | | 257/777 |
| 2004/0245586 A1 | 12/2004 | Partridge et al. | |
| 2005/0254133 A1* | 11/2005 | Akram | G02B 7/02 |
| | | | 359/626 |
| 2006/0016995 A1* | 1/2006 | Kummer | G01J 5/02 |
| | | | 257/E31.118 |
| 2007/0057343 A1 | 3/2007 | Chinthakindi et al. | |
| 2008/0142912 A1 | 6/2008 | Inaba et al. | |
| 2008/0216883 A1 | 9/2008 | Eneke et al. | |
| 2008/0304054 A1* | 12/2008 | Goosens | H01L 22/12 |
| | | | 257/E23.179 |
| 2009/0243004 A1 | 10/2009 | An et al. | |
| 2010/0031992 A1 | 2/2010 | Hsu | |
| 2010/0181484 A1 | 7/2010 | Nada et al. | |
| 2010/0243892 A1 | 9/2010 | Dupont | |
| 2011/0147869 A1* | 6/2011 | Lazarov | G01J 5/02 |
| | | | 257/E31.127 |
| 2012/0061569 A1 | 3/2012 | Noguchi | |
| 2012/0097415 A1* | 4/2012 | Reinert | H10F 39/011 |
| | | | 174/50 |
| 2013/0234270 A1 | 9/2013 | Yama et al. | |
| 2013/0285165 A1 | 10/2013 | Classen et al. | |
| 2014/0294043 A1* | 10/2014 | Samarao | G01J 5/20 |
| | | | 374/124 |
| 2015/0076651 A1 | 3/2015 | Noguchi | |
| 2015/0123221 A1 | 5/2015 | Reinmuth et al. | |
| 2015/0144795 A1* | 5/2015 | Hofmann | G01J 5/0871 |
| | | | 250/353 |
| 2015/0168221 A1 | 6/2015 | Mao et al. | |
| 2015/0177069 A1 | 6/2015 | Maes et al. | |
| 2015/0210540 A1 | 7/2015 | Sadaka et al. | |
| 2015/0243823 A1 | 8/2015 | Herrmann et al. | |
| 2015/0321905 A1 | 11/2015 | Gooch et al. | |
| 2016/0079306 A1 | 3/2016 | Kropelnicki et al. | |
| 2016/0104741 A1* | 4/2016 | Enichlmair | G01J 5/022 |
| | | | 257/448 |
| 2016/0214855 A1 | 7/2016 | Yeh et al. | |
| 2016/0264402 A1 | 9/2016 | Yu et al. | |
| 2016/0289063 A1 | 10/2016 | Ocak et al. | |
| 2016/0318758 A1 | 11/2016 | Chou et al. | |
| 2016/0332867 A1 | 11/2016 | Tseng et al. | |
| 2016/0379961 A1 | 12/2016 | Lee et al. | |
| 2017/0107097 A1 | 4/2017 | Cheng et al. | |
| 2017/0179119 A1 | 6/2017 | Chang et al. | |
| 2017/0203956 A1 | 7/2017 | Breitling et al. | |
| 2018/0257927 A1 | 9/2018 | Rothberg et al. | |
| 2019/0019838 A1 | 1/2019 | Kropelnicki et al. | |
| 2019/0027522 A1* | 1/2019 | Kropelnicki | B81C 1/00317 |
| 2019/0207053 A1* | 7/2019 | Nemirovsky | G01J 5/0806 |
| 2019/0316967 A1* | 10/2019 | Schieferdecker | G01J 5/0853 |

FOREIGN PATENT DOCUMENTS

| | | |
|---|---|---|
| CN | 104501970 A | 4/2015 |
| CN | 106744656 A | 5/2017 |
| CN | 109052306 A | 12/2018 |
| EP | 2105963 A2 | 9/2009 |
| EP | 2264765 A1 | 12/2010 |
| TW | 201339544 A | 10/2013 |
| WO | 2014100706 A1 | 6/2014 |

OTHER PUBLICATIONS

A Graf et al, Review of micromachined thermopiles for infrared detection, Measurement Science and Technology, Jul. 1, 2007, pp. R59-R75, vol. 18, No. 7, IOP Publishing, Bristol, GB.

* cited by examiner

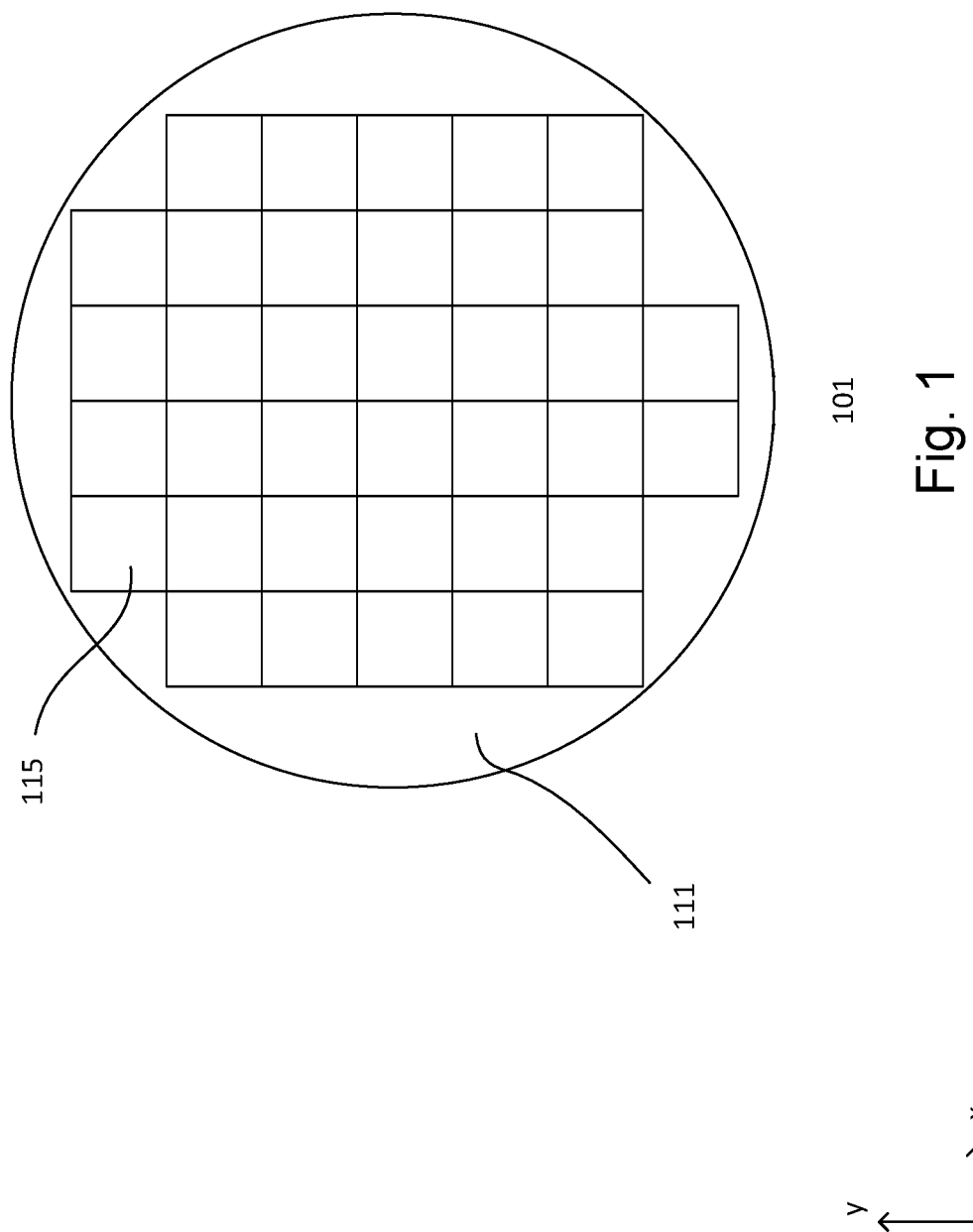

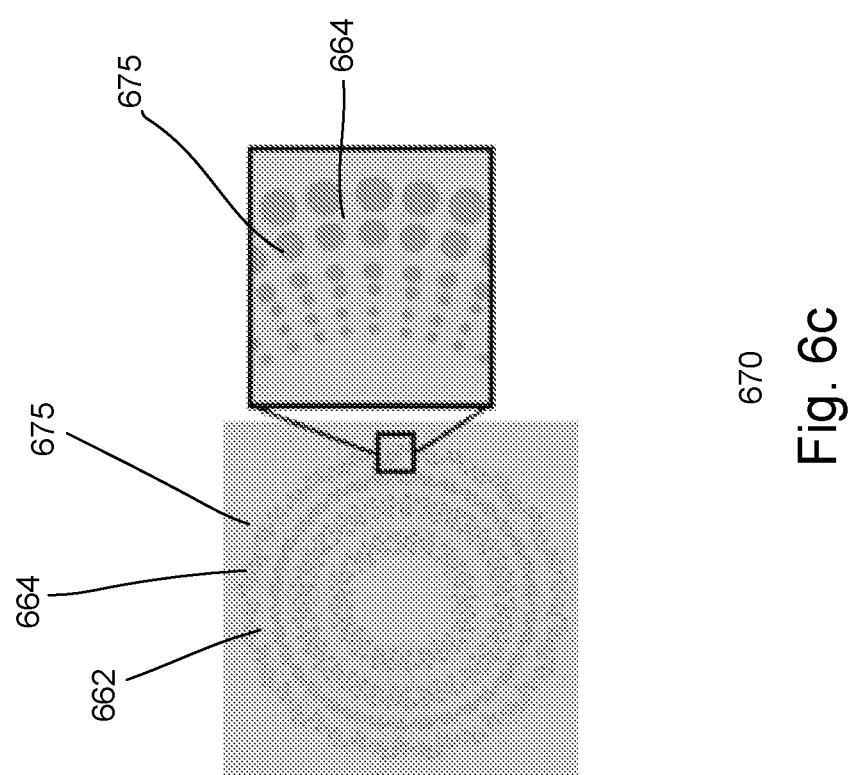

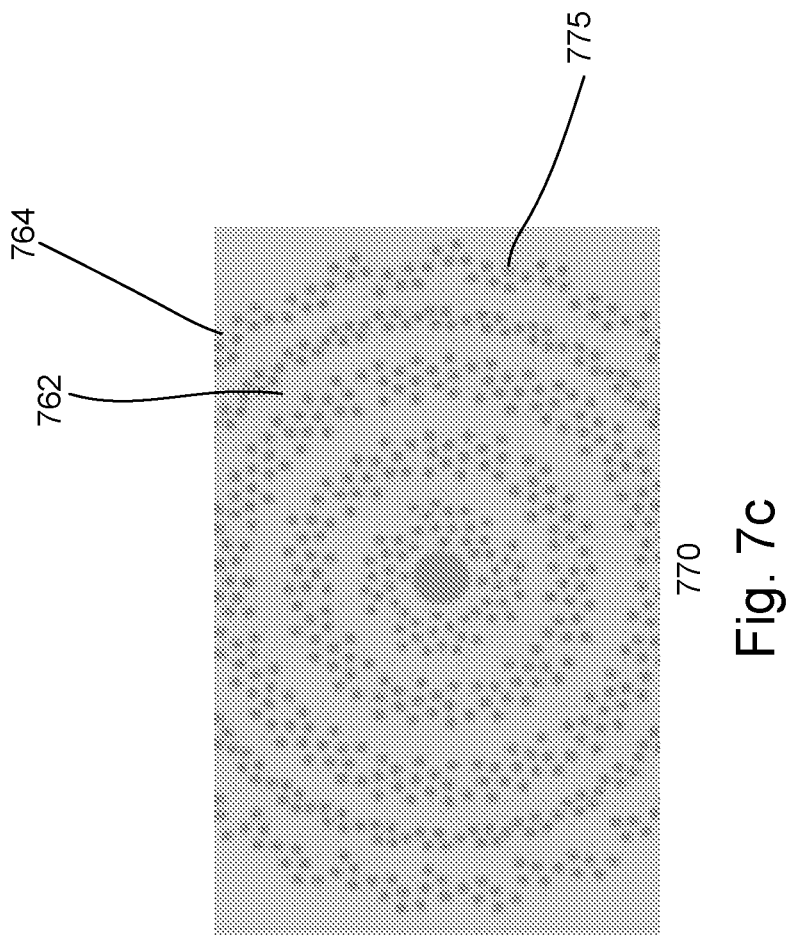

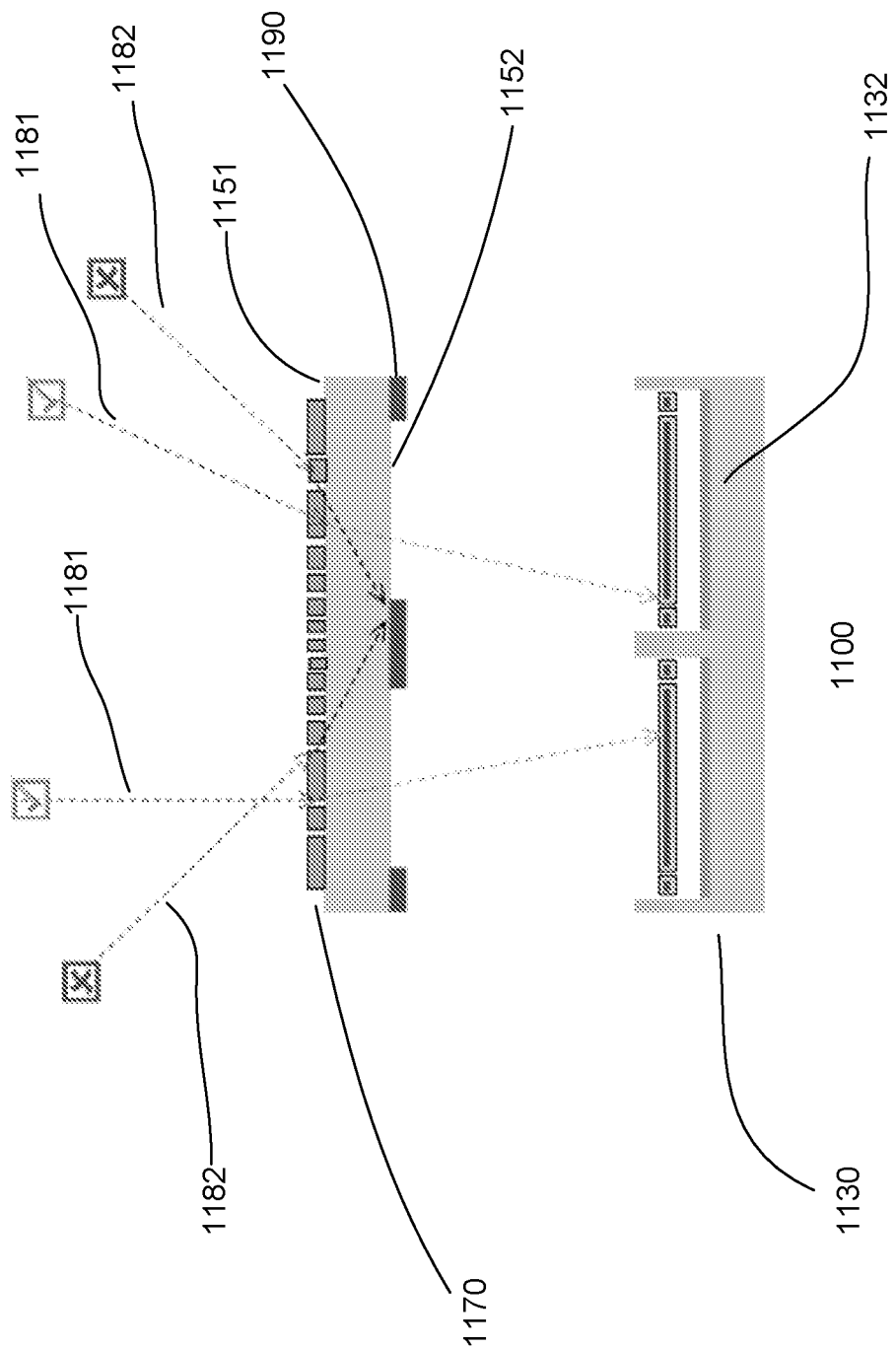

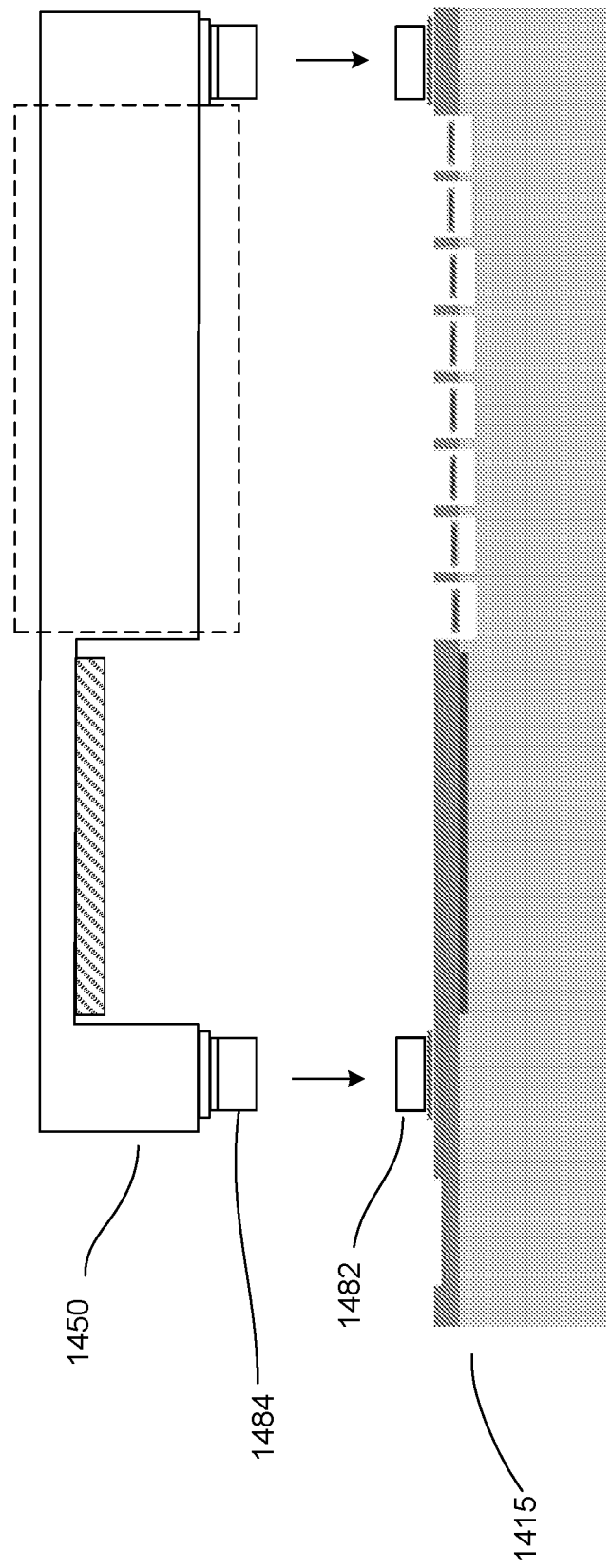

ABOUT A MEMS
COMPONENT AND METHOD OF
MANUFACTURING THEREOF

DEVICE HAVING A METAMATERIAL-BASED FOCUSING ANNULUS LENS ABOVE A MEMS COMPONENT AND METHOD OF MANUFACTURING THEREOF

CROSS-REFERENCE TO RELATED APPLICATIONS

This application claims the benefit of U.S. Provisional Application No. 62/854,319, filed on May 30, 2019. This application cross-references to U.S. patent application Ser. No. 16/809,561, filed on Mar. 5, 2020, which is a continuation-in-part application of co-pending U.S. patent application Ser. No. 16/517,653, filed on Jul. 21, 2019, which is a continuation application of U.S. patent application Ser. No. 15/647,284, titled Scalable Thermoelectric-based Infrared Detector, now U.S. Pat. No. 10,403,674, filed on Jul. 12, 2017. This application also cross-references to U.S. patent application Ser. No. 16/224,782, filed on Dec. 18, 2018, which is a divisional application of U.S. patent application Ser. No. 15/653,558, titled Thermoelectric-based Infrared Detector with high CMOS Integration, now U.S. Pat. No. 10,199,424, filed on Jul. 19, 2017. This application further cross-references to PCT Application no. PCT/SG2020/050201, titled Monolithic Post Complementary Metal-oxide Semiconductor Integration of Thermoelectric-based Infrared detector, filed on Apr. 1, 2020, which claims the benefit of U.S. Provisional Application No. 62/827,205 filed on Apr. 1, 2019. This application further cross-references to PCT Application no. PCT/SG2020/050202, titled Heterogenous Integration of Complementary Metal-oxide Semiconductor and MEMS sensors, filed on Apr. 1, 2020, which claims the benefit of U.S. Provisional Application No. 62/827,207 filed on Apr. 1, 2019. This application further cross-references to PCT Application no. PCT/SG2020/050203, titled Wafer Level Vacuum Packaging (WLVP) of Thermal Imaging Sensor with an Integrated Lens, filed on Apr. 1, 2020, which claims the benefit of U.S. Provisional Application No. 62/827,207 filed on Apr. 2, 2019. The disclosure of all of which are herein incorporated by reference in their entireties for all purposes.

BACKGROUND

The demand for micromachined infrared (IR) detectors, such as microelectromechanical systems (MEMS), is continually growing due to the increased demand from numerous applications. These applications, just to name a few, include air conditioning systems, handphones, autonomous driving cars, internet of things (IoT), fire-fighting, and traffic safety. Furthermore, it is expected that there will be numerous more applications in the near future for uncooled IR detectors.

To increase the focus of the IR detectors, a curve lens may be used. Conventional curve lens material for thermal infrared light includes germanium or chalcogenide. Such types of curve lenses, however, are very expensive. Furthermore, conventional curve lenses for thermal infrared light, due to the long wavelength, are thick and require long focal lengths. This results in a bulky package for MEMS IR detector system. In addition, aberration correction techniques require complex solutions, further increasing overall system size and weight as well as cost.

The present disclosure is directed to cost-effective and compact IR detector systems.

SUMMARY

Embodiments of the present disclosure generally relate to devices and methods of forming such devices. In particular, embodiments relate to CMOS devices embedded with MEMS components or sensors. The MEMS components, for example, may be IR sensors.

In one embodiment, a device includes a device substrate, the device substrate is configured with a CMOS region with CMOS components and a MEMS region with a MEMS component. The CMOS region surrounds the MEMS region. The device further includes a BE dielectric disposed over the CMOS and MEMS region, the BE dielectric includes interconnects for interconnecting the CMOS components and MEMS components. The device further includes a device bonding region defined on the BE dielectric, the device bonding region surrounds the MEMS region and at least a portion of the CMOS region. The device further includes a cap having a top cap surface and a bottom cap surface, the bottom cap surface includes a cap bonding region corresponding to the device bonding region. The cap includes a focusing module which includes a lens module on one of the top or bottom cap surfaces. The lens module is configured to focus radiation to the MEMS component in the MEMS region. The device further includes a sealing ring, the sealing ring bonds the cap in the cap bonding region to the substrate in the device bonding region and forms a vacuum in a cap cavity within the sealing ring and between the cap and the substrate.

In one embodiment, a method for forming a device includes providing a device substrate, the device substrate is configured to include a CMOS region with CMOS components and a MEMS region with a MEMS component, the CMOS region surrounds the MEMS region and a BE dielectric disposed over the CMOS and MEMS regions. The BE dielectric includes interconnects for interconnecting the CMOS components and the MEMS component. The device substrate further includes a device bonding region defined on the BE dielectric, the device bonding region surrounds the MEMS region and at least a portion of the CMOS region, and a device sealing ring on the device bonding region. The method further includes providing a cap comprising a top cap surface and a bottom cap surface. The bottom cap surface includes a cap bonding region corresponding to the device bonding region. The cap further comprising a cap sealing ring on the cap bonding region, and a focusing module which comprises a lens module on one of the top or bottom cap surfaces, the lens module is configured to focus radiation to the MEMS component in the MEMS region. The method further includes bonding the cap sealing ring to the device sealing ring to form a vacuum in a cap cavity within the sealing rings and between the cap and the substrate.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are incorporated in and form part of the specification in which like numerals designate like parts, illustrate preferred embodiments of the present disclosure and, together with the description, serve to explain the principles of various embodiments of the present disclosure.

FIG. 1 shows a top view of a semiconductor wafer;

FIGS. 6a-c show embodiments of a metalens in a metalens array;

FIGS. 7a-c show embodiments of a global metalens;

FIGS. 11a-c show embodiments for optical aberration correction;

FIGS. 14a-b show a process for encapsulating a device with a cap.

DETAILED DESCRIPTION

Figure 2A:
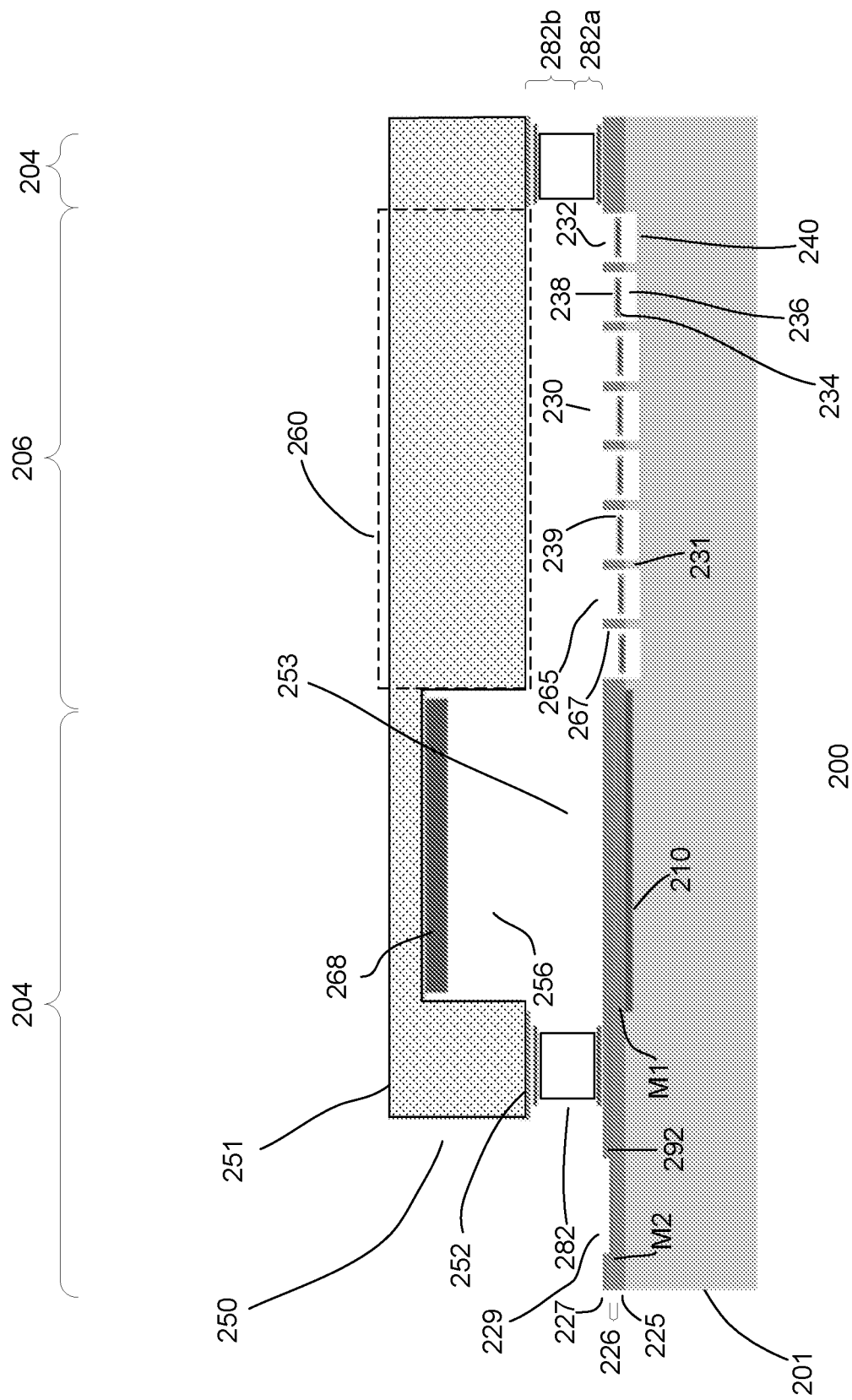
FIGS. 2a-b show simplified cross-sectional views of embodiments of an encapsulated device.

Embodiments generally relate to devices, for example, semiconductor devices or integrated circuits (ICs) with embedded a microelectromechanical system (MEMS) module. The IC, for example, is a complementary metal oxide semiconductor (CMOS) device. As for the MEMS module, it may include one or more thermoelectric-based infrared (IR) detectors. The MEMS detector is compatible with CMOS processing. The devices can be incorporated into products, such as thermal imagers. For example, a device may include a plurality of MEMS sensors which can be configured to form a sensor array for a thermal imager. The sensors may be used for other types of applications, such as single pixel or line array temperature or motion sensors.

The fabrication of the devices may involve the formation of features on a substrate that makes up circuit components, such as transistors, resistors, capacitors and MEMS sensors, as part of a front-end-of-line (FEOL) processing. As part of back-end-of-line (BEOL) processing, interconnections are formed to interconnect the components, enabling the device to perform the desired functions. Furthermore, the process further includes providing an infrared transparent cap for hermetically sealing the device using wafer-level packing techniques.

To form the features, such as CMOS circuit components, sensors, interconnections and caps, layers are repeatedly deposited on the substrate and patterned as desired using lithographic techniques. For example, a wafer is patterned by exposing a photoresist layer with an exposure source using a reticle containing the desired pattern. After exposure, the photoresist layer is developed, transferring the pattern of the reticle to the photoresist layer. This forms a photoresist etch mask. An etch is performed using the etch mask to replicate the pattern on the wafer below, which may include one or more layers, depending on the stage of the process. In the formation of the devices, numerous reticles may be used for different patterning processes. Furthermore, a plurality of devices may be formed on the wafer in parallel. The devices are hermetically sealed with caps. The devices are sealed at the wafer level. For example, the devices of the wafer are sealed with a cap wafer, sealing the devices in parallel, forming a wafer stack with the device wafer and cap wafer. The wafer stack is processed to singulate the encapsulated devices.

FIG. 1 shows a simplified plan view of an embodiment of a semiconductor wafer 101. The semiconductor wafer, for example, may be a silicon wafer. The wafer may be a lightly doped p-type wafer. Other types of wafers, such as silicon-on-insulator (SOI), or silicon germanium wafer, as well as wafers doped with other types of dopants or dopant concentrations, may also be useful.

The wafer includes an active surface 111 on which a device 115 is formed. A plurality of devices may be formed on the wafer in parallel. The devices, for example, are arranged in rows along a first (x) direction and columns along a second (y) direction. A cap wafer with processed caps is bonded to the wafer with the devices, encapsulating the devices at the wafer level in parallel. The cap wafer and the wafer with devices are separately processed before bonding is performed to form a wafer stack. The wafer stack with the device wafer and cap wafer is then processed to singulate the devices into individual encapsulated chips. For example, the wafer stack is partially diced to expose bonding pads. A full dicing is subsequently performed to singulate the devices into individual encapsulated chips.

Figure 2B:
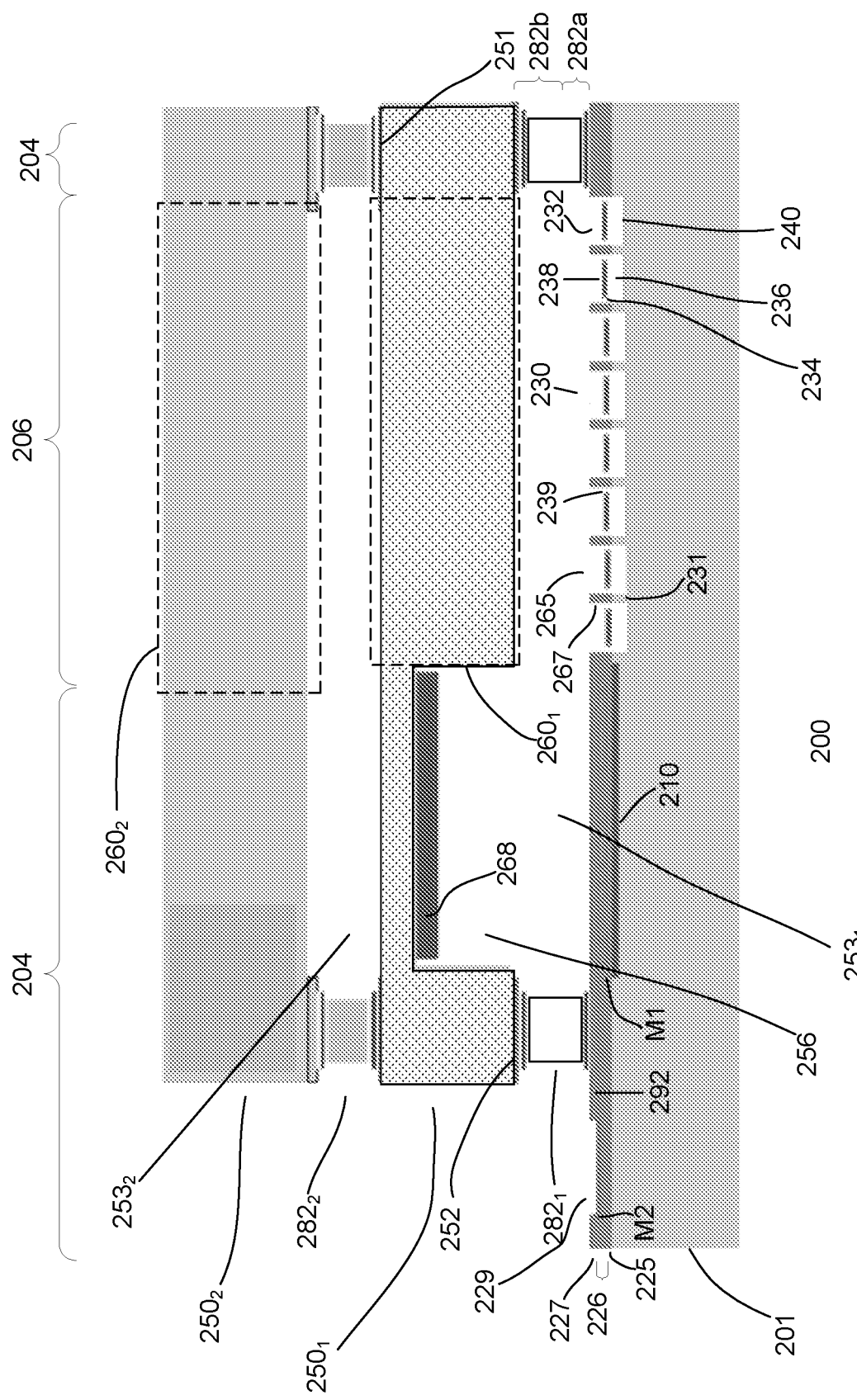

FIGS. 2a-b show simplified cross-sectional views of an embodiment of a device 200 after encapsulation. The device, for example, is a CMOS device with an embedded MEMS module. In one embodiment, the device is a CMOS device embedded with at least one thermoelectric-based IR sensor or detector. In some embodiments, the MEMS module of the device includes a plurality of thermoelectric-based IR sensors. The plurality of sensors may be configured to form a sensor or detector array. For example, the device may be an IR imager in which each sensor may be a pixel of an infrared image. Other types of MEMS structures or applications may also be useful. The device, for example, may be formed in parallel with other devices on a wafer and subsequently singulated.

The device includes a substrate 201. The substrate, for example, may be a part of the wafer on which devices are formed and singulated into individual dies, as described in FIG. 1. Common elements may not be described or described in detail. The substrate may be a semiconductor substrate, such as a silicon substrate, which is part of a wafer. The substrate may be a lightly doped p-type silicon substrate. Other types of substrates or wafers may also be useful.

In one embodiment, the substrate includes first and second device regions 204 and 206. The first region is a CMOS region while the second region is a MEMS region. In one embodiment, the CMOS region surrounds the MEMS region. A bond region of the CMOS region on which a cap 250 is bonded surrounds one or more sides of the MEMS region. As shown, the MEMS region is disposed towards one side of the device. For example, the bond region surrounds three sides of the MEMS region. Other configurations of the CMOS and MEMS regions may also be useful.

The CMOS region includes CMOS components 210, such as first and second polarity type transistors. Other types of CMOS components, such as transistors, resistors, and diodes, may also be included in the CMOS region. A transistor is formed in a device well. The transistor includes a gate on a surface of the well between source/drain (S/D) regions. For a first polarity type transistor, the device well is a second polarity type well while the S/D regions are first polarity type S/D regions. As for the second polarity type transistor, the device well is a first polarity type well while the S/D regions are second polarity type S/D regions. The CMOS region may include various types of transistors, such as high voltage, medium voltage, and low voltage transistors.

As for the MEMS region 206, it includes a MEMS component. In one embodiment, the MEMS component may be a sensor array 230 with a plurality of sensors 232. A sensor may be disposed within a MEMS device region of the MEMS region. For example, each sensor may be located in its respective MEMS device region. The sensors may be arranged in a matrix. For example, the sensor array includes M rows and N columns of MEMS sensors, forming a M×N array. Typical array size may be, for example, a 32×32 array or a 80×64 array. Other array sizes may also be useful. The size of the array may depend on, for example, the desired image resolution. In some cases, the array may be a line of sensors, such as a M×1 or 1×N array. Providing the MEMS region with a single MEMS sensor may also be useful. A sensor may correspond to a pixel of an array of pixels of an image. In addition, the sensor array may also include one or more blind sensors corresponding to one or more blind pixels. Blind pixels, for example, are used for calibration purposes.

The CMOS components may be configured into analog and/or digital circuitry, such as select switches, row and column decoders and readout circuits. Other CMOS components may also be included. The CMOS components are configured for sensing and generating electrical signals on the sensors and converting them to a meaningful output for users. For example, the CMOS components are configured to read out each pixel of the array. Once the full array of sensors is read out, an image may be reconstructed. The image, for example, is a one frame corresponding to the sensors of the array.

Isolation regions may be provided to isolate the CMOS components. For example, isolation regions are provided to isolate transistors as well as the CMOS and MEMS regions. In addition, isolation regions may be provided to serve other purposes. The isolation regions may be field oxide (FOX) isolation regions. Other types of isolation regions, such as shallow trench isolation (STI) regions may also be useful.

In one embodiment, the MEMS sensors are thermoelectric-based IR sensors. A MEMS sensor includes a lower sensor cavity 236. In one embodiment, the lower sensor cavity is disposed in the substrate, creating a substrate cavity. For example, the lower sensor cavity may be a trench formed from etching the substrate. As shown, each sensor includes its respective lower sensor cavity. For example, the MEMS region includes a plurality of lower sensor cavities, separated by cavity walls 231 formed by the substrate, for the plurality of sensors of the sensor array. Other configurations of sensors and lower sensor cavities may also be useful.

The substrate cavity includes cavity sidewalls and bottom which are defined by the substrate. Providing a lower sensor cavity above the substrate surface may also be useful. The sensor cavity may have a square or rectangular footprint or shape. Other shapes for the lower sensor cavity may also be useful. As for the top of the lower sensor cavity, it is defined by a dielectric layer 234. The dielectric layer covers the lower sensor cavity. In one embodiment, the dielectric layer covers the lower sensor cavities of the sensors of the sensor or detector array. For example, the dielectric layer covers all the sensor cavities of the sensors in the sensor array. The dielectric layer may be a silicon oxide layer. Other types of dielectric layers, such as silicon nitride may also be useful. For example, the dielectric layer may be a dielectric stack having multiple dielectric layers. The dielectric layer serves as a membrane for a MEMS structure.

A reflector 240 is disposed at the bottom of the lower sensor cavity. The reflector is configured to reflect infrared (IR) radiation. The reflector may be formed from a conductive material. In one embodiment, the reflector is a conductive metal silicide reflector. The metal silicide reflector may be a titanium silicide ($TiSi_x$), a tungsten silicide ($WSi_x$) or an aluminum silicide ($AlSi_x$) reflector. Other types of metal silicide reflectors which reflect IR radiation may also be useful. For example, the reflector may be a conductive doped reflector layer. The doped reflector layer may be a doped silicon layer, such as a doped polysilicon layer. The doped reflector layer may be heavily doped with p-type or n-type dopants. For example, the dopant concentration of the doped reflector layer may be about $10^{21}$ dopants/cm$^3$. The conductive properties of the surface of the doped region are attributed to the high concentration of dopants being applied, thereby enabling the reflection of the incoming IR radiation. In other embodiments, the reflector may be a non-conductive reflector, such as a photonic crystal reflector. For example, a photonic crystal layer is formed by etching the surface of the lower sensor cavity. The photonic crystal layer may include a grating pattern configured to reflect incident IR radiation. For example, different grating patterns of varying depths may be etched from the surface of the photonic crystal layer to adjust the wavelengths and properties of the reflected IR radiation. Other types of reflectors may also be useful.

A protective liner (not shown) may be provided. The protective liner, in one embodiment, lines the sidewalls and bottom of a lower sensor cavity, covering the reflector. The protective liner serves to protect the reflector and sidewalls of the lower sensor cavity from subsequent processes. For example, the protective liner serves to protect the reflector from etchants, such as $XeF_2$ or $SF_6$ gas, used in a release process to form the lower sensor cavity. The protective liner may be a dielectric protection liner. In one embodiment, the protective liner is a silicon oxide liner. Other types of liners, including non-dielectric liners, which are CMOS compatible and are selective to the etchant used in the release process may also be employed. The liner should also be a non-IR absorbing liner. Preferably, the liner is IR transparent and non-IR absorbing. The protective liner, for example, may be less than 200 nm thick. Other thicknesses for the protective liner which adequately protects the cavity sidewall and reflector during the release process may also be useful.

A MEMS structure 238 is disposed on the dielectric layer 234 which defines the top of the lower sensor cavity. A dielectric liner may line the dielectric layer. In such cases, the MEMS structure is disposed on the dielectric liner. The MEMS structure may be an IR sensor. In one embodiment, the MEMS structure is a thermopile line structure which serves as a thermoelectric IR sensor or detector. The thermopile line structure may be similar to those described in, for example, U.S. Ser. No. 16/517,653, U.S. Pat. No. 10,403, 674, U.S. Ser. No. 16/224,782, and U.S. Pat. No. 10,199, 424, which are all already incorporated by reference for all purposes. Other types of MEMS structures or sensors, including non-IR sensors such as resonators or pressure sensors, may also be disposed in the sensor region.

A thermopile line structure, in one embodiment, includes doped thermoelectric material. In one embodiment, the thermoelectric line structure includes doped polysilicon. Other types of thermoelectric materials which are stable at high temperatures may also be used as the thermoelectric line structure. For example, other thermoelectric materials may include silicon germanium (SiGe), gallium nitride (GaN) or a 2D material, such as graphene, black phosphorus or molysulfide. The thermoelectric material may be a doped thermoelectric material. The pattern of the line structure may be a serpentine or meandering line pattern.

In one embodiment, the thermopile line structure includes N line units, where N>1. For example, a thermopile line structure may include 1 (N=1) or more (N>1) line units. A line unit includes first and second line segments doped with first and second thermopile dopants. The first thermoelectric dopants are first polarity type dopants and the second thermopile dopants are second polarity type dopants. The first and second polarity type dopants are opposite polarity type dopants. For example, the first polarity type is p-type and the second polarity type is n-type. The first and second segments, preferably, have about symmetrical lengths. For example, the lengths of the first and second segments are about the same length. This produces about symmetrical heat dissipation between the segments. In some cases, the lengths of the segments may be ±20% of each other. This produces an acceptable difference in heat dissipation between the segments. The doping of the line segments may, for example, be integrated into the S/D doping processes of the p-type and n-type transistors. Alternatively, separate doping processes may be employed to form the doped line segments.

In the case where the line structure includes a single line unit, the segments of the line units are disposed on a single line level. For example, the first and second line segments of the line unit are disposed on the same line level over the dielectric layer. Providing first and second line segments in different line levels may also be useful to form a stacked line unit.

In one embodiment, a metal contact couples the first and second line segments. The metal contact may be disposed at the interface of the first and second line segments. In one embodiment, the metal contact should be a high-temperature contact. For example, the contact can sustain subsequent processing temperatures. The high-temperature metal contact, for example, may be a titanium (Ti) or an aluminum (Al) alloy contact. Other types of high-temperature metals may also be used to form the contact. To form the metal contact, a contact dielectric layer may be disposed over the substrate. The contact dielectric layer, for example, covers the CMOS and MEMS regions, covering the CMOS and MEMS components. A contact opening is formed at the interface of the line segments. The contact dielectric layer is lined with a metal contact layer, which is patterned to form the metal contact. A first thermoelectric terminal is disposed at a first end of the line structure and a second thermoelectric terminal is disposed at a second end of the line structure. The terminals may be part of the line structure.

In the case where the line structure includes a multi-line unit line structure (N>1), a line unit of the multi-line unit structure may be a stacked line unit. Providing a line unit of a multi-line unit structure which is a non-stacked line unit may also be useful. The line units of the multi-line unit line structure are coupled in series. Providing multiple line units to form a sensor improves sensor performance without increasing surface area. In one embodiment, the multi-line structure includes first and second stacked line units (N=2). Providing other numbers of line units for a line structure may also be useful. For example, a line structure may have 1-4 (N=1-4) line units. Preferably, a line structure has 2N line units, where N=1-2. Other configurations of a multi-line unit line structure, including the number of line units, may also be useful.

In one embodiment, the first and second stacked line units are disposed adjacent to each other on the dielectric layer within the sensor region. A stacked line unit includes a first segment disposed in a first line level and a second line segment disposed in a second line level. The first and second line levels may be separated by a dielectric layer. For example, the second line segment of a line unit is overlaid over the first line segment of the line unit and separated by an interline level dielectric layer. A contact connects the first line segment in the first line level to the second line segment in the second line level.

The first and second line units, as discussed, are coupled in series. For example, a second terminal of the first line unit may be coupled to a first terminal of the second line unit while a first terminal of the first line unit serves as a first terminal of the multi-line unit line structure and a second terminal of the second line unit serves as a second terminal of the multi-line unit line structure. As an example, a line structure with 2 line units may be connected in series to form an n-p-n-p line structure.

The line units of the multi-line unit line structure preferably have similar designs. For example, the line structures have similar patterns with similar line segment lengths which allow for the same cuts through the dielectric layers to the sacrificial layer for an easier release process. Other configurations of line units may also be useful.

In the case of a polysilicon line structure, it may be formed with one of the polysilicon layers used to form the gate electrodes. For example, the CMOS process may include a gate electrode layer for gate electrodes and may also be employed to also serve as the polysilicon line structure. In the case where the CMOS process includes more than one polysilicon gate electrode layer, the thinner polysilicon gate electrode layer may be preferably selected to serve as the polysilicon line structure. In another embodiment, a separate layer may be employed to serve as the line structure. When multiple line structures are stacked, the different stacked structures preferably have the same material and thickness. Providing line structures with different thicknesses may also be useful. For example, the resistance can be adjusted with varying thicknesses and thermal isolation can be improved with thinner polysilicon line structure due to improved sensitivity. Additional line structure layers may be included in the process to serve as line structures of the stack.

An absorber layer (not shown) may be provided over the line structure. The absorber layer, for example, is configured to absorb incident IR radiation. In one embodiment, the absorber layer is disposed on a central portion of the line structure. The absorber layer is thermally coupled to a center of the line structure. The absorber layer may be a titanium nitride (TiN) layer. Other types of absorber layers may also be useful. For example, the absorber layer may be a nickel-chromium (NiCr) layer or a doped silicon layer. In one embodiment, the absorber is configured to absorb most of the incident IR radiation. For example, the absorber may be configured to absorb greater than 85% of incident IR radiation having a wavelength of 8-14 µm. Providing any other configurations may also be useful. In other embodiments, the absorber is configured to absorb incident radiation having a wavelength of 2-5 µm. For example, another harmonic of the interferometric absorber is used. In one embodiment, the absorber is configured to absorb >50% of incident radiation having a wavelength of 2-5 µm.

A sensor protection layer (not shown), in one embodiment, is disposed over the absorber layer. The sensor protection layer serves to protect the sensor from subsequent etch processes. For example, the protection layer serves to protect the line structure and absorber layer from etchants, such as $XeF_2$ or $SF_6$ gas, used to form the lower sensor cavity. In one embodiment, the protection layer is a silicon oxide layer. Other types of layers which are transparent to IR radiation and are selective to the etchant used to form the lower sensor cavity may also be useful.

Release openings 239 are provided in the dielectric layer 234 and other layers above, such as the dielectric layer between the sensor, the absorber layer, and the protective layer, to enable removal of lower sensor cavity sacrificial material in the substrate cavity during a release process. In one embodiment, the lower sensor cavity has a depth which is selected for optimal reflection of the desired wavelengths of IR radiation by the reflector. In one embodiment, the depth of the cavity is sufficient to ensure a ¼ wavelength optical distance between the absorber and reflector. For example, the optical distance may be about 2-3 µm for detecting IR radiation having a wavelength of 8-12 µm. Other distances may also be useful, depending on the wavelength to be detected. For example, by decreasing or increasing the optical distance, IR radiation with smaller or larger wavelengths can be detected respectively. The optical distance is defined as the distance where the IR radiation wave possesses an optical path going through several layers.

An interlayer dielectric (ILD) layer 225 may be disposed on the substrate over the CMOS and MEMS regions, covering the CMOS and MEMS components. The contact dielectric layer, for example, is a silicon oxide layer. Other types of dielectric layers or a combination of dielectric layers may also be useful.

Metal contacts are disposed in the ILD layer for connecting the line segments of the MEMS sensors. The contacts may be formed by etching trench openings in the ILD layer and lining them with a metal layer. The metal layer is patterned to form the contacts. A dielectric liner, such as silicon oxide, may be disposed over the metal contact. The dielectric liner fills the trench opening over the contact and lines the ILD layer over the CMOS and MEMS regions. The surface of the liner layer may be planar. For example, the liner layer may be a self-planarizing dielectric layer. Alternatively, a planarization process may be performed to form a planar liner surface with the contacts.

Conductive contact plugs, such as tungsten plugs are provided in the ILD layers and are coupled to contact regions on the substrate and MOS components. For example, contact plugs are coupled to S/D regions and gates of the CMOS components as well as to well taps for biasing the wells and substrate. The contact plugs are coupled to contact regions of MEMS components in the MEMS region, such as through first and second thermopile terminals of a line structure. Providing contact plugs for other types of contact regions may also be useful. The contact plugs, for example, are formed by a damascene process. The dielectric liner serves to protect the metal contacts while forming the contact plugs in the CMOS region. The dielectric liner, for example, may be considered part of the ILD layer. For example, the ILD layer may be a lower portion of the ILD layer while the liner may be an upper portion of the ILD layer.

A back-end-of-line (BEOL) dielectric 226 is provided on the substrate over the ILD layer. For example, the BEOL dielectric covers the CMOS and MEMS regions. The BEOL dielectric may include multiple intermetal dielectric (IMD) levels formed by BEOL dielectric layers. For example, the BEOL dielectric may include y IMD levels, where y is from 2-8. Other numbers of IMD levels, including 1, may also be useful, depending on the design and CMOS process.

An IMD level may include a via dielectric level and a metal dielectric level. A via dielectric level and a metal dielectric level of an IMD level may be formed from one or more dielectric layers, depending on the design and process approach. The via dielectric level may be disposed above a metal dielectric level. Providing a metal dielectric level above a via dielectric level may also be useful. For example, a first via level is disposed over a first metal level M1. Another metal level (Mx+1) may be disposed over the first via level (Vx). For example, in the case of 3 IMD levels, x may be from 1 to 3. The metal dielectric level includes metal lines and the via dielectric level includes via contacts. The first metal level M1 is disposed over the ILD layer. Other configurations of BEOL dielectric layers may also be useful.

The metal lines and via contacts may be formed using damascene techniques, such as a single or a dual damascene process. In the case of a single damascene process, the contacts and metal lines are formed in separate processes. In the case of a dual damascene process, the metal lines and contacts are formed in the same process. In some embodiments, an IMD level may be formed by a combination of damascene and a reactive-ion etching (RIE) process. For example, metal lines may be formed by an RIE process while the contacts are formed by a single damascene process. In the case of an RIE process, a metal layer is formed and patterned by RIE using an etch mask to form the metal lines. It is understood that the different IMD levels of the BEOL dielectric may be formed using different techniques or combinations of techniques or processes. For example, the first IMD level may form contacts using a damascene process and metal lines using an RIE process, intermediate IMD levels may be formed using a dual damascene process. Alternatively, the IMD levels may be formed by a combination of damascene and RIE processes. Other configurations of forming the IMD levels may also be useful.

As for the top metal level of the BEOL dielectric, it may serve as a pad level with pad metal lines. The pad lines may be formed by a damascene or an RIE process. A passivation layer 227 is formed over the pad lines or feedthrough lines 292. Pad openings are formed in the passivation layer to expose the pad lines. Other approaches for forming the pad level may also be useful.

The ILD and IMD levels may be planarized to form a planar top surface over the CMOS region and the MEMS region. For example, CMP is performed on the substrate. Other planarization techniques, such as spin-on-glass (SOG) to fill the gaps or planarize the surface of the substrate, may also be useful. The overall thickness of the ILD and IMD levels over the structure may be from 100-400 nm. Providing any other thicknesses for the IMD levels over the structure to define the depth of the vias for subsequent standard CMOS process may also be useful.

As discussed, the passivation layer 227 is disposed above the top metal level. The passivation layer may be a single layer or a passivation stack having multiple passivation layers, such as a combination of silicon oxide and silicon nitride layers. The top metal level of the top IMD level, as discussed, may serve as a pad level. Bond openings 229 are provided in the periphery of a cap to expose the bond pads below. The bond pads, for example, are part of the pad lines. The bond pads provide external access to the internal components of the device. For example, input, output and power signals may be provided via the bond pads. Bond pads are provided in the periphery of the device, for example outside of the periphery of the cap. As shown, bond pads are provided on one side of the device which is the opposite side of the sensor region. Bond pads may also be provided on one or more of the other sides of the device.

As shown, the BEOL dielectric layers include metal layers M1 and M2. The metal layer M1 is the bottom metal layer and the metal layer M2 is the top metal layer. Providing other numbers of metal layers may also be useful. The number of metal layers may depend on the CMOS process employed. Typically, the contacts of the ILD level are formed using a single damascene process. For example, contacts are formed to couple to various terminals of the components. The contacts may contact S/D regions, gates of the transistors, well contacts and terminals of the sensor. The first metal level of the first IMD level may be formed using a single damascene or an RIE process. As for the contacts of the next via level and metal lines of the next metal level, they may be formed by a dual damascene process. The top contact level may be formed by a single damascene process and the top metal level may be formed by an RIE process. In some cases, the top metal may be formed by overfilling the via openings and patterning the excess metal to form the top metal line and bond pads. Other configurations of processes for forming the various contacts and metal lines of the IMD levels may also be useful.

In one embodiment, the dielectric material on the substrate over the MEMS region is removed, creating an opening 265 to expose the sensor array. For example, the ILD, BEOL dielectric and passivation layer (may be referred to BE dielectric layer or collectively as the BE dielectric) over the MEMS region are removed. The opening in the BE dielectric, for example, forms a BE cavity. In one embodiment, the patterned BE dielectric 267 over the MEMS region remains over the cavity walls, forming individual BE cavities over the substrate cavities. A BE cavity may be a rectangular-shaped cavity. As shown, a BE cavity includes a vertical sidewall. Providing a BE cavity with non-vertical sidewalls may also be useful. The BE cavities form lower portions of an upper sensor cavity. Other configurations of BE cavities may also be useful.

As shown in FIG. 2a, a cap 250 is bonded on the substrate, encapsulating the MEMS region. The cap, for example, is bonded to the substrate to form a vacuum over the MEMS region. In one embodiment, the cap is a cap wafer which is bonded to the substrate using wafer-level vacuum packaging (WLVP) techniques. For example, the cap wafer includes a plurality of caps which are bonded to a device wafer with a plurality of devices using WLVP techniques.

The cap, in one embodiment, is transparent to infrared radiation. For example, the cap is capable of transmitting infrared radiation to the sensor. The cap, for example, may be a silicon cap. The cap may be a lightly doped substrate with high resistance. Such substrates may include float zone (FZ), magnetic czochralski (M-Cz) or advanced magnetic czochralski (AM-Cz) substrates or wafers. Other types of wafers which is transparent to infrared radiation may also be used to form the cap. For example, the cap wafer may be a germanium wafer or a glass wafer. In one embodiment, the cap is a double-sided polished wafer. For example, the cap is polished on both the front and back sides of the wafer. This provides a thinner wafer with a more smooth surface for improved transmission of infrared radiation.

The cap, in one embodiment, completely covers the MEMS region 206. As shown, the cap also covers the CMOS region 204. For example, the cap covers the CMOS region within the bond region. In one embodiment, the cap leaves a peripheral portion of the CMOS region uncovered for bond openings 229. The bond openings expose bond pads for providing external connections to the device. The cap, for example, leaves a peripheral portion of one side of the device exposed. Leaving peripheral portions of more than one side of the device exposed may also be useful.

In one embodiment, a sealing ring 282 is employed to facilitate bonding the cap to the substrate. For example, a sealing ring facilitates bonding of the cap to the BE dielectric. The sealing ring, for example, includes a cap sealing ring 282b and a device sealing ring 282a. The cap sealing ring is formed on the cap bond region while the device sealing ring is formed on the BE bond region 204 on the BE dielectric. The cap and device sealing rings are mated, bonding the cap to the device. In one embodiment, a sealing ring (cap sealing ring or device sealing ring) includes a sealing stack with multiple layers. The sealing stack may include a metal stack, a dielectric stack, or a combination of metal/dielectric stack. For example, the sealing stack may include gold-based metal, such as gold (Au) or gold-tin (AuSn), aluminum (Al), copper (Cu), silver (Ag), titanium (Ti), germanium (Ge), tin (Sn), titanium nitride (TiN), silicon dioxide, silicon nitride or a combination thereof. Providing other materials and structures for the sealing stacks may also be useful.

The cap and substrate may be bonded using thermal compression bonds. Other bonding techniques, such as eutectic bonding, may also be useful. In one embodiment, high-temperature bonding may be utilized. For example, the bonding process can be carried out at a temperature as high as 450° C. This creates a stronger and more reliable bonding interface between the cap and the device.

The cap, when bonded to the substrate, forms a cap cavity 253, encapsulating the MEMS region 206 inside the cap bonding region. In one embodiment, the cap hermetically seals the MEMS region. The volume of the cavity, for example, may be defined by the height of the sealing ring.

In one embodiment, the cap includes a focusing region 260 disposed over the MEMS region. The focusing region serves to facilitate focusing IR radiation through the cap to the MEMS region. For example, the focusing region focuses IR radiation to the IR detector array in the MEMS region. The focusing region, in one embodiment, facilitates in focusing IR radiation to the detector array. To facilitate focusing IR radiation, the focusing region includes an integrated focusing system. For example, the focusing system is integrated into the cap. In one embodiment, the focusing system includes at least one integrated lens module. The lens module, for example, may be disposed on a top or outer surface 251 of the cap or a bottom or inner surface 252 of the cap. Providing lens modules on both the top and bottom surface of the cap may also be useful. For example, the integrated focusing system may be a single or double integrated lens focusing system.

In the case where a lens module is provided on only one of the surfaces of the cap wafer, such as the top or the bottom cap surface, the opposing surface of the focusing region may include an anti-reflection module. For example, if the focusing region includes a lens module on the top cap surface, then the bottom cap surface may be provided with an anti-reflection module. In such cases, the focusing system includes both a lens module and an anti-reflection module. By providing a focusing system with a lens module on one surface and an anti-reflection module on the other, the focusing system enhances both focusing and transmission of IR radiation through the cap to the IR detectors. For example, the lens module provides a highly focusing cap surface while the anti-reflection module provides a highly transmissive cap surface.

The anti-reflection module may include an anti-reflection coating. The anti-reflection coating may be zinc sulfide (ZnS) or germanium (Ge). Providing any other materials for the anti-reflection coating may also be useful. The anti-reflection coating may be deposited on the surface or surfaces of the cap and patterned to remain in the focusing region. In another embodiment, the anti-reflection module may include multiple anti-reflection coatings.

In yet another embodiment, the anti-reflection module includes anti-reflection surface structures on the cap surface. For example, the anti-reflection surface structures may be moth-eye structures. The anti-reflection surface structures can be tailored for both anti-reflection and filtering out light having specific or desired wavelengths. For example, in the case of IR sensors, light having wavelengths other than 4.62 um may be filtered out. To filter out light having an undesired wavelength, the surface pattern may include photonic crystals. Alternatively, the anti-reflection module may include surface structures for filtering purposes. The surface structures can be fabricated by, for example, reactive ion etching on the cap surface using a resist or hard mask. Other techniques for forming the surface structures may also be useful. For example, maskless etch techniques, such as laser etching, may also be useful.

A lens module is configured with a focal length, based on the lens design. For example, the focal length of the lens module is inherent based on the lens design. The lens module is positioned vis-à-vis the detector array (focal distance) according to its inherent focal length. For example, the position is selected so that the focal point of the lens module falls on the detectors or detector array. The position of the lens module may be adjusted by, for example, the height of the sealing ring and thickness of the cap or the height of the sealing ring, depending on whether the lens module is on the top cap surface or on the bottom cap surface. For example, if the lens module is on the top cap surface, the thickness of the cap and height of the sealing ring is configured according to the focal length. In the case if the lens module is on the bottom cap surface, the height of the sealing ring is configured according to the focal length.

For embodiments with a lens module on both the top and bottom cap, the thickness of the cap is determined by the focal length of the top lens module. For example, the top lens module focuses IR radiation onto the bottom lens module. As for the height of the sealing ring, it is determined by the focal length of the bottom lens module. For example, the focal length of the bottom lens module determines the distance between the bottom lens module and the detector array, which determines the height of the sealing ring.

A lens module may be designed or configured to have any focal length. The focal length of a lens module should take into manufacturability considerations. For example, the focal length of a lens module should not cause the cap to be too thin to cause cap failures or distance between the bottom surface of the cap and detector array to be too close to cause sealing ring failures. Such design considerations also hold true for a cap with a lens module on both the top and bottom cap surfaces. Although the lens module may be configured with any combination of focal lengths, focal length design should take into consideration of cap thickness and distance between the cap to the detectors to avoid failure or reliability issues.

In one embodiment, a lens module includes a metamaterial-based lens (metalens) module. The metalens module includes metasurface structures disposed on a surface of the cap in the focusing region. For example, metasurface structures may be disposed on a top surface, a bottom surface, or both the top and bottom surfaces of the cap. The metasurface structures, for example, are planar metasurface structures.

The metasurface structures, for example, are planar structures on a surface of a cap in the focusing region. For example, the planar structures are patterned on or created from a planar surface. In one embodiment, the planar structures are 2D structures. For example, the properties of the lens can be tuned by the length and width, including spacing of the structures along the plane of the cap surface. This is in contrast to a conventional 3D lens which has curved surfaces. In one embodiment, the metasurface structures are formed by etching on a bare surface of the cap. For example, the metasurface structures may be etched using a time-controlled etch process on a surface of the wafer, such as a Si, a Ge, or a glass wafer. Other types of wafers may also be useful. The metasurface structures may be formed using a masked etch process, such as reactive ion etching using a patterned resist mask. In other embodiments, a maskless etch, such as laser etching may be employed. Other techniques for forming the metasurface structures may also be useful.

Metasurface structures, in one embodiment, includes uniformed shaped metasurface structures. Uniformed shaped metasurface structures include uniform or smooth sidewalls. The uniform sidewalls, for example, may be vertical sidewalls. Other configurations of uniform sidewalls may also be useful. For example, the sidewalls may be substantially vertical or non-vertical. The uniformed shaped metasurface structures may be formed by a single etch process.

In some embodiments, the metasurface structures are stepped metasurface structures. Stepped metasurface structures are configured with stepped sidewalls. Multiple etch processes may be employed to form stepped metasurface structures. For example, in the case of two-stepped structures, a first etch defines one step of the metasurface structures while a second etch defines a second step of the metasurface structures. The first etch may be used to define the top or the bottom step of the structures while the second etch can define the other of the top or bottom step of the structures. Generally, the top step is defined before defining the bottom step. Other etch configurations may also be useful. For example, the first etch can define the top step and the second etch can define the bottom step. In the case of more than two-step structures, more etch processes are performed.

In another embodiment, the metasurface structures include a single metasurface structure patterned layer on the surface of the cap. The patterned layer may be a dielectric layer. Various types of dielectrics and may be employed as a metasurface structure layer. For example, a dielectric metasurface structure layer may include a silicon (Si), amorphous silicon ($\alpha$Si), a titanium oxide ($TiO_2$), a silicon oxide ($SiO_2$), or a silicon nitride (SiN) layer. Other types of dielectric layers may also be useful. In another embodiment, the patterned layer may be a metal layer. Various types of metal layers may be employed. For example, the matal layer may be a lead, a tellurium (PbTe), an aluminum (Al), a molybdenum (Mo) or a titanium (Ti) layer. Other types of metal layers may also be employed. However, it is understood that metal metasurface structures may impose a higher loss than dielectric metasurface structures.

The metasurface structures, for example, are formed by patterning the metasurface structure layer, such as by a mask or a maskless patterning technique. The metasurface structures may be uniformed metasurface or stepped metasurface structures. For example, a single etch process may be used to form the structures in the patterned metasurface structure layer which serves as an etch stop. In the case of two stepped structures, the patterned metasurface structure layer may serve as an etch stop of the etch which defines the top or upper step of the structures in the patterned layer while another etch forms the bottom step of the structures in the cap wafer. Other configurations of forming the structures may also be useful. As an example, both the first and second steps may be formed in the patterned metasurface layer.

In other embodiments, the metasurface structures include multiple metasurface structure patterned layers. In one embodiment, the multiple metasurface structure layers include a dual metasurface structure layered stack. Other numbers of layers for the multi-layered stack may also be useful. The metasurface structure layered stack may be any combination of dielectric layers or dielectric and metal layers. For example, a dual-layered stack may be a dielectric-on-dielectric layered stack, a metal-on-dielectric layered stack, or a dielectric-on-metal layered stack. In a preferred embodiment the multi-layered stack includes any combination of dielectric layers. In another embodiment, the multi-layered stack includes at least one or more dielectric layer. For example, a dual-layered stack may include one dielectric layer and one metal layer. Adjacent layers of the stack are preferably different to serve as etch stops. For example, in the case of two dielectric layers, they are different types of dielectric layers.

The metasurface structures, for example, are formed by patterning the metasurface structure layers of the layered stack, such as by a mask or a maskless patterning technique. A multi-layered stack facilitates forming multi-stepped structures since different layers may serve as etch stops for different etch processes. It is also understood that steps may be formed within a layer or that uniformed structures may be formed in the stack.

A metasurface structure may be referred to as a unit cell of a metalens. Unit cells may be configured into a metalens of the lens module. In one embodiment, the lens module includes a lens array. For example, the lens array is configured with a matrix of metalenses. The number of metalenses in the array, in one embodiment, matches the number of detectors in the detector array. Other configurations of the lens array may also be useful. For example, multiple metalenses may be associated with a detector or multiple detectors may be associated with a metalens. In other words, there is no 1:1 metalens to detector correlation. Alternatively, the lens module is configured with a global metalens. For example, the lens module includes one metalens, such as a global metalens, which focuses the IR radiation to all the detectors of the detector array.

As discussed, unit cells may be configured to form a concentric annulus metalens. For example, the metasurface structures may be configured to form concentric annuluses, serving as a metalens. The annulus metalens, in one embodiment, includes concentric ring structures, with two concentric ring structures separated by a concentric annulus. A ring structure includes metasurface structures. Metasurface structures of the unit cells may be in the form of simple gratings, nano-voids, or nano-antennas. Other types of metasurface structures may also be useful. Unit cells of a metalens may be the same type of unit cells or different types of unit cells.

A surface area of the focusing region may be the same size as the surface area of the MEMS region. Providing a focusing region which is larger or having a larger surface area than the MEMS region may also be useful. Having a focusing region with a larger surface area than the MEMS region advantageously increases the field of view (FOV) of the detector array. In the case where a lens module is provided in the top and bottom cap surface, the surface area of the lens module on the top cap surface is configured to be larger than the lens module on the bottom cap surface to improve focusing and increasing FOV. For example, the lens module on the bottom cap surface may be the same size or larger than the detector array while the lens module on the top cap surface is the same or larger than the lens module on the bottom cap surface. Preferably, the lens module on the top cap surface is larger than the lens module on the bottom cap surface.

As shown, the cap includes a cap recess 256 on the inner surface. The cap recess, for example, is disposed on a bottom surface of the cap outside of the focusing region 260. The cap recess may have a square or rectangular footprint or shape. Other shapes for the cap recess may also be useful. For example, the cap recess may be configured to surround the focusing region, whether one, two, three or four sides of the focusing region. Depending on the thickness of the cap wafer, the cap recess may have a depth ranging from 10, 20, 30, 100 to 500 um. Having a cap recess which is deeper than 500 um may also be useful. In one embodiment, the cap recess improves an overall vacuum level within the cap cavity. For example, the cap recess increases the overall volume of the cap cavity between the cap and the sensors in the MEMS region. The larger volume improves the overall vacuum level after bonding of the cap wafer to the device substrate. As such, better detector sensitivity is achieved.

In one embodiment, a getter 268 is disposed on an inner surface of the cap recess. The getter absorbs moisture and outgassing within the encapsulated device. The getter, for example, may be zirconium alloys, titanium (Ti), nickel (Ni), aluminum (Al), barium (Ba), or magnesium (Mg). Other types of getter materials such as rare earth elements including cerium (Ce) or lanthanum (La) may also be useful. The getter facilitates the maintenance of the vacuum, improving reliability.

Other configurations of the cap recess or bottom cap surface may also be useful, as described in PCT Application no. PCT/SG2020/050203, which is already incorporated by reference for all purposes. In some cases, the cap may be provided with a planar bottom surface. For example, the bottom cap surface has no cap recesses. Alternatively, the cap recess may be configured to be in the focusing region instead of the non-focusing region. Other configurations of the bottom cap surface may include a shallow recess in the focusing and non-focusing regions and a deep recess. The deep recess may be configured in the focusing or non-focusing region. For example, the shallow recess is provided in the non-bonding region of the bottom surface of the cap. In yet other embodiments, the cap may be provided with only one recess in the focusing and non-focusing regions. The recess, for example, is provided in the non-bonding region of the bottom surface of the cap. In any case, a getter may be disposed on an inner surface of the cap outside of the focusing region. The getter absorbs moisture and outgassing within the encapsulated device. The getter facilitates the maintenance of the vacuum, improving reliability.

In one embodiment, support columns or posts (not shown) are provided in the non-focusing region of the cap cavity, as also described in PCT Application no. PCT/SG2020/050203, which is already incorporated by reference for all purposes. The support columns may be provided for any of the caps described. The support columns are located in the CMOS region within the cap cavity. The support columns serve to prevent or reduce the cap from bending during the bonding process, which may lead to the cap contacting the BEOL dielectric, causing damage to the interconnects therein. Support columns are particularly useful applications with large sensor dies since they are more susceptible to this problem.

In one embodiment, the support columns are configured to act as spacers to provide mechanical support during wafer-level vacuum packaging (WLVP). For example, the support columns or posts should maintain the constant space between the device wafer and cap wafer during the bonding process. In addition, the support columns should be configured to allow gas molecules to flow freely between the MEMS and CMOS region for absorption by the getter layer 268 disposed on the inner surface of the cap in the non-MEMS region. For example, the support columns may be disposed on the CMOS region at about an interface of the MEMS region, separating the cap cavity into two regions. Spaces separating adjacent support columns enable gas-flow between the two regions of the cap cavity.

The support columns may be rectangular-shaped columns. Providing columns having other shapes may also be useful. The dimensions of the support columns can be about 10 um×10 um, 20 um×20 um, 50 um×50 um or 100 um×100 um. Support columns having other dimensions may also be provided. The number of support columns may depend on, for example, the size of the cap cavity and dimensions of the support columns. The support columns should be disposed outside of the MEMS region to avoid interfering with the operation of the sensors or breaking the sensors during the bonding process.

The support columns may include various types of materials. For example, the support columns may include dielectrics, metals, ceramics, or a combination thereof. Other materials may also be employed to form the support columns. Preferably, the materials used should be post CMOS compatible if they are formed on the device wafer. However, post CMOS compatibility is not a concern if the support columns are formed on the cap wafer. It is further understood that cap portions of the support columns may be formed on the cap wafer and device portions of the support columns may be on the BEOL dielectric on the device wafer. Unlike the sealing rings, the cap portions and the device portions of the support columns need not form bonds. As such, they can be formed of different types of materials which do not form a bond during WLVP.

In some embodiment, support columns may be formed on either the device wafer or on the cap wafer. Although this may result in a gap, it may still be sufficient to prevent the cap wafer from contacting the active region of device wafer during WLVP. For example, the cap portions of the support column should have sufficient height to prevent the cap wafer from contacting the active region of device wafer during WLVP.

In other embodiments, the cap and device portions of the support columns are formed during the same process as forming the sealing rings on the cap and device wafers. In such cases, the cap and device portions of the support columns are identical to the cap and device sealing rings on the cap and device wafers. For example, the portions of the support columns form bonds, similar to the sealing rings during WLVP. In some embodiments, support column portions may be formed on either the cap wafer or the device wafer using the same process which forms sealing rings.

Referring to FIG. 2b, a lower cap $250_1$ is bonded on the substrate, encapsulating the MEMS region. The lower cap is similar to the cap 250 described in FIG. 2a. For example, the lower cap is an IR transparent cap with a lower cap focusing region $260_1$. The lower cap is bonded to the substrate by a lower sealing ring $282_1$, creating a lower cap cavity $253i$. The sealing ring, for example, may include a device portion 282a and a cap portion 282b. The focusing region includes a lower focusing system which may include a lens module on at least one of the cap surfaces, such as the top lower cap surface 251 or the bottom lower cap surface 252. In some embodiments, the focusing system includes lens modules on both the top and bottom lower cap surfaces. In the case where only one of the cap surfaces includes a lens module, the other cap surface may include an anti-reflection module. For example, the focusing system includes a lens module on one cap surface and an anti-reflection module on the other cap surface.

As shown, the bottom cap surface of the lower cap includes a recess 256 in the non-focusing region. Providing the bottom cap surface with other configurations, such as no-recesses, recess in the focusing region, one recess in both the focusing and non-focusing region (e.g., excluding the bonding region), or a shallow recess in the focusing and non-focusing region and a deep recess in either the focusing or non-focusing region. A getter 268 is disposed on the bottom cap surface in the non-focusing region. The cap cavity may also be provided with support columns or posts in the non-focusing region.

An upper cap $250_2$ is provided. The upper cap is also an IR transparent cap, similar to the lower cap. The upper cap is bonded to the top cap surface 251 of the lower cap by an upper sealing ring $282_2$. The upper sealing ring, for example, is similar to the sealing ring which bonds the lower cap to the device. For example, the upper sealing ring may include a upper cap portion on the bottom surface of the upper cap and a lower cap portion on the top cap surface of the lower cap. The upper cap forms an upper cap cavity $253_2$ between the caps.

The upper cap includes an upper cap focusing region $260_2$ with an upper focusing system. The upper focusing system, similar to the lower focusing system, includes at least one lens module on the top or bottom upper cap surface or a lens module on both the top and bottom upper cap surfaces. In the case the upper cap includes one lens module, the other upper cap surface may be provided with an anti-reflection module. For example, the upper cap system includes a lens module and an anti-reflection module. As shown, the bottom surface of the upper cap is a planar bottom surface. Providing the bottom surface of the upper cap with one or more upper cap recesses may also be useful, similar to the bottom cap. For example, the cap recess or recesses, along with sealing ring height, may be used to control the distance between the upper cap and lower cap according to the focal length design of the upper lens module or modules. This advantageously imparts design flexibility.

The lower cap and upper cap form a cascaded cap with two caps. Providing a cascaded cap with more than 2 caps may also be useful. The cascaded cap enhances the flexibility in focal length design of the lens modules as well as achieving a wider FOV.

Figure 3A:
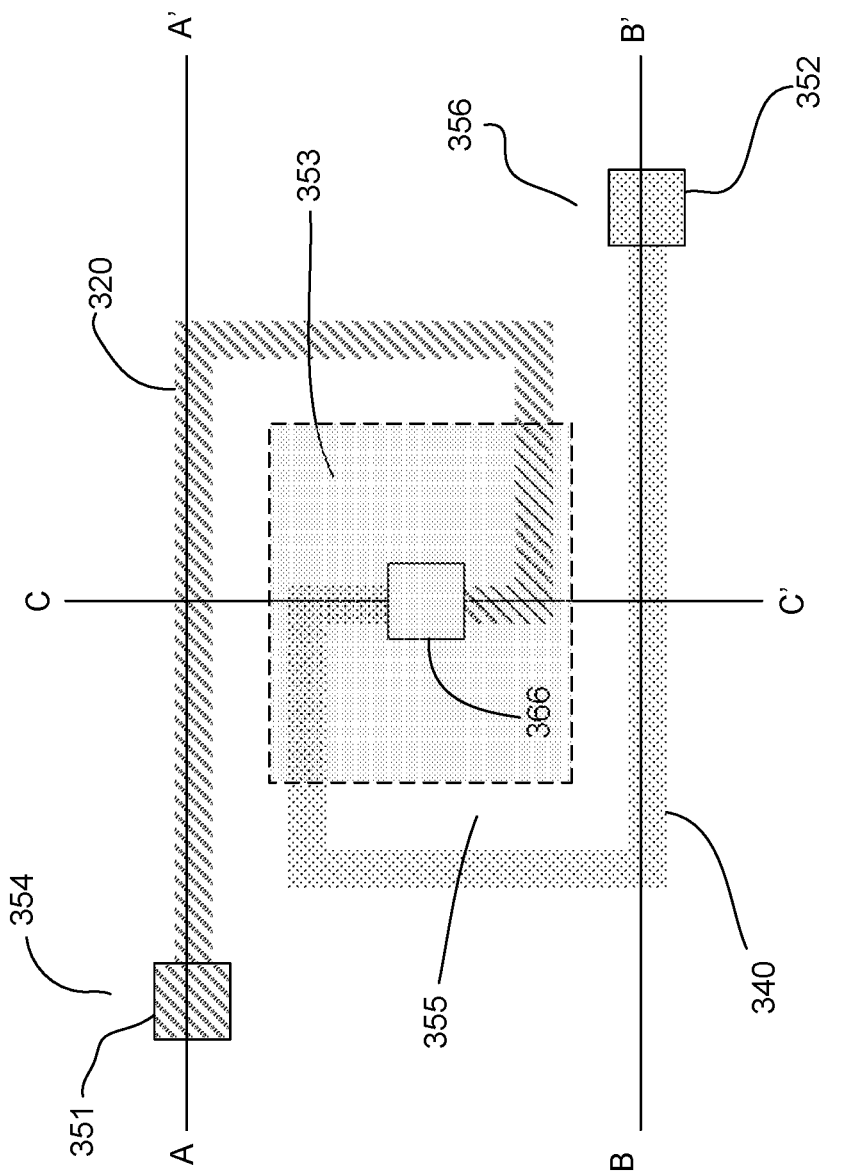
FIGS. 3a-d show top and cross-sectional views of various exemplary embodiments of thermopile structures for IR sensors.
Figure 3B:
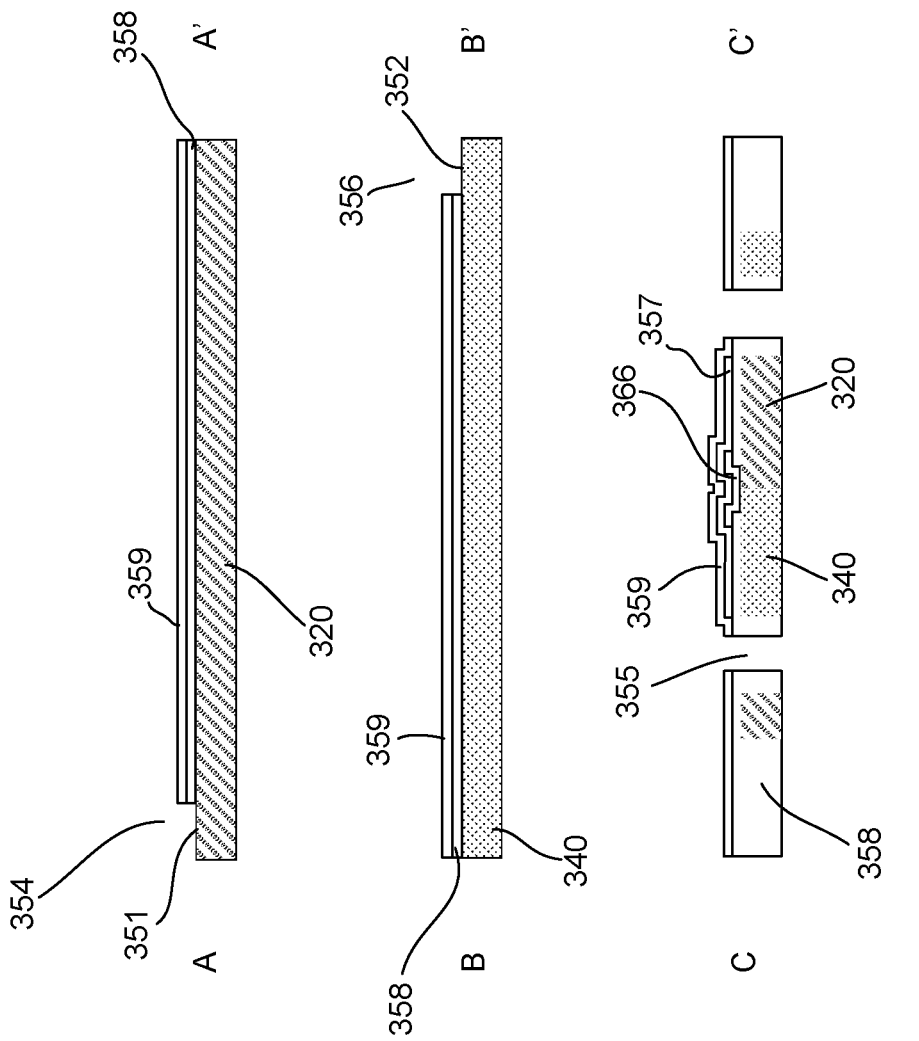

FIG. 3a shows a simplified top view of an embodiment of a MEMS sensor or structure 350 and FIG. 3b shows various cross-sectional views of the MEMS structure along A-A', B-B', and C-C'. The top view excludes the protective layer. The MEMS structure is a line structure. The line structure is a thermopile which serves as a thermoelectric IR sensor or detector. The line structure is disposed on the membrane or dielectric layer which defines the top of the lower device cavity. The line structure, in one embodiment, includes a single line unit (N=1) which has a meandering shape and occupies the surface of the membrane.

In one embodiment, the line unit includes polysilicon. Other types of line units may also be useful. For example, thermoelectric materials which are stable at high temperatures may be employed to form the line structure. Such materials may, for example, include SiGe, GaN and 2D materials, such as graphene, black phosphorus, or molysulfide.

The line unit includes first and second line segments 320 and 340. A first end 351 is part of the first line segment and a second end 352 is part of the second line segment. In one embodiment, the first and second ends may serve as cold junctions of a thermopile. A first line structure terminal 354 is disposed at the first end and a second line structure terminal 356 is disposed at the second end. The terminals, for example, are part of the line unit of the line structure. The terminals serve as terminals of the MEMS structure or sensor.

In one embodiment, the first line segment is doped with first polarity type dopants and the second line segment is doped with second polarity type dopants. For example, the first line segment is heavily doped with first polarity type dopants and the second line segment is heavily doped with second polarity type dopants. The first polarity type may be p-type and the second polarity type may be n-type. Providing first polarity type which is n-type and second polarity type which is p-type may also be useful. The doping may be integrated into the implants which form the S/D regions and well contacts. Doping the line segments separately from the implants that form the S/D regions and well contacts may also be useful.

The line structure may be patterned using mask and etch techniques. For example, a photoresist is disposed on a line structure layer. The photoresist may be exposed by an exposure source through a reticle containing the desired pattern of the line structure. After development, the pattern of the reticle is transferred to the photoresist to form an etch mask. An etch is employed to pattern the line structure layer using the etch mask to form the line structure. The etch mask, for example, may be a photoresist mask. The etch, for example, is an anisotropic etch, such as a reactive ion etch (RIE). Other etch processes may also be useful. In one embodiment, the etch forms the line structure with the first and second line segments. Alternatively, the line structure may be a non-continuous line structure having, for example, first and second segments. The first and second segments may be electrically connected by a metal contact. If the line structure is integrated into the gate electrode layer, the mask used to pattern the gates may be used to pattern the line structure. Alternatively, separate mask and etch processes may be used to pattern the gates and the line structure.

As shown, the line segments are mirror images of each other. This produces line segments which are about the same length. By providing a meandering design for the line segments, efficient use of the sensor region can be achieved while producing a line structure having the desired resistance. For example, the line structure has a resistance of about 5-50 k$\Omega$. Other resistances may also be useful.

To dope the first and second line segments, separate implants may be used. For example, a first implant using a first implant mask is used to dope the first line segment and a second implant using a second implant mask is used to dope the second line segment. In the case where doping of the line segments is integrated into the S/D implants, the implant masks may be those used for p-type and n-type S/D implants.

A line dielectric layer 358 covers the line structure, filling the gaps. The line dielectric layer provides mechanical support for the thermopile membrane. The line dielectric layer may be a self-planarizing dielectric layer, such as spin-on-glass (SOG). Other types of self-planarizing dielectric materials may also be useful. The dielectric layer may have a top surface which is about 100-400 nm above the top of the line structure. Providing a dielectric layer having other thicknesses over the top of the line structure may also be useful.

A contact 366 is provided to electrically couple the first and second segments. The contact, for example, is a metal contact, such as titanium (Ti) or aluminum (Al). Other types of contacts may also be useful. To form the contact, a contact opening is formed in the dielectric layer to expose the line structure at about the junction of the first and second segments. A metal layer is formed on the substrate and patterned, leaving the contact coupling the first and second segments. The metal layer, for example, may be titanium (Ti) or aluminum (Al) formed by sputtering, plating, or evaporation. Other types of metal layers or forming techniques may also be useful. In other embodiments, the contact may be formed by a damascene technique. For example, a via opening is formed in the dielectric layer. A conductive layer is formed, filling the via opening and covering the dielectric layer. A planarizing process, such as CMP, is performed to form the metal contact in the via opening, connecting the first and second segments of the line structure.

An absorber layer 353 is formed on the substrate, covering the dielectric layer. The absorber layer may be patterned using etch and mask processes. The patterned absorber layer serves as an absorber above the line structure. In one embodiment, the absorber layer is patterned, covering a central portion of the line structure and contact, leaving the leg portions outside the central portion exposed. The absorber layer, for example, absorbs IR radiation. The absorber layer may be a TiN or NiCr layer. The absorber layer, for example, may be formed by sputtering. Other types of absorber layers may also be useful. In one embodiment, the absorber is configured to absorb most of the IR radiation. For example, the absorber may be configured to absorb greater than 85% of IR radiation having a wavelength of 8-14 $\mu$m. Absorbing other wavelengths may also be useful. As shown, the absorber layer is disposed over the contact. The absorber serves as a hot junction of the thermopile. The first end 351 of the first line structure and the second end 352 of the second line structure serve as cold junctions of the thermopile. The leg portions of the line structure uncovered by the absorber provide thermal isolation between the hot and cold junctions.

A protective layer 359 may be provided. The protective layer, for example, covers the MEMS structure. The protective layer protects the MEMS structure from subsequent processes. The protective layer, for example, is a silicon oxide layer formed by CVD. Other types of protective layers may also be useful. The protective layer may be a dielectric layer above the metal contact below the first metal level M1. Other configurations of metal layers and the protective layer may also be useful.

In one embodiment, the protective layer forms an upper portion of the first contact level of the ILD layer disposed below the BEOL dielectric layer. The protective layer, line dielectric layer, and membrane forming the top of the cavity are patterned to form openings 355, separating the legs from the central portion of the line structure. The openings provide access to the cavity. This enables removal of the sacrificial fill in the cavity, releasing the line structure. In one embodiment, one of the metal layers in the BEOL dielectric may be patterned to serve as a line structure release etch mask for patterning the various layers to form openings 355 to release the line structure. For example, the metal layer may be M1 or M2. Other metal layers may also be used to serve as an etch mask for the release etch process.

Figure 3C:
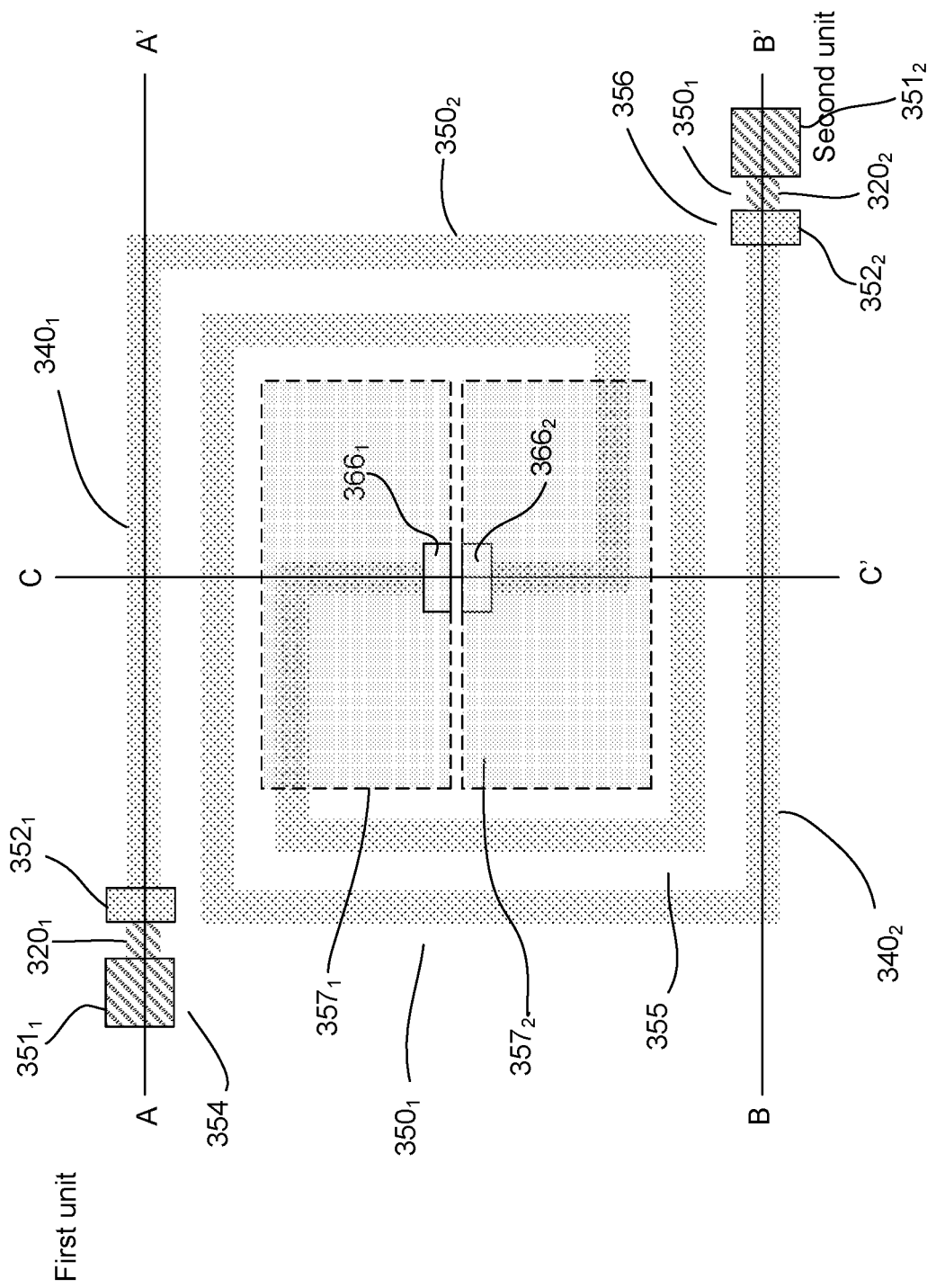
Figure 3D:
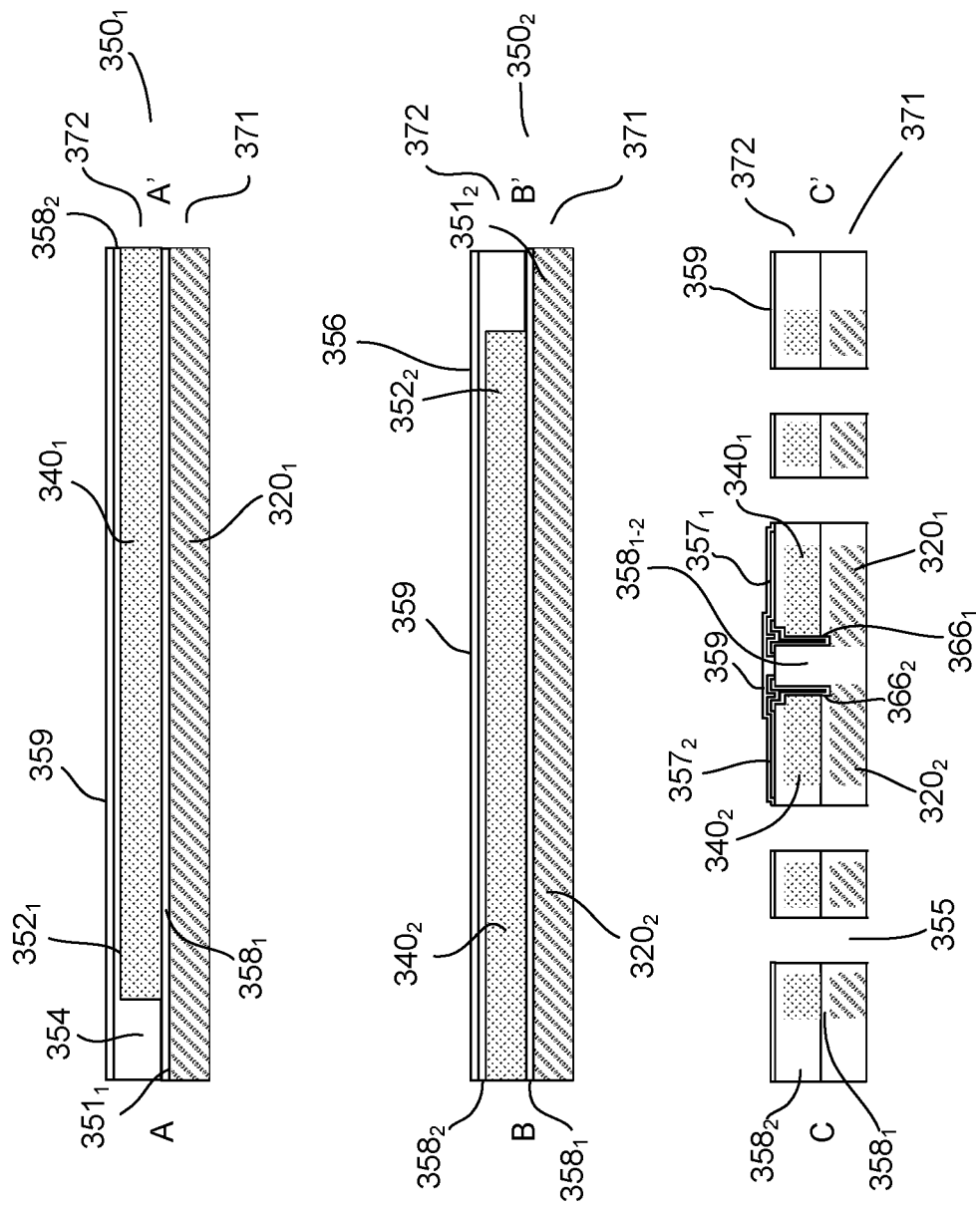

FIG. 3c shows a top view of another embodiment a MEMS structure 350 and FIG. 3d shows cross-sectional views of the MEMS structure based on the top view of the MEMS structure of FIG. 3c. The cross-sectional views are along A-A', B-B', and C-C'. The MEMS structure is a line structure forming a thermopile which serves as a thermoelectric IR sensor. The top view excludes the protective layer protecting the line structure. The line structure is similar to that described in FIGS. 3a-3b. Common elements may not be described or described in detail. The line structure is disposed on the membrane which structures the cavity.

The line structure has more meanderings or turns to increase the length of the segments which occupy the surface of the membrane as compared to FIGS. 3a-3b. This increases the resistance of the line structure. Other designs for the line segments to increase the length or to tailor the lengths of the segments to achieve the desired resistance may also be useful.

In one embodiment, the MEMS structure is a multi-line unit line structure with N number of line units that are coupled in series to form a thermoelectric IR sensor. As shown, the MEMS structure includes first and second line units $350_1$ and $350_2$ (e.g., N=2). Providing other numbers of line units for the multi-line unit line structure may also be useful. For example, a multi-line unit line structure may have 2-4 (N=2-4) line units. In one embodiment, a multi-line unit line structure includes an even number of line units, such as N=2M, where M is a whole number. Preferably, M is equal to 1-2 (N=2 and 4). Providing odd number of line units for a multi-line unit line structure may also be useful. Other numbers of line units may also be useful.

As discussed, the line structure shown includes first and second line units. In one embodiment, a line unit of the multi-line unit line structure is a stacked line unit. The first and second stacked line units may be disposed adjacent to each other on the dielectric layer within the sensor region. As shown, a center of the sensor region serves as contact regions for the first and second contacts $366_1$ and $366_2$ of the first and second line units $350_1$ and $350_2$. The line units at the contact region are separated by dielectric layers $358_{1-2}$.

A stacked line unit includes a first segment ($320_1$ or $320_2$) disposed in a first line level 371 and a second line segment ($340_1$ or $340_2$) disposed in a second line level 372. The first and second line levels may be separated by a first dielectric layer $358_1$. For example, the second line segment of a line unit in the second line level is overlaid over the first line segment of the line unit in the first line level. The first and second line segments of a line unit are separated by the first interline level dielectric layer $358_1$. The gaps of the line segments are filled by the first and second interline level dielectric layers $358_{1-2}$.

A contact ($366_1$ or $366_2$) connects the first line segment in the first line level to the second line segment in the second line level. The first and second contacts are formed in the first and second interline level dielectric layers. For example, the contacts are disposed in contact vias. A contact via for a line unit, for example, may overlap the first and second line segments, exposing them. A contact, such as Ti or Al, lines the contact via, connecting the exposed first and second line segments.

In one embodiment, the first line segments of the line units are doped with first polarity type dopants and the second line segments of the line units are doped with second polarity type dopants. For example, the first segments of the line units in the first level are doped with first polarity type dopants and the second segments of the line units in the second level are doped with second polarity type dopants. The first polarity type may be n-type and the second polarity type may be p-type. Other configurations of doped line segments may also be useful.

As shown, the first line unit has first and second ends $351_1$ and $352_1$ which are located at a diagonally opposite corner of the sensor region than the first and second ends $351_2$ and $352_2$ of the second line unit. The line units each meander throughout the sensor region from opposite diagonal corners towards the contact region. Other configurations of or meandering patterns for the line units may also be useful. For example, the first stacked line unit may occupy about one-half of the sensor region and the second stacked line unit may occupy about the other half of the sensor region.

First and second absorber layers $357_1$ and $357_2$ are disposed on the substrate over the second line dielectric layer $358_2$. As shown, the layers cover a central portion of the sensor region, including the contact regions of the first and second contacts. For example, the first absorber covers the central portion of the sensor region and first contact region of the first line unit and the second absorber covers the central portion of the sensor region and the second contact region. The first and second absorber layers, since they are conductive, are distinct absorber layers.

The absorber layers, for example, absorb IR radiation. The absorber layers may be TiN or NiCr layers. Other types of absorber layers may also be useful. In one embodiment, the absorber is configured to absorb most of the IR radiation. For example, the absorber may be configured to absorb greater than 85% of IR radiation having a wavelength of 8-14 μm. Absorbing other wavelengths may also be useful. As shown, the absorber layer is disposed over the contact. The absorber serves as a hot junction of the thermopile. The first ends $351_{1-2}$ of the first line segments of the line units and the second ends $352_{1-2}$ of the second line segments of the line units serve as cold junctions of the thermopile. The leg portions of the line segments uncovered by the absorber provide thermal isolation between the hot and cold junctions.

The process for forming the stacked line structure may include, for example, forming a first line segment layer on the substrate, including in the sensor region over the sensor membrane dielectric layer and over the cavity. In one embodiment, a polysilicon layer is formed on the substrate by CVD. The first line segment layer is patterned to form distinct first line segments $320_1$ and $320_2$ of the first and second line units. Patterning may be achieved using mask and etch techniques, such as a resist mask and RIE. The first segments may be doped with first polarity type dopants, such as n-type dopants. Doping the segments may be achieved by selectively implanting first polarity type dopants using an implant mask. A first interlevel line dielectric layer $758_1$ may be formed on the substrate. The first interlevel dielectric layer lines the line segments and surface of the sensor membrane layer. The first interlevel dielectric layer, for example, lines the line segments without filling the gaps therebetween. The first interlevel dielectric layer may be a silicon oxide layer formed by CVD. Providing a SOG dielectric layer may also be useful.

A second line segment layer, such as polysilicon is formed on the first interlevel line dielectric layer by CVD and patterned to form distinct second line segments $340_1$ and $340_2$ of the first and second line units using mask and etch techniques. The second line segments, for example, overlay the first line segments and are separated by the first interlevel line dielectric layer. The second line segments are doped with second polarity type dopants, such as p-type dopants. The second line segments may be doped by implanting second polarity type dopants using an implant mask.

A second interlevel line dielectric liner $358_2$ is formed on the substrate. In one embodiment, the second interlevel line dielectric layer may be a SOG layer, filling the gaps and forming a planar top surface over the second line segments. First and second contact vias are formed in the interlevel line dielectric layers in the contact region. The first contact via exposes first and second segments of the first line unit and the second contact via exposes the first and second segments of the second line unit. The contact vias may be formed by mask and etch techniques. A contact layer, such as Ti or Al is deposited on the substrate. Other types of metal contact layers may also be useful. The contact layer, for example, may be deposited by sputtering and lines the second interlevel line dielectric layer and contact vias. In one embodiment, the contact layer lines the contact vias without filling them. The contact layer is patterned by mask and etch techniques to form first and second contacts $366_1$ and $366_2$ of the first and second line units. In other embodiment, a metal contact may be formed, filling the via openings. A polishing process, such as CMP, may be performed to remove excess metal material, leaving contacts in the contact vias.

An absorber layer is formed on the substrate, covering the second interlevel line dielectric layer and contacts. The absorber layer, for example, is a conductive layer formed by sputtering. The absorber layer is patterned to form distinct first and second absorber layers $357_1$ and $357_2$ in the central portion of the sensor region using mask and etch techniques. In the case the contacts line the vias without filling them, the absorber layer may serve to fill the contact vias over the contacts.

A protective layer 359 may be provided. The protective layer, for example, covers the MEMS structure. The protective layer protects the MEMS structure from subsequent processes. The protective layer, for example, is a silicon oxide layer formed by CVD. Other types of protective layers may also be useful.

The protective layer, line dielectric layer and membrane forming the top of the cavity are patterned to form openings 355, separating the legs from the central portion of the line structure. For example, a patterning process is performed to release the line units of the line structure. The openings provide access to the cavity. This enables removal of the sacrificial fill in the cavity, releasing the line structure. The mask of the patterning process, in one embodiment, may be served by a metal layer of the BEOL dielectric. For example, the mask may be served by M1 or M2 of the BEOL dielectric. In other embodiments, the mask may be a patterned resist mask.

As discussed, the first and second line units $350_1$ and $350_2$ are coupled in series. In one embodiment, the second end $352_1$ of the first line unit is coupled to the first end $351_2$ of the second line unit. The series connection in the line unit may be facilitated by via contacts in the interlevel line dielectric layers which are coupled to the second end of the first line unit and the first end of the second line unit. A metal line may be provided in the BEOL dielectric layer, such as in M1, to connect the via contacts. Other configurations of providing the series connection of the line units may also be useful.

As described, the line segments of the line units are disposed in the same line level and are doped with the same dopant type. This allows the line segments of the line units to be doped using a single implant process (e.g., same implant process using a single implant mask). In alternative embodiments, the line segments of the line units in the same line level may be doped with opposite polarity type dopants. In such cases, the line segments are doped by separate implant processes (e.g., different implant processes using different implant masks). As such, providing line segments of the line units which have the same doping type in the same line level reduces the need to use additional implant masks. Other configurations of line segments for the line units may also be useful.

As described, the MEMS structure includes 2 line units which are stacked and coupled in series. Stacking other numbers of line units which are coupled in series may also be useful. Preferably, the line structures of the stack line units have similar designs. However, it is understood that this is not necessary. In addition, the line units or structures may have layouts other than that described in FIGS. 3a-d.

Figure 3E:
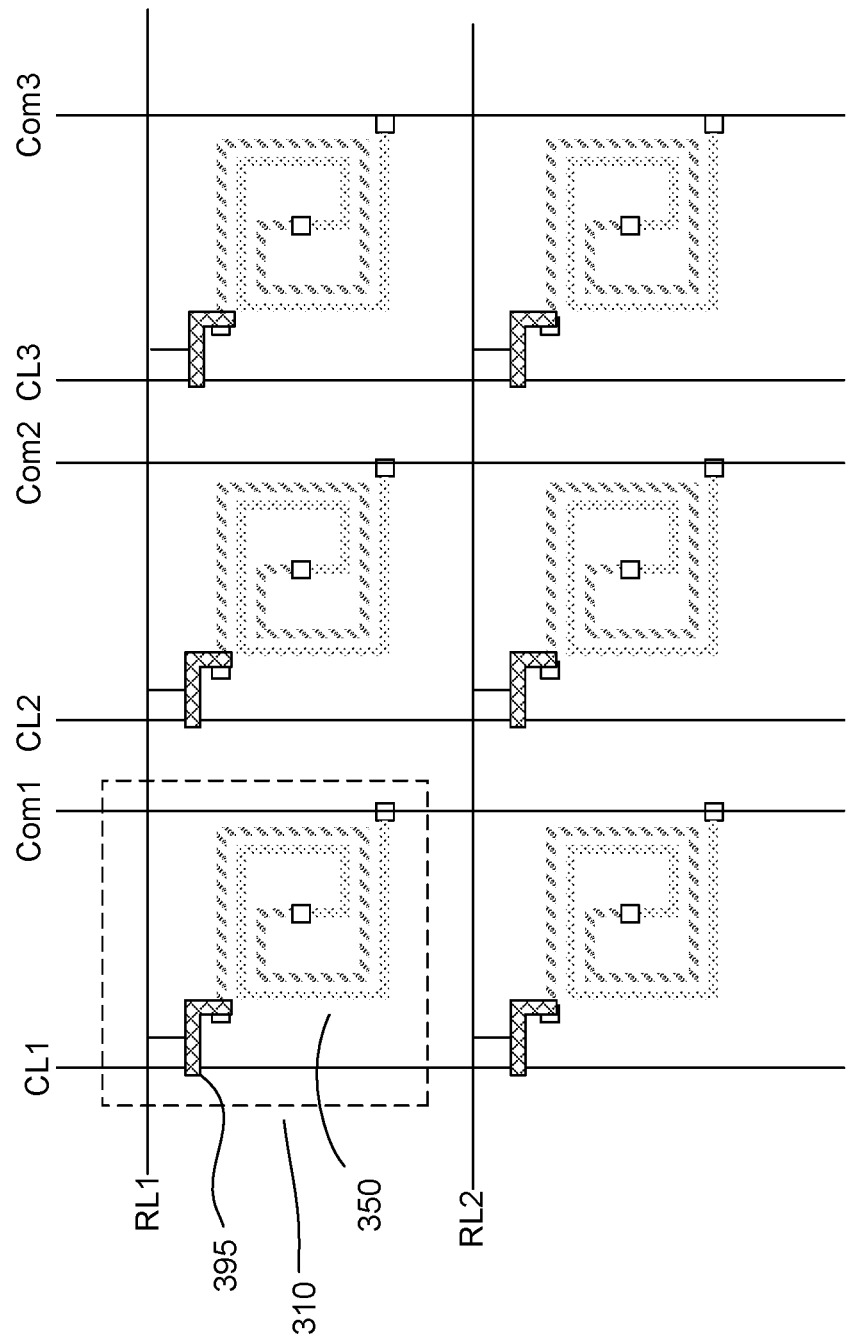
FIG. 3e shows an exemplary layout of a 2×3 sensor arrays.

FIG. 3e shows a sensor array 304. The sensor array includes a plurality of sensor cells 310. A sensor cell includes a switch coupled to a MEMS structure, such as a line structure or structures as described in FIGS. 3a-d. Common elements may not be described or described in detail.

The sensor cells are configured to form an array having Y rows and Z columns. A sensor cell corresponds to a pixel of the sensor array. The sensor cells are coupled in a row direction by row lines ($RL_m$) and in the column direction by column lines ($CL_n$). A sensor cell may correspond to a pixel. Additionally, common lines (Coms) are also used to couple the sensor cells in each column. For example, each column of sensors is coupled to a respective Com (e.g., $Com_1$, $Com_2$ or $Com_3$). As shown, the array includes a 2×3 array (M=2 and N=3). For example, the sensor cells are arranged in 2 rows ($RL_1$ and $RL_2$) and 3 columns ($CL_1$, $CL_2$ and $CL_3$). Other sized arrays may also be useful. For example, the sensor array may be a 32×32 or a 80×62 array.

The pixels of the sensor array may include a plurality of sensors arranged in a matrix on the substrate. For example, each pixel may include a sensor region and a CMOS switching or connection region. The sensor regions are disposed in, for example, a sensor array region of the substrate. For example, the sensor array region includes a plurality of sensor regions corresponding to sensor pixels.

In one embodiment, a first terminal of the MEMS structure of a sensor cell is coupled to the switch 395 while a second terminal is coupled to a common line (Com). As shown, each column of sensor cells is coupled to a respective Com (e.g., $Com_1$, $Com_2$, and $Com_3$). A switch may be a transistor having first and second S/D terminals and a gate or control terminal. For example, a first S/D terminal of the switch is coupled to the first terminal of the MEMS structure and the second S/D terminal is coupled to a CL. The RL is coupled to a gate or control terminal of the switch. In one embodiment, the n-type terminal of the sensor cell is coupled to Com and the p-type terminal of the sensor cell is coupled to CL. Other configurations of coupling the sensor cell to CL and Com may also be useful. An RL can be selected to select a row of sensor cells. A CL is activated to select a column of sensor cells. The selected cell is the intersection of the selected RL and selected CL. The interconnections between the CMOS components and sensor pixels may be achieved through the ILD and IMD levels of the BEOL dielectric.

In one embodiment, the sensor array is configured to read out a row of sensor cells or pixels. For example, the pixels of the array are read out one row at a time. In one embodiment, an RL of the array is selected. This selects a row of pixels. CLs are then selected, causing the pixels of the selected RL to be readout. In one embodiment, the array is configured to read out one row of pixels at a time, starting from the first row to the last. The information readout is stored in memory. An image or one frame of the imager will be produced once all pixels are read out or once all rows have been scanned through. For example, information stored in memory read out from the pixels may be reconstructed to form an image.

In the case of the 2×3 array in FIG. 3e, scanning the pixels to form an image may include selecting $RL_1$ (the first row) to select the pixels coupled to $RL_1$. After $RL_1$ is selected, $CL_1$, $CL_2$ and $CL_3$ are selected, causing the pixels coupled to $RL_1$ to be readout. The information of the pixels coupled to $RL_1$ is stored in memory. The next or second row $RL_2$ is selected to select the pixels of $RL_2$. After $RL_2$ is selected, $CL_1$, $CL_2$ and $CL_3$ are selected, causing the pixels coupled to $RL_2$ to be readout. The information of the pixels coupled to $RL_2$ is stored in memory. Since $RL_2$ is the final row of the array, the information of the pixels is reconstructed to form an image or a frame of the imager. Numerous frames may be collected by repeating the sensing, readout and reconstruction process. For example, an image or a frame is time-dependent.

Select logic and output logic components may be employed to select the cell for outputting information contained. The logic components may be CMOS transistors or components in the CMOS region of the device. Other logic components, including memory and reconstruction logic components, may be included to store and reconstruct information to form an image or images. In one embodiment, the memory and reconstruction logic components may be off-chip logic. Providing these logic components as on-chip logic components or a combination of on-chip or off-chip components may also be useful.

Figure 4A:
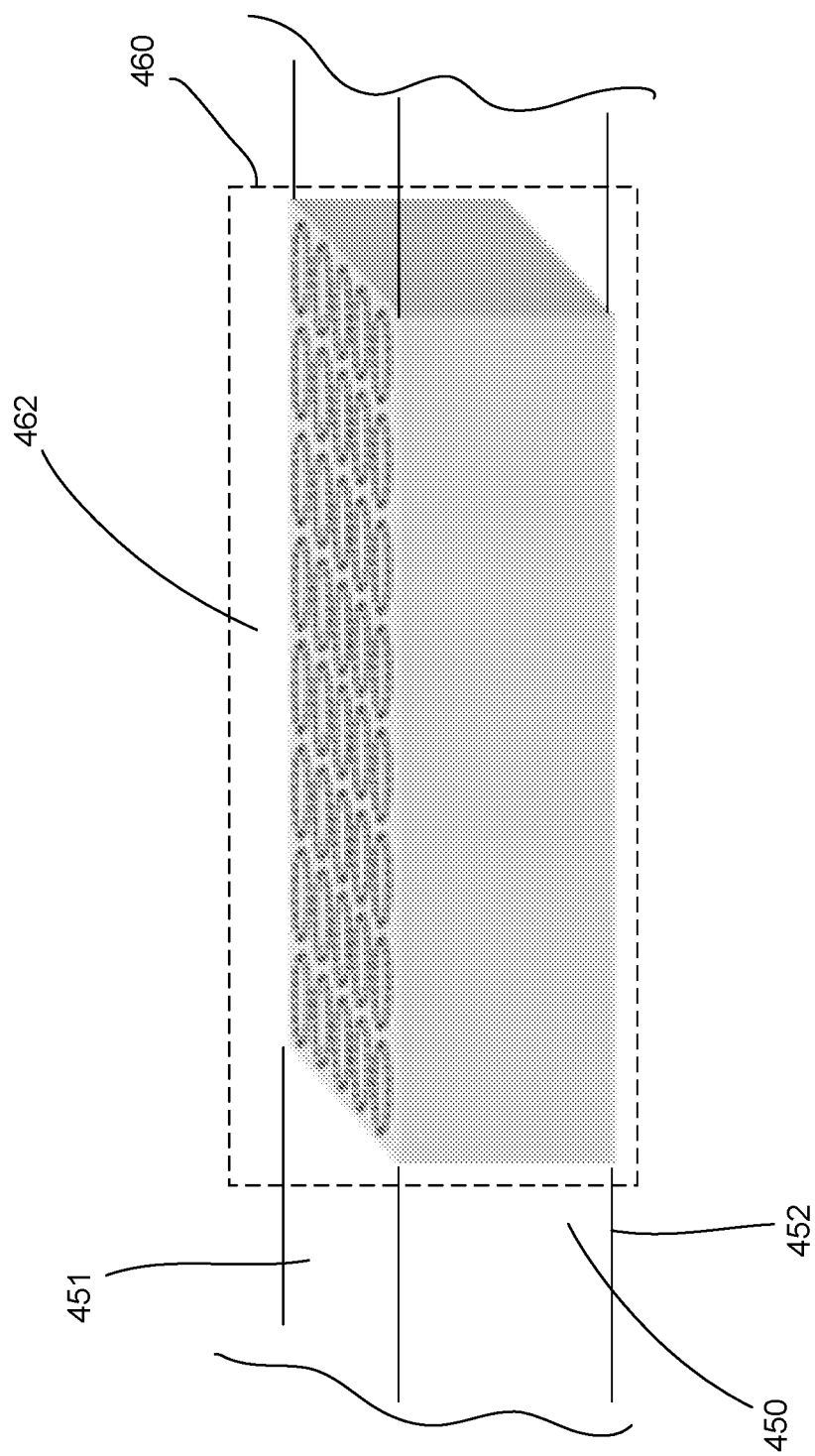
FIGS. 4a-c show various embodiments of a focusing system.
Figure 4B:
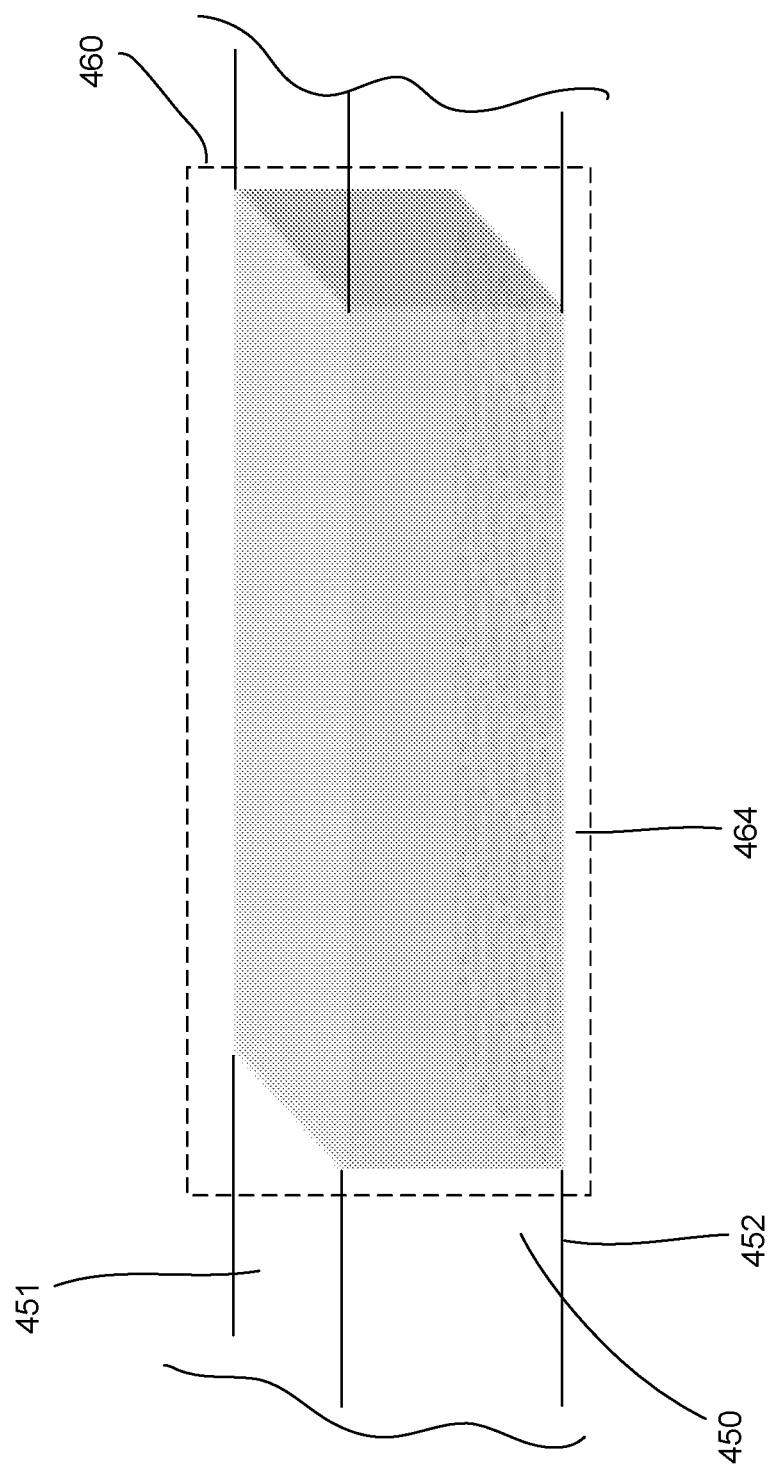
Figure 4C:
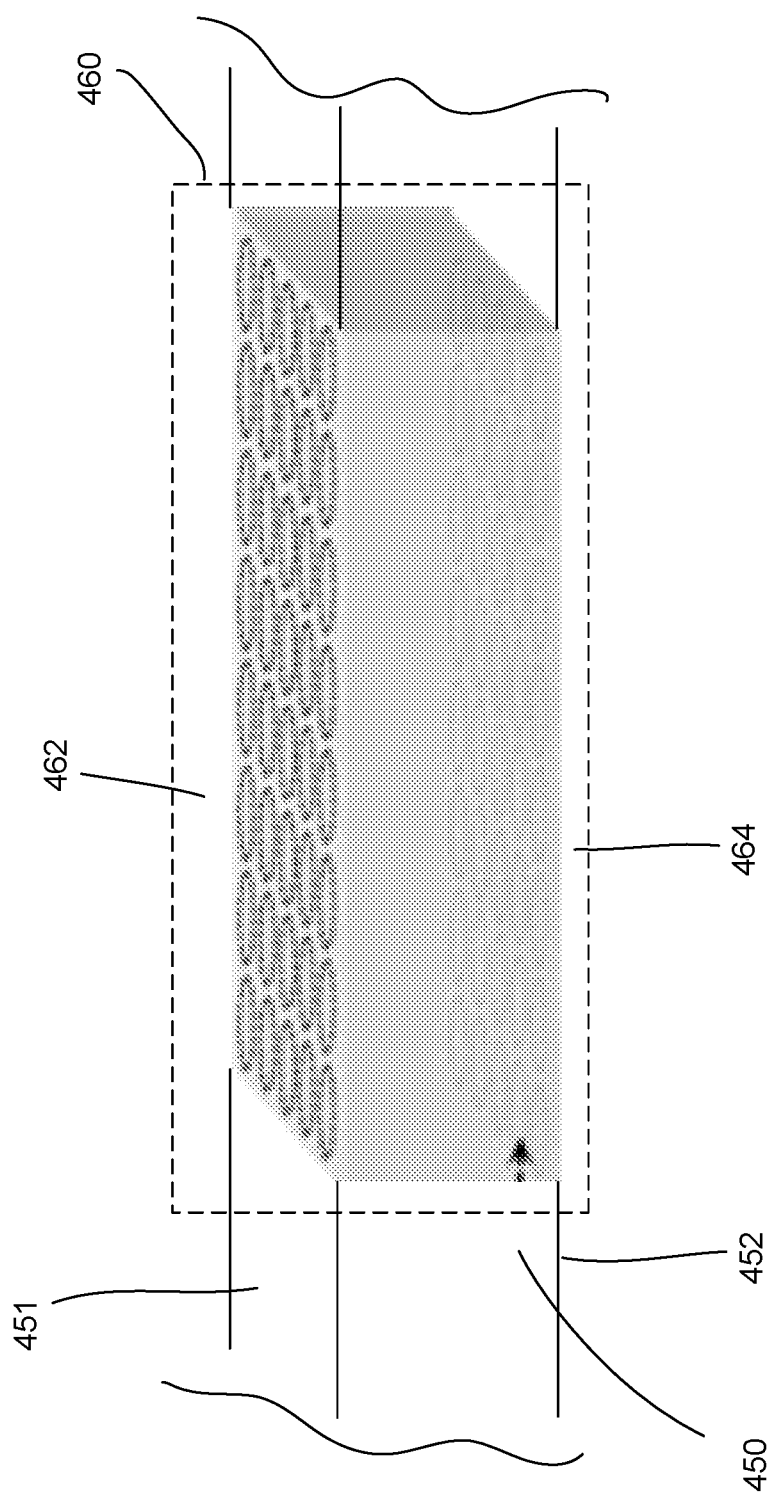

FIGS. 4a-c show various embodiments of a focusing region 460 of a cap 450. The focusing region includes an integrated focusing system. For example, the focusing system is integrated into the cap used to encapsulate the device. However, for purposes of simplifying the discussion, only the focusing region of the cap with the focusing system is shown.

As discussed, the cap is transparent to infrared radiation. For example, the cap is capable of transmitting infrared radiation to the detectors. The cap, for example, may be a silicon cap. Other types of caps may also be used. For example, the cap wafer may be a germanium wafer or a glass wafer. The cap may have a planar bottom cap surface 452. In some cases, the bottom cap surface may include a cap recess. The cap recess, for example, may be located in the focusing region with the focusing system or in the non-focusing region. In yet other embodiments, the bottom cap surface may include multiple recesses. For example, a shallow recess may be provided within the bonding region of the cap and a deep recess may also be provided. The deep recess may be provided in the focusing region or the non-focusing region. Other configurations of the bottom cap surface may also be useful.

As shown in FIG. 4a, the focusing system includes top lens module 462 on a top surface 451 of the cap. The top lens module is a metalens module. The metalens improves focusing IR radiation to the IR detectors in the MEMS region of the device. To increase the field of view of the detectors, the lens module may occupy a larger area than that of the detectors. The focusing system may include an anti-reflection module on a bottom cap surface 452 of the focusing region. The anti-reflection module improves the transmission of IR radiation through the cap.

Referring to FIG. 4b, the focusing system includes a bottom lens module 464 on the bottom cap surface 452. The bottom lens module is a metalens module for improving focusing IR radiation to the IR detectors in the MEMS region of the device. To increase the field of view of the detectors, the lens module may occupy a larger area than that of the detectors. The focusing system may include an anti-reflection module on a top cap surface 451 to improve the transmission of IR radiation through the cap.

In FIG. 4c, the focusing system includes a top lens module 462 on the top cap surface 451 and a bottom lens module 464 on the bottom cap surface 452. For example, the top lens module is configured to focus IR radiation to the bottom lens module and the bottom lens module is configured to focus IR radiation to the detectors in the MEMS region. The bottom lens module may be configured to have the same surface area as the detectors while the top lens module may be configured to have a larger surface area than the detectors to increase the FOV of the detectors. In other embodiments, both the bottom and top lens modules have larger surface areas than the detectors, with the top lens module being larger than the bottom lens module. This configuration may further increase the FOV of the detectors.

Figure 5A:
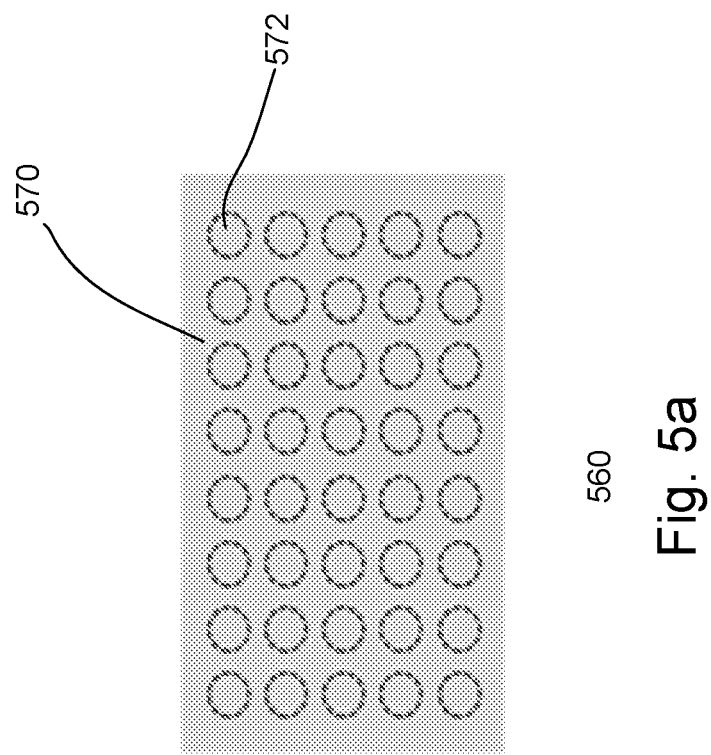
FIGS. 5a-b show lens modules with a metalens array and a global metalens.
Figure 5B:
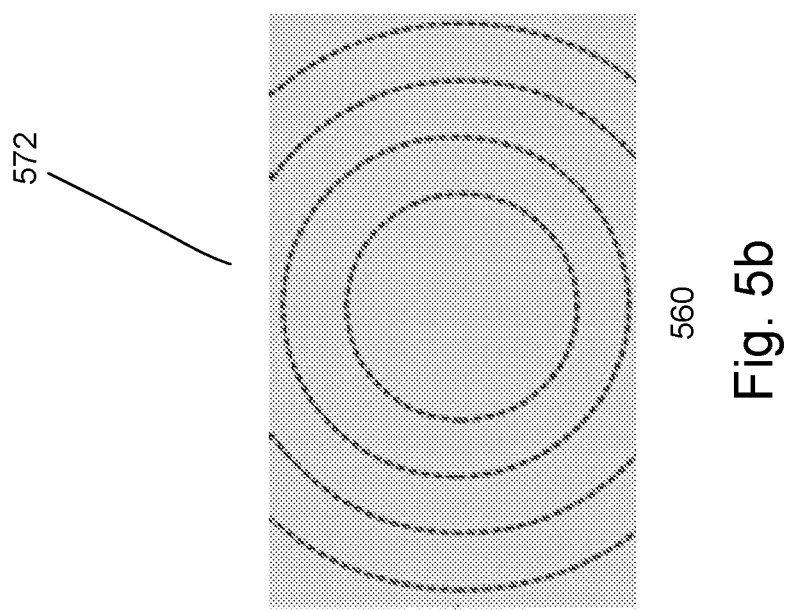

FIGS. 5a-b show embodiments of metalens modules 560 with different formats. Referring to FIG. 5a, the metalens module includes a lens array format. The lens array, for example, includes metalenses 572 arranged in a matrix. For example, the metalenses are arranged in rows and columns of lenses separated by a space 570. The lens array is configured to correspond to the detector array. In one embodiment, the lenses of the lens array have a 1:1 correspondence with the detectors of the detector array. For example, a lens of the lens array is configured to focus IR radiation to its respective detector of the detector array. Other configurations of the lens array may also be useful. For example, the lenses of the lens array may not have a 1:1 correlation with the detectors.

In FIG. 5b. a metalens module 560 with a global metalens 572 is shown. The global metalens serves to focus IR radiation to the detectors of the detector array. For example, the metalens module includes a single lens configured to focus IR radiation to the detectors of the detector array. Depending on the dimensions of the focusing region, portions of the global annulus metalens may be cut off. For example, as shown, a rectangular-shaped focusing region may have upper and lower portions of the global metalens cut off. Other configurations of the global metalens may also be useful.

As described, a cap or a cascaded cap may include more than one metalens module. In such cases, the metalens modules may be the same type or different types. For example, the metalens modules may include lens array modules, global lens modules, or a combination thereof.

Figure 6A:
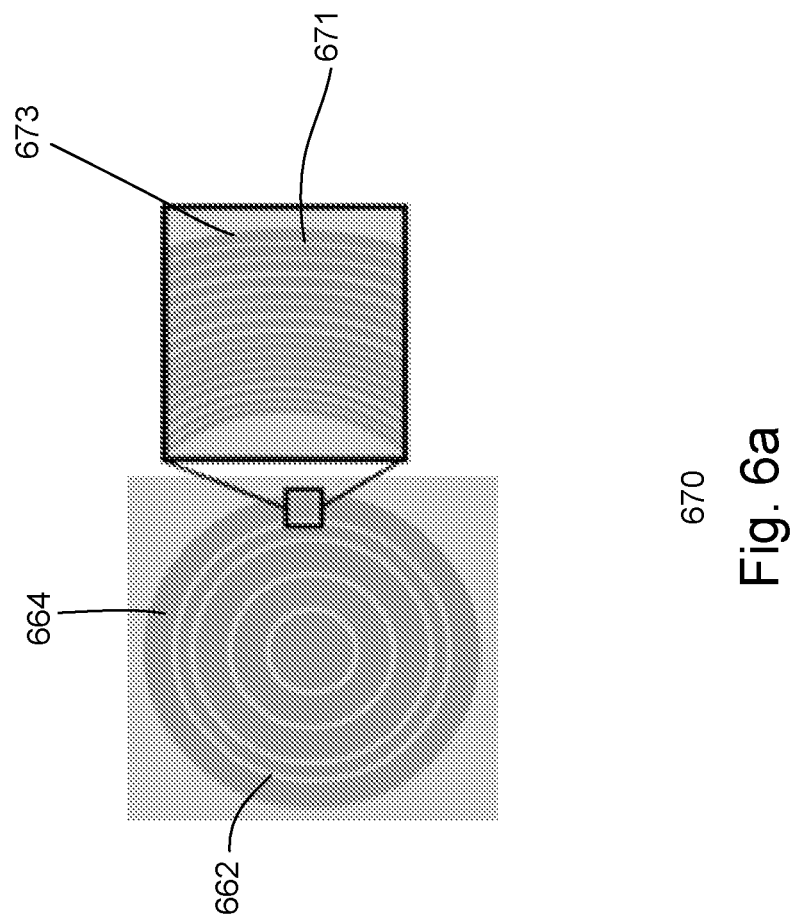
Figure 6B:
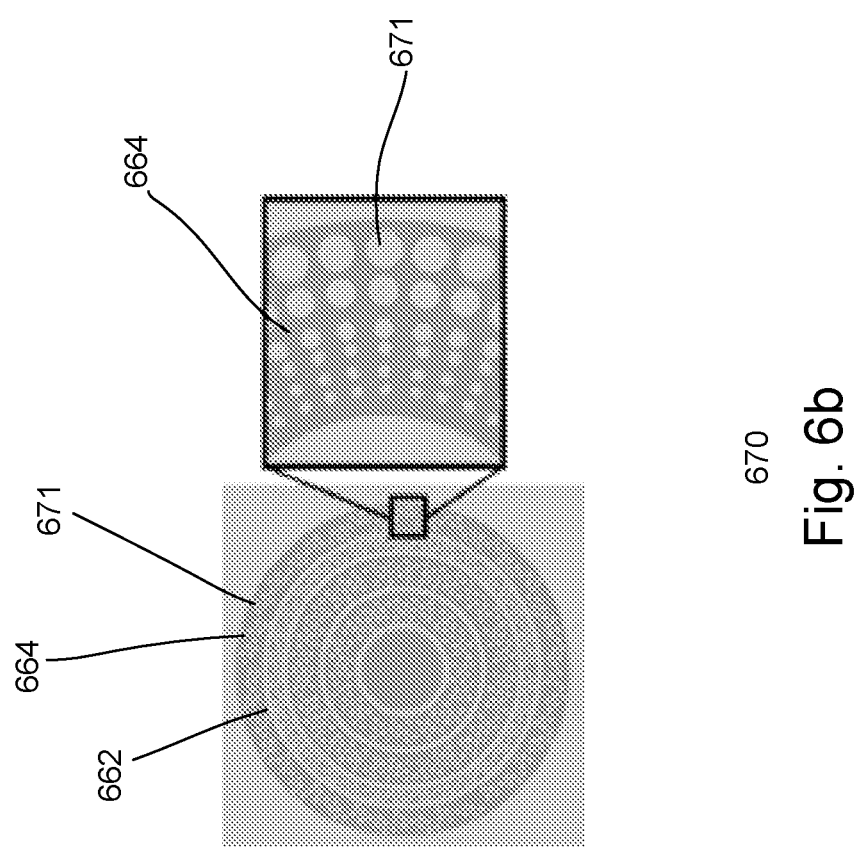

FIGS. 6a-c shows various embodiments of a metalens 670 for a metalens array. As discussed, unit cells may be configured to form a concentric annulus metalens. For example, the metasurface structures may be configured to form concentric annuluses, serving as a metalens. The annulus metalens, in one embodiment, includes concentric ring structures 664, with two adjacent concentric ring structures separated by a concentric annulus or space 662. The ring structures may be configured to focus IR radiation as desired. For example, the ring structures may be configured with the metasurface structures as desired. For example, the structures may be selected based on purpose, as well as the dimensions of the structures and spaces. The dimensions of the ring structures and spaces may be selected based on design requirements. For example, the widths of the ring structures may be the same, different, or a combination thereof, and the widths of the spaces may the same, different, or a combination thereof. Furthermore, it is understood that the unit cells need not be identical. For example, unit cells of a ring structure may include different sized structures or different types of structures. Furthermore, the different ring structures of a lens may be the same, similar or different from each other.

Referring to FIG. 6a, an annulus lens with unit cells having metasurface structures configured as gratings are shown. The annulus lens includes primary ring structures 664 separated by annuluses spaces 662. As shown, a primary ring structure includes a plurality of secondary ring structures 673 separated by secondary annuluses 671, creating simple continuous ringed shape gratings. Numerous unit cells may be configured to form the secondary ring structures and annuluses. The dimensions of the secondary ring structures and secondary annuluses may be selected based on design requirements. For example, the widths of the secondary ring structures may be the same, different, or a combination thereof, and the widths of the secondary annuluses may the same, different, or a combination thereof.

As shown in FIG. 6b, an annulus lens with unit cells having metasurface structures configured as nano-voids are shown. The annulus lens includes primary ring structures 664 separated by annuluses spaces 662. As shown, a primary ring structure includes nano-voids 671. In one embodiment, the nano-voids may be distributed as void rings within the primary ring structure. For example, the voids form secondary rings with voids. As shown, the voids of a primary ring are configured to be progressively smaller with each secondary ring towards the center of the lens. Other configurations of voids may also be useful.

In FIG. 6c, an annulus lens with unit cells having metasurface structures configured as nano-antennas are shown. The annulus lens includes primary ring structures 664 separated by annuluses spaces 662. As shown, a primary ring structure includes nano-antennas 675. In one embodiment, the nano-antennas may be distributed as antenna rings within the primary ring structure. For example, the antennas form secondary rings. As shown, the antennas of a primary ring are configured to be progressively smaller with each secondary ring towards the center of the lens. Other configurations of antennas may also be useful.

Figure 7A:
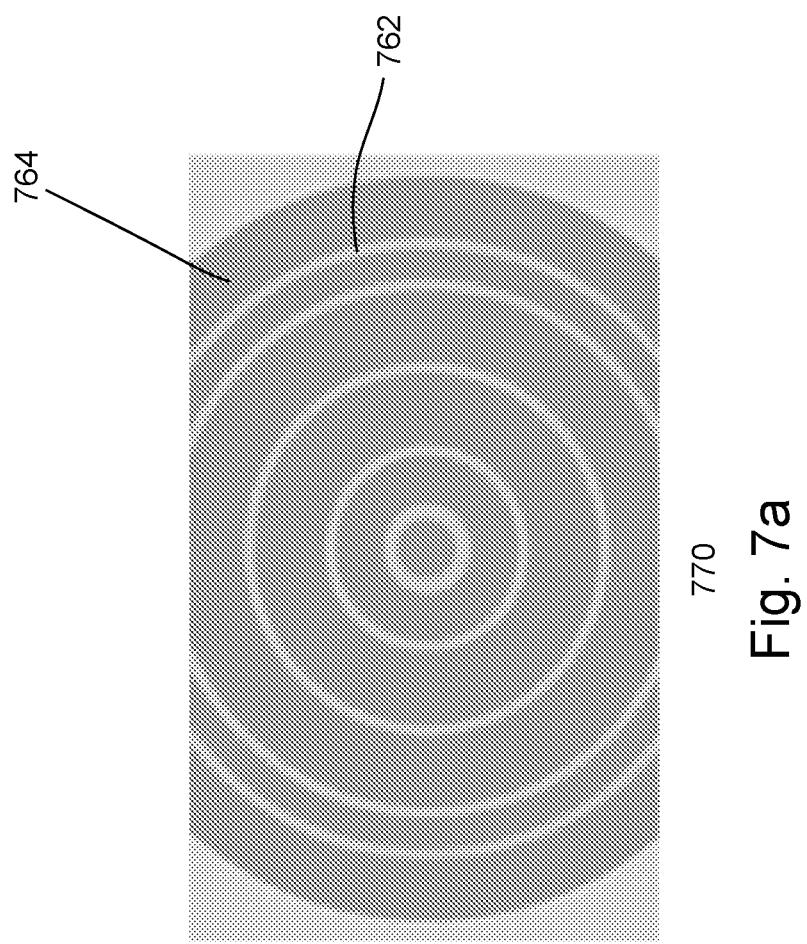
Figure 7B:
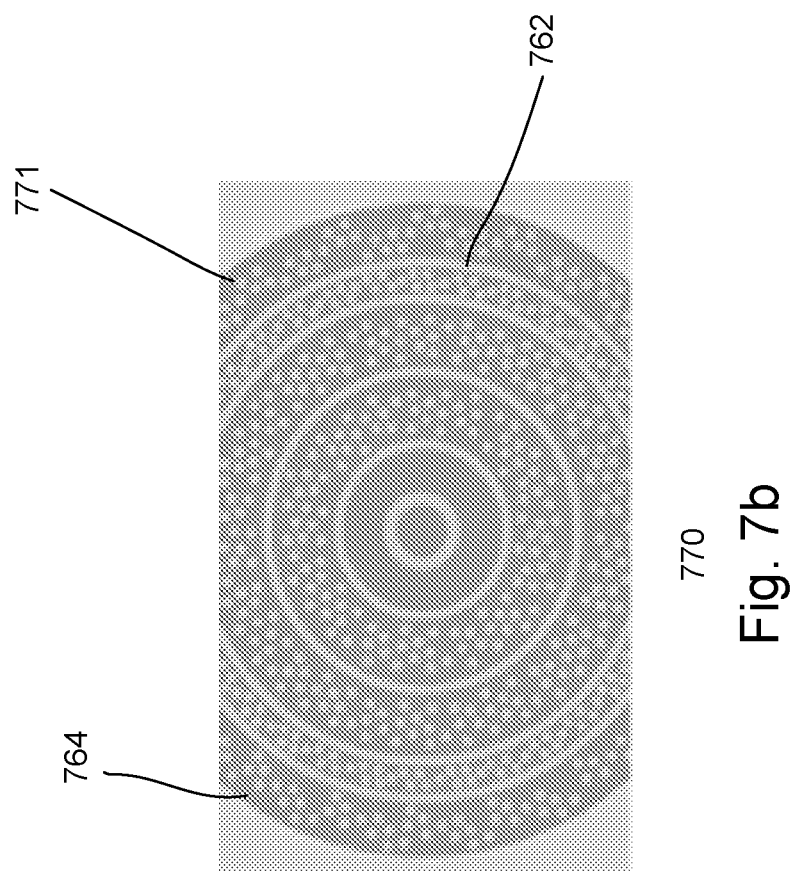

FIGS. 7a-c shows various embodiments of a global metalens 770 of a lens module. The global metalens is similar to a metalens of a metalens array, as described in FIGS. 6a-c. For example, the global metalens is a global concentric annulus metalens which occupies the area of the focusing region. The global annulus metalens, in one embodiment, includes concentric ring structures 764, with two adjacent concentric ring structures separated by a concentric annulus or space 762. The ring structures may be configured to focus IR radiation as desired. For example, the ring structures may be configured with the metasurface structures as desired. For example, the structures may be selected based on purpose, as well as the dimensions of the structures and spaces. The dimensions of the ring structures and spaces may be selected based on design requirements. For example, the widths of the ring structures may be the same, different, or a combination thereof, and the widths of the spaces may the same, different, or a combination thereof. Furthermore, it is understood that the unit cells need not be identical. For example, unit cells of a ring structure may include different sized structures or different types of structures. Furthermore, the different ring structures of a lens may be the same, similar or different from each other.

Depending on the dimensions of the focusing region, portions of the global annulus metalens may be cut off. For example, as shown, a rectangular-shaped focusing region may have upper and lower portions of the global metalens cut off. Other configurations of the global metalens may also be useful.

Referring to FIG. 7a, a global annulus lens with unit cells having metasurface structures configured as gratings are shown. The annulus lens includes primary ring structures 764 separated by annuluses spaces 762. A primary ring structure may include a plurality of secondary ring structures separated by secondary annuluses, creating simple continuous ringed shape gratings. Numerous unit cells may be configured to form the secondary ring structures and annuluses. The dimensions of the secondary ring structures and secondary annuluses may be selected based on design requirements. For example, the widths of the secondary ring structures may be the same, different, or a combination thereof, and the widths of the secondary annuluses may the same, different, or a combination thereof.

In FIG. 7b, an annulus lens with unit cells having metasurface structures configured as nano-voids are shown. The annulus lens includes primary ring structures 764 separated by annuluses spaces 762. As shown, a primary ring structure includes nano-voids 771. In one embodiment, the nano-voids may be distributed as void rings within the primary ring structure. For example, the voids form secondary rings with voids. As shown, the voids of a primary ring are configured to be progressively smaller with each secondary ring towards the center of the lens. Other configurations of voids may also be useful.

Referring to FIG. 7c, an annulus lens with unit cells having metasurface structures configured as nano-antennas are shown. The annulus lens includes primary ring structures 764 separated by annuluses spaces 762. As shown, a primary ring structure includes nano-antennas 775. In one embodiment, the nano-antennas may be distributed as antenna rings within the primary ring structure. For example, the antennas form secondary rings. As shown, the antennas of a primary ring are configured to be progressively smaller with each secondary ring towards the center of the lens. Other configurations of antennas may also be useful.

Figure 8A:
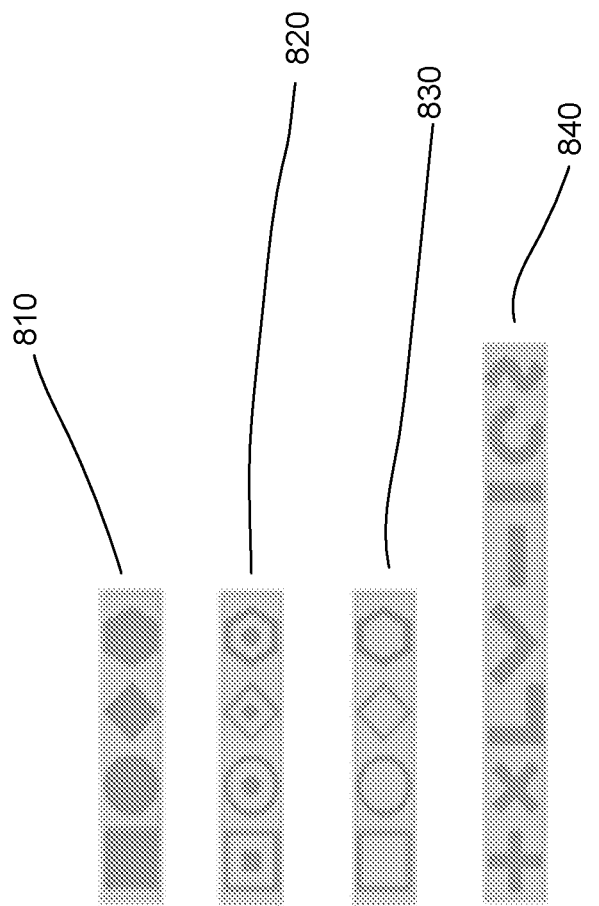
FIGS. 8a-b show various metasurface structures and constitutions of unit cells.
Figure 8B:
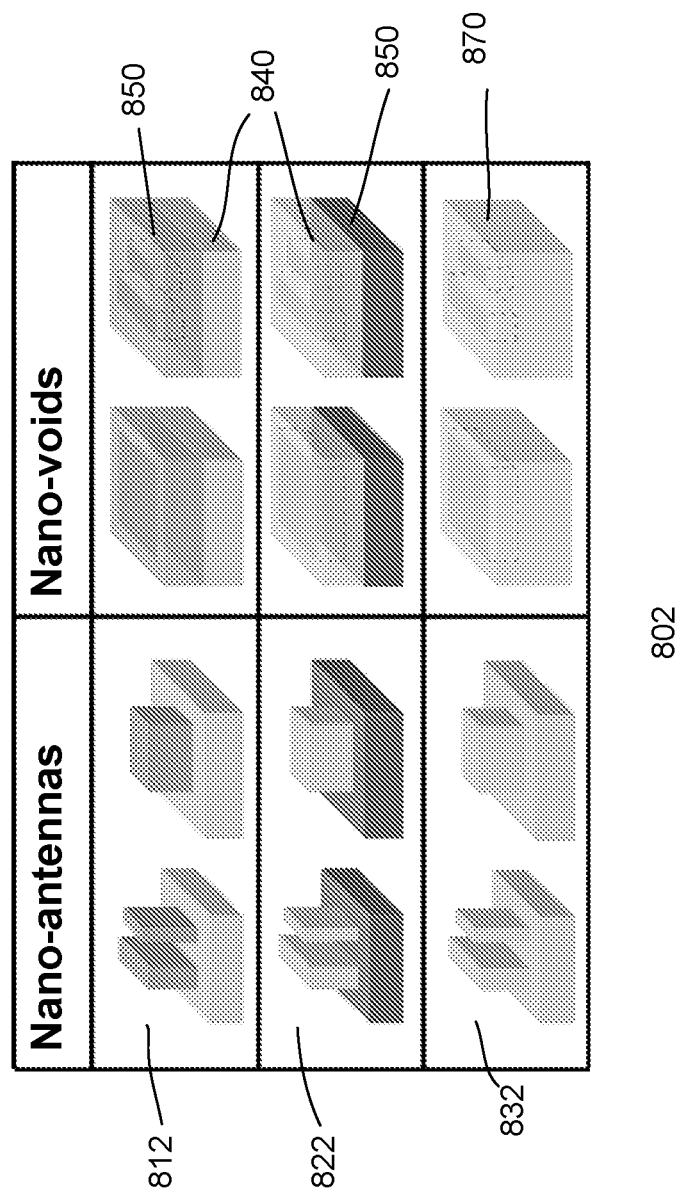

FIGS. 8a-b shows various metasurface structures and constitutions of unit cells. Referring to FIG. 8a, metasurface structures 800 may be solid metasurface structures 810, concentric metasurface structures 820, annular metasurface structures 830, or miscellaneous metasurface structures 840.

As shown, solid metasurface structures include rectangular-shaped structures, circular-shaped structures, diamond-shaped structures, and hexagonal-shaped structures. Other geometrically shaped structures may also be used as solid metasurface structures. The solid shaped structures may serve as nano-antenna structures.

As for concentric metasurface structures, they may include concentric rectangular-shaped structures separated by a space, concentric circular-shaped structures separated by a space, concentric diamond-shaped structures separated by a space, or concentric hexagonal-shaped structures separated by a space. Although shown are two concentric similar-shaped structures, it is understood that the concentric structures need not have similar shapes as well as other numbers of concentric structures. The concentric metasurface structures may serve as nano-antennas with voids.

Annular metasurface structures may include rectangular-shaped, circular-shaped, diamond-shaped, or hexagonal-shaped annular structures. Other geometrically-shaped annular structures may also be useful. The annular metasurface structures may serve as nano-antennas with voids or nano-voids.

Miscellaneous metasurface structures may include any shape. For example, miscellaneous metasurface structures may have various shapes as shown. For example, the shape of a miscellaneous metasurface structure may include a plus sign, a multiply sign, a L, a V, a minus sign, and an I shape, an open circle, or a zig-zag line. Other miscellaneous shapes may also be useful. The miscellaneous shapes may serve as nano-antennas, in the case of solid structures, or nano-antennas with voids or nano-voids, in the case of annular structures The various shaped metasurface structures, as described, may be used to form unit cells, which may be combined to form a metalens. It is understood that a unit cell may include one or more metasurface structures. For example, a combination of structures may be included to form a unit cell. The structures need not be of the same type. For example, a unit cell may include any combination of nano-antennas, nano-antennas with voids, and nano-voids. Furthermore, as discussed, the structures of different unit cells of the metalens need not be the same nor the same size.

Referring to FIG. 8b, different constitutions of unit cells 802 are shown. For example, unit cells may be constituted of multi-layers or a single layer. In one embodiment, multi-layered unit cells may be dual-layered unit cells. Multi-layered unit cells with more than two layers may also be useful.

Dual-layered unit cells, for example, includes depositing a dual-layered stack on a cap surface (top, bottom, or both) and patterned it to form unit cells. In one embodiment, unit cells 812 may include a metal layer 850 on a dielectric layer 840, forming a metal-on-dielectric dual-layered stack. In another embodiment, unit cells 822 may include a dielectric layer 840 on a metal layer 850, forming a dielectric-on-metal dual-layered stack. Other combinations of dual-layered stacks may also be useful. For example, a dielectric-on-dielectric dual-layered stack may also be employed to form unit cells. Unit cells 832 may also be patterned from a single layer 870 on the cap surface. The layer, for example, may be a dielectric layer. Alternatively, the layer may be a metal layer. Various types of dielectrics and metals may be employed for the layer or layers of the unit cells. For example, a dielectric may include a silicon (Si), amorphous silicon ($\alpha$Si), a titanium oxide ($TiO_2$), a silicon oxide ($SiO_2$), or a silicon nitride (SiN) layer while a metal metasurface structure layer may include lead tellurium (PbTe), an aluminum (Al), a molybdenum (Mo) or a titanium (Ti) layer. Other types of dielectrics and metals may also be used.

As shown, various types of unit cells may be patterned from a single layer as well as from a multi-layered stack, such as a dual-layered stack. For example, unit cells with nano-antennas may be formed. As shown, a unit cell may include multiple nano-antennas such as rectangular-shaped structures or one nano-antenna. Unit cells with nano-voids may also be formed. For example, a unit cell may include one or more nano-voids. The nano-antennas and nano-voids are shown as rectangular structures. As already described, other shaped structures may also be useful.

In the case of a dual-layered stack, the lower layer may serve as a base for the structures on top. For example, an etch patterns the top layer while leaving the bottom layer unetched. The bottom layer may serve as an etch stop layer. In some cases, the bottom layer is etched by another etch, forming a stepped structure. For example, the cap surface may serve as an etch stop. In the case of a single layer, a time etch may be performed to partially etch the layer to form the structures. Using the substrate as an etch stop may also be useful. For example, an etch partially etches the layer and another etch fully etches the layer, using the cap as an etch stop. The etch to pattern the layer or layers to form the structures may be masked, such as RIE with a resist mask, or maskless such as laser etching.

In yet another embodiment, the structures are formed on the cap surface. For example, the surface of the cap may be etched. A single etch process may be used to form a uniform structure or a multi-etch process may be used to form a stepped structure.

Figure 9A:
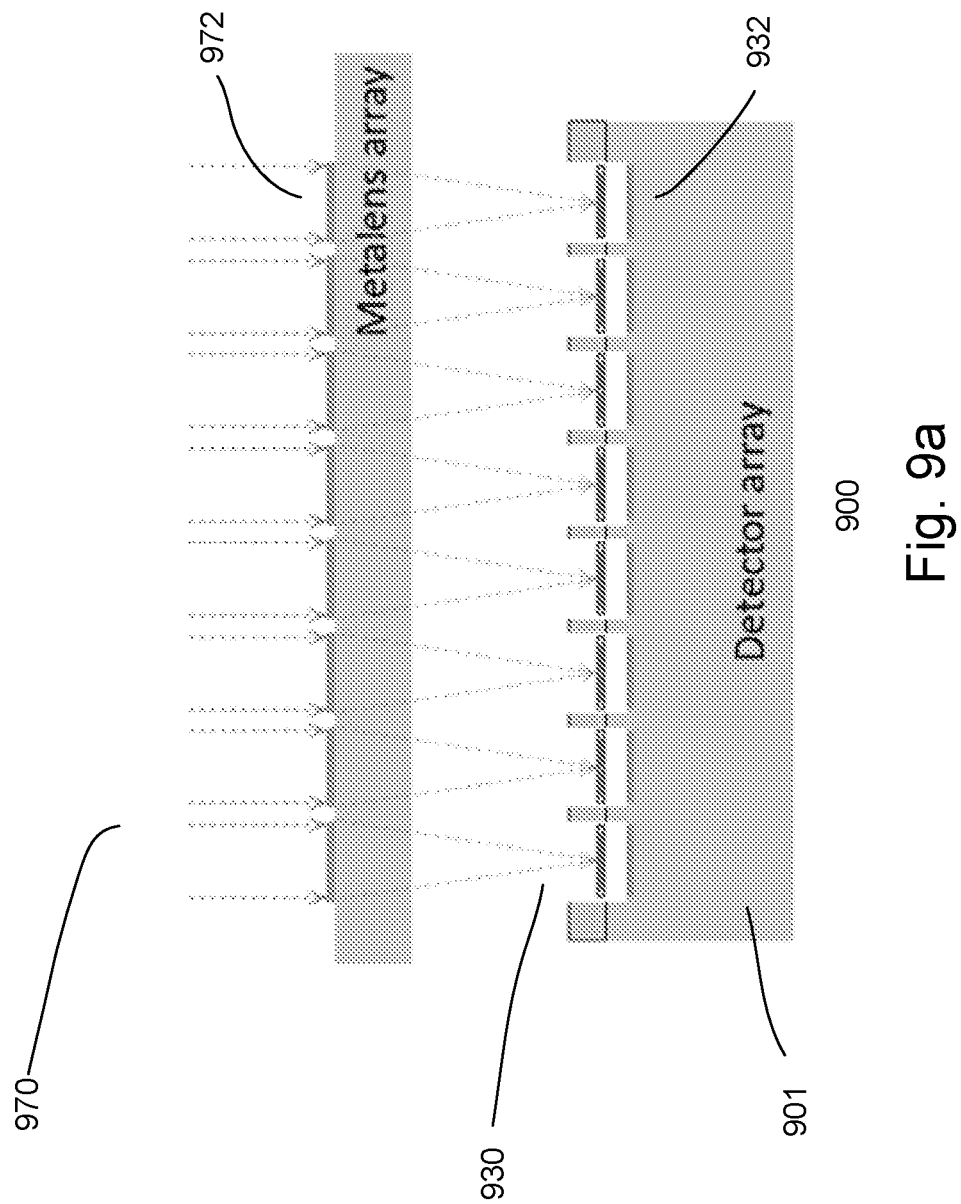
FIGS. 9a-b show configurations of a lens array for focusing IR onto a detector array.
Figure 9B:
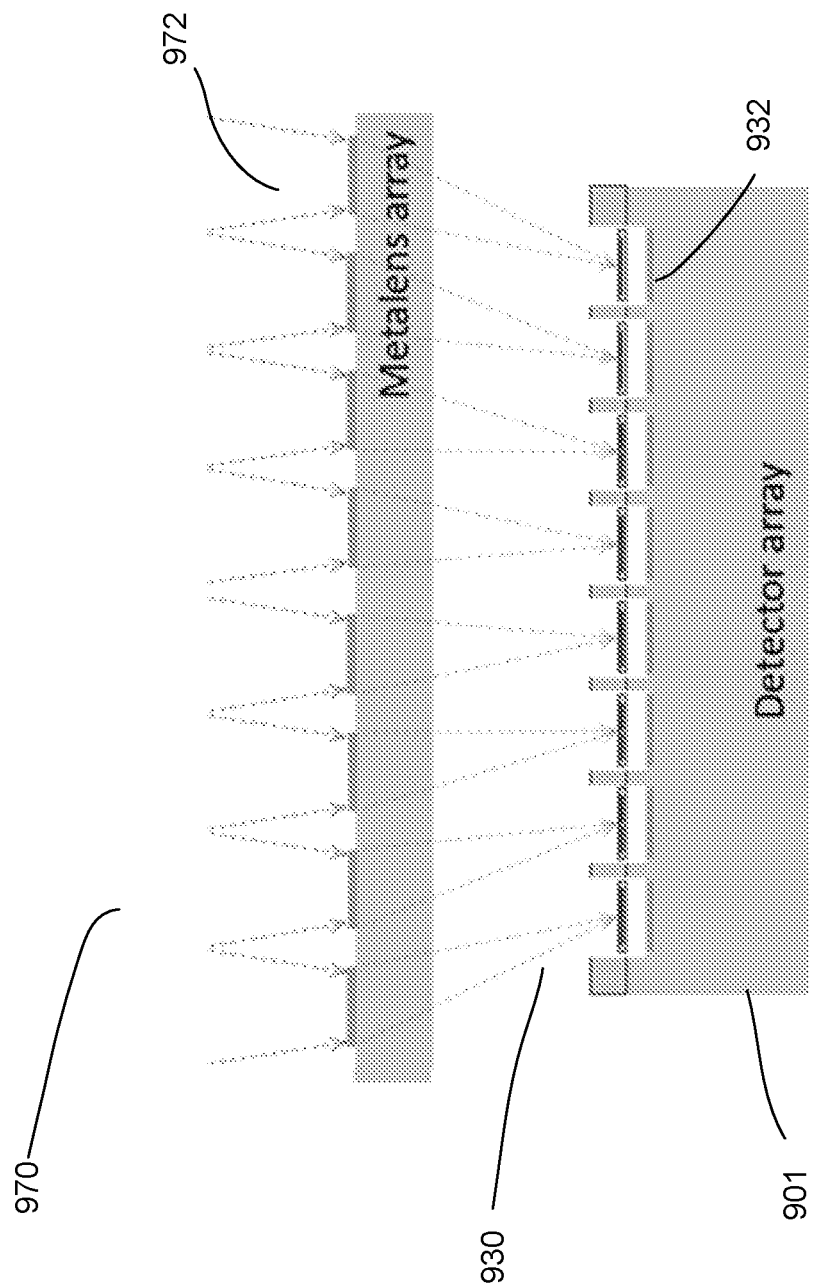

FIGS. 9a-b show various focusing configurations 900 of a metalens module. Referring to FIG. 9a, a metalens module 970 with a metalens array is shown, The metalens array is, for example, on a cap surface of a cap (top or bottom cap surface). The cap, as described, is used to encapsulate a device. The device, in one embodiment, includes a substrate 901 with CMOS components and a MEMS region with MEMS components. The MEMS component, for example, includes MEMS detector array 930, such as an IR detector array. The metalens module is configured to focus IR radiation onto the IR detector array.

The metalens array may include a lens array with lenses 972. The lenses may be arranged in a matrix with rows and columns of lenses. Likewise, the detector array includes detectors 932 arranged in a matrix format. Other configurations of lenses and detectors may also be useful. In one embodiment, the metalens module is configured to have the same dimensions as the detector array as well as the same number of lens and detector units. For example, the detector array has the same number of detectors as the number of lenses in the lens array. Furthermore, lenses and detectors have a 1:1 correlation to each other, both in number and position. For example, each lens is configured to focus IR radiation to its respective detector. Due to the 1:1 correlation in number and position, the lenses of the array may be configured with identical designs.

FIG. 9b shows another focusing configuration 900 of a metalens module. The configuration is similar to that described in FIG. 9a. Common elements may not be described or described in detail. As shown, the configuration includes a lens array 970 which has a larger dimension than that of the detector array 930. Providing a lens array with a larger dimension than the detector array allows a wider or larger FOV for the detectors. The lenses of the lens array may be individually configured to focus IR radiation to its corresponding IR detector. For example, due to the positioning of the lenses in the array vis-à-vis the IR detectors, each lens may be modified independently to focus IR radiation to its respective detector.

Figure 10:
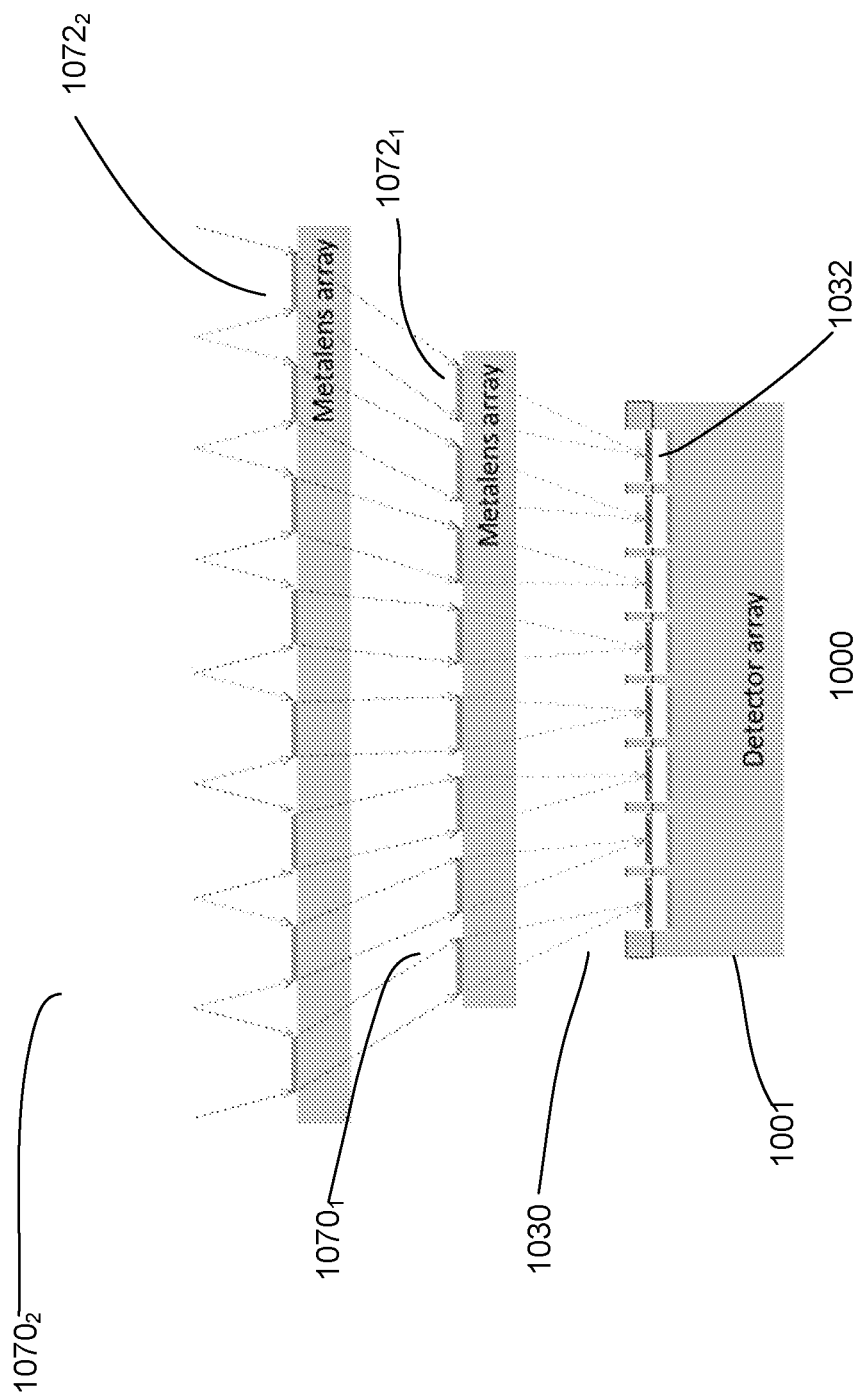
FIG. 10 shows a cascaded cap with multiple lens array for focusing IR onto a detector array.

FIG. 10 shows an embodiment of a focusing configuration 1000 with multiple lens modules. As shown, the configuration includes first and second metalens modules $1070_{1-2}$ with first and second metalens arrays.

As illustrated, the metalens arrays are provided on a top cap surface of first and second caps. Other configurations of the metalens arrays may also be useful. For example, the metalens array may be provided on either the top, bottom, or a combination of top and bottom surfaces of respective caps as well as being disposed on top and bottom surfaces of a single cap. The cap is used to encapsulate a device. In the case of multiple caps, the bottom cap encapsulates the device. The device, in one embodiment, includes a substrate 1001 with CMOS components and a MEMS region with MEMS components. The MEMS component, for example, includes MEMS detector array 1030, such as an IR detector array. The metalens modules are configured to focus IR radiation onto the IR detector array.

A metalens array includes a lens array with lenses. For example, the first metalens module includes lenses $1072_1$ and the second metalens module includes lenses $1072_2$. The lenses of an array may be arranged in a matrix with rows and columns of lenses. Likewise, the detector array includes detectors 1032 arranged in a matrix format. Other configurations of lenses and detectors may also be useful. In one embodiment, lenses of a metalens array have a 1:1 correlation with the IR detectors of the detector array.

The first and second metalens arrays are configured to have progressively larger dimensions from bottom to top. For example, as shown, the first metalens array has a larger dimension than the IR detector array and the second metalens array has a larger dimension than the first metalens array. The lenses of the second metalens array may be individually modified to focus IR radiation onto the lenses of the first metalens array and the first metalens array may be individually modified to focus IR radiation onto the IR detectors. Other configurations of the metalens arrays may also be useful. For example, the first metalens array may be configured to have the same dimension as the detector array and the second metalens array may be configured to have a larger dimension than the first metalens array. In such cases, the lenses of the second metalens array may be individually modified to focus IR radiation onto the lenses of the first metalens array and the first metalens array may be identical to focus IR radiation onto the IR detectors. In other embodiments, more than two metalens modules may be cascaded to further increase the FOV.

Figure 11A:
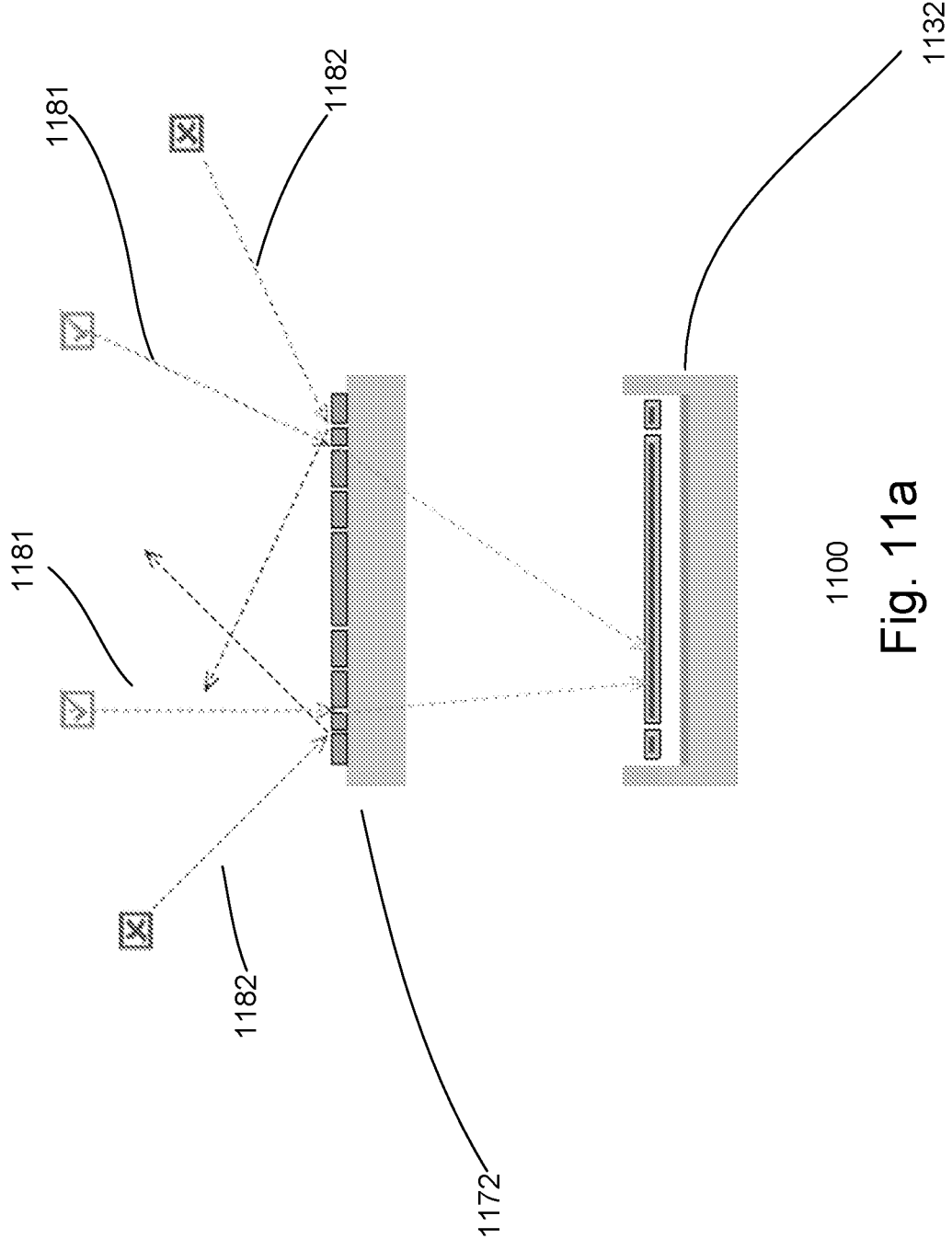
Figure 11C:
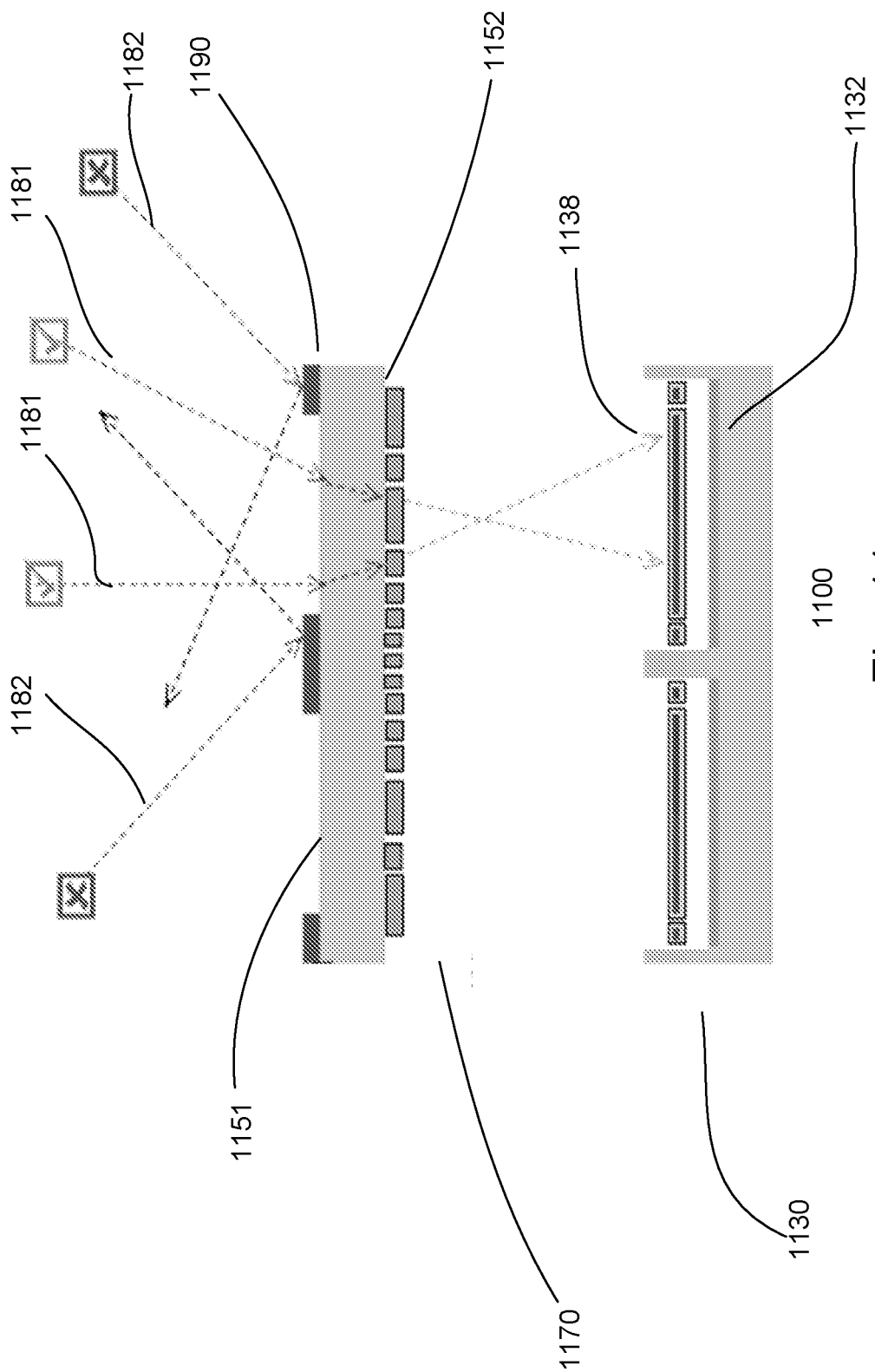

FIGS. 11a-c show various embodiments of optical aberration correction.

Referring to FIG. 11a, optical aberration correction by a metalens 1172 of a metalens array is shown. For example, each metalens of the metalens array can be independently corrected on the plane surface to minimize or eliminate optical errors, such as spherical aberrations, off-axis comatic aberrations, astigmatism, and chromatic aberrations. In one embodiment, aberration correction can be achieved through modification of structure geometry, spacing, and arrangement of the unit cells of the metalens. For example, the spacing and arrangement of the unit cells at different annuluses of the metalens can be designed to correct for aberrations.

In one embodiment, the metasurface structures of the metalens are configured to limit the angles of IR radiation which passes through to the detector. For example, IR radiation 1181 having steeper angles passes through to the IR detector 1132 while IR radiation having shallower angles 1182 is blocked. For example, only certain angles of radiation are allowed to pass through the metalens while the rest will get reflected away. By limiting the field of a metalens, image sharpness can be improved.

FIGS. 11b-c show different embodiments of optical aberration correction in a global lens 1170 for focusing IR radiation onto a detector array 1130 with detectors 1132. As shown in FIG. 11b, the global metal lens 1170 is disposed on a top surface 1151 of a cap. To correct for the optical aberrations, an aperture 1190 is formed on a bottom cap surface 1152. In one embodiment, the aperture is non-transparent to IR radiation. The aperture, for example, is formed of a patterned metal layer. For example, a metal layer is deposited on the cap surface and patterned to form the metallic aperture. Patterning may be achieved by, for example, an RIE using a resist mask. Other techniques for patterning the metal layer may also be useful. The aperture is configured to block IR radiation having shallower angles 1182 while passing IR radiation with steeper angles 1181. For example, only certain angles of radiation are allowed to pass through the metalens while the rest will get reflected away. By limiting the field of the global metalens, image sharpness can be improved.

In an alternative embodiment, as shown in FIG. 11c, the global metalens 1170 may be formed on the bottom cap surface 1152 while the aperture 1190 is formed on the top cap surface 1151. The aperture is configured to block IR radiation having shallower angles 1182 while passing IR radiation with steeper angles 1181. By limiting the field of the global metalens, image sharpness can be improved. To simplify the drawing, the global metalens shows focusing IR radiation to only one detector. It is however understood that the global metalens focusses IR radiation to all the detectors of the array.

Figure 12:
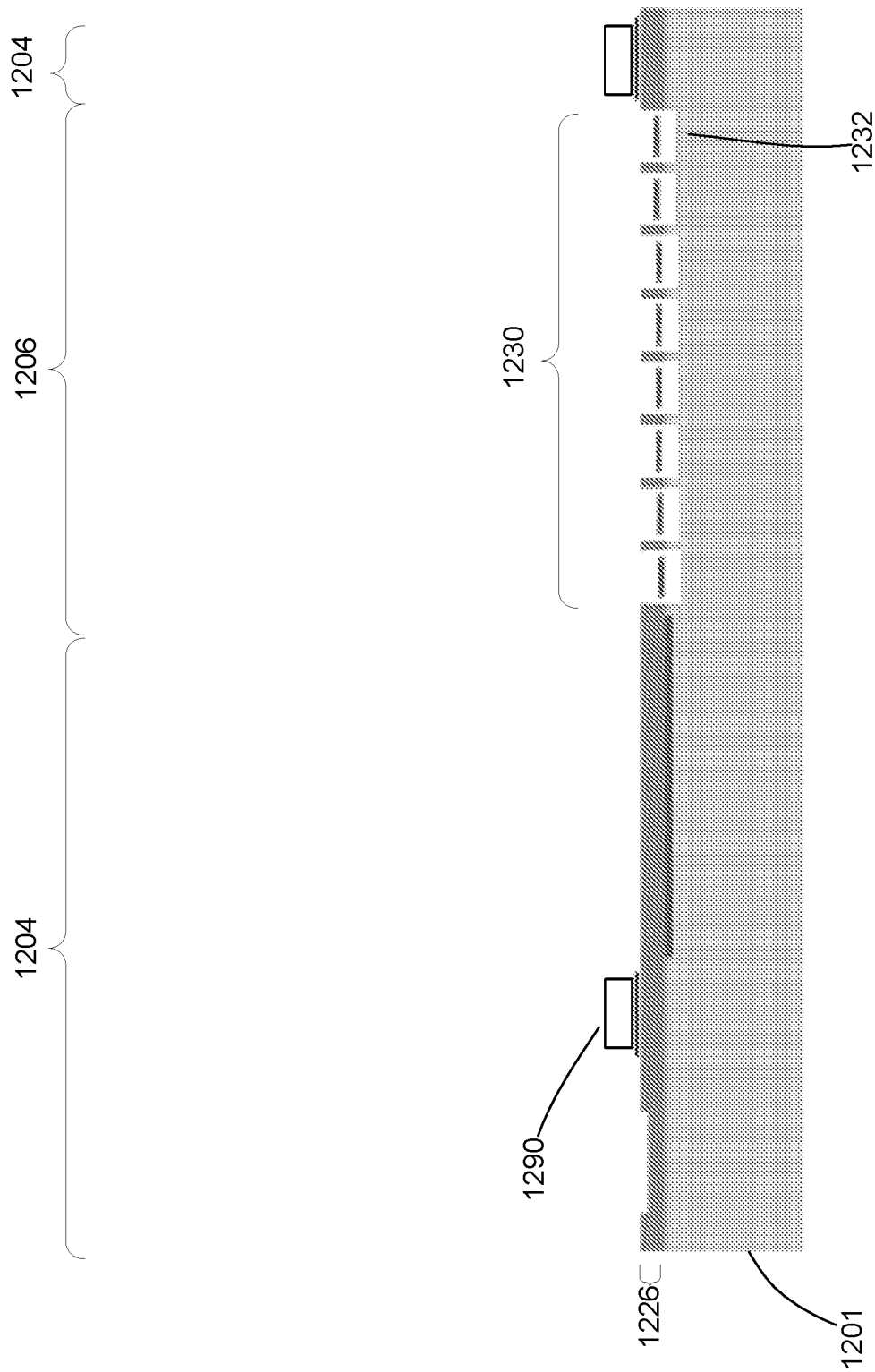
FIG. 12 shows an embodiment of a device substrate with CMOS components embedded with a MEMS detector array.

FIG. 12 shows a simplified cross-sectional view of an embodiment of a device 1215. The device, for example, is a CMOS device with an embedded MEMS module, similar to that described in FIGS. 2a-b, except without a cap. Common elements may not be described or described in detail. The device is a CMOS device embedded IR detectors. Although the device is shown as a single device, it understood that the device is formed on a wafer in parallel and subsequently singulated, for example, after encapsulation.

As shown, the device includes a substrate 1201 with a CMOS region 1204 and a MEMS region 1206. In one embodiment, the CMOS region encompasses the MEMS region. A bond region is defined in the CMOS region and surrounds the MEMS region. The CMOS region includes CMOS components. As for the MEMS region, it includes a MEMS component. In one embodiment, the MEMS component may be an IR sensor array 1230 with a plurality of IR sensors 1232. The CMOS components and MEMS sensors, for example, are formed by FEOL processing.

A lower interlayer dielectric (ILD) layer, such as silicon oxide, is formed on the substrate over the CMOS and MEMS regions, covering the CMOS and MEMS components. Metal contacts are formed in the lower ILD layer for connecting, for example, the line segments of the MEMS sensors. An upper ILD layer is formed over the lower ILD layer with the contacts. The upper and lower ILD layers may be collectively referred as the ILD layer. Conductive contact plugs, such as tungsten plugs are formed in the ILD layer and are coupled to contact regions on the substrate and CMOS components and MEMS sensors.

A back-end-of-line (BEOL) dielectric 1226 is formed on the substrate over the ILD layer. For example, the BEOL dielectric covers the CMOS and MEMS regions. The BEOL dielectric may include multiple intermetal dielectric (IMD) levels formed by BEOL dielectric layers. An IMD level may include a via dielectric level with via contacts and a metal dielectric level with metal lines.

As for the top metal level of the BEOL dielectric, it may serve as a pad level with pad metal lines. The pad lines may be formed by a damascene or an RIE process. A passivation layer is formed over the pad lines or feedthrough lines. Pad or bond openings are formed in the passivation layer to expose the pad lines. Other approaches for forming the pad level may also be useful. The bond openings are formed at the periphery of the bond region. The bond pads, for example, are part of the pad lines. The BEOL dielectric and BE dielectric may be collectively referred to as the BE dielectric.

A device sealing ring 1290 is formed on the BE dielectric in the bonding region of the device. The sealing ring facilitates bonding of the cap to the BE dielectric to encapsulate the device. In one embodiment, a device sealing ring includes a sealing ring stack with multiple layers. Forming a sealing ring of a single layer may also be useful. The sealing ring stack may include a metal stack, a dielectric stack, or a combination of metal/dielectric stack. For example, the device sealing stack may include gold-based metal, such as gold (Au) or gold-tin (AuSn), aluminum (Al), copper (Cu), silver (Ag), titanium (Ti), germanium (Ge), tin (Sn), titanium nitride (TiN), silicon dioxide, silicon nitride or a combination thereof. Providing other materials and structures for the sealing stacks may also be useful.

To form the device sealing stack, the various layers may be deposited on the BE dielectric and patterned to form the device sealing ring. Patterning the layers may include, for example, an RIE using a resist mask. Other techniques for forming the device sealing ring may also be useful. In some embodiments, the layers may be patterned to also form support columns. Forming the sealing ring and support columns may be achieved in the same patterning process.

In one embodiment, the BE dielectric is patterned on the substrate over the MEMS region, removing it to create an opening to expose the sensor array. The opening in the BE dielectric, for example, forms a BE cavity. In one embodiment, the patterned BE dielectric over the MEMS region includes portions remaining over the cavity walls, forming individual BE cavities over the substrate cavities. Patterning the BE dielectric, in one embodiment, is performed after forming the device sealing ring.

FIGS. 13a-f show simplified cross-sectional views of an embodiment of a process for forming a cap wafer 1300. The cap wafer, for example, is similar to the cap described in FIG. 2a. Common elements may not be described or described in detail.

Figure 13A:
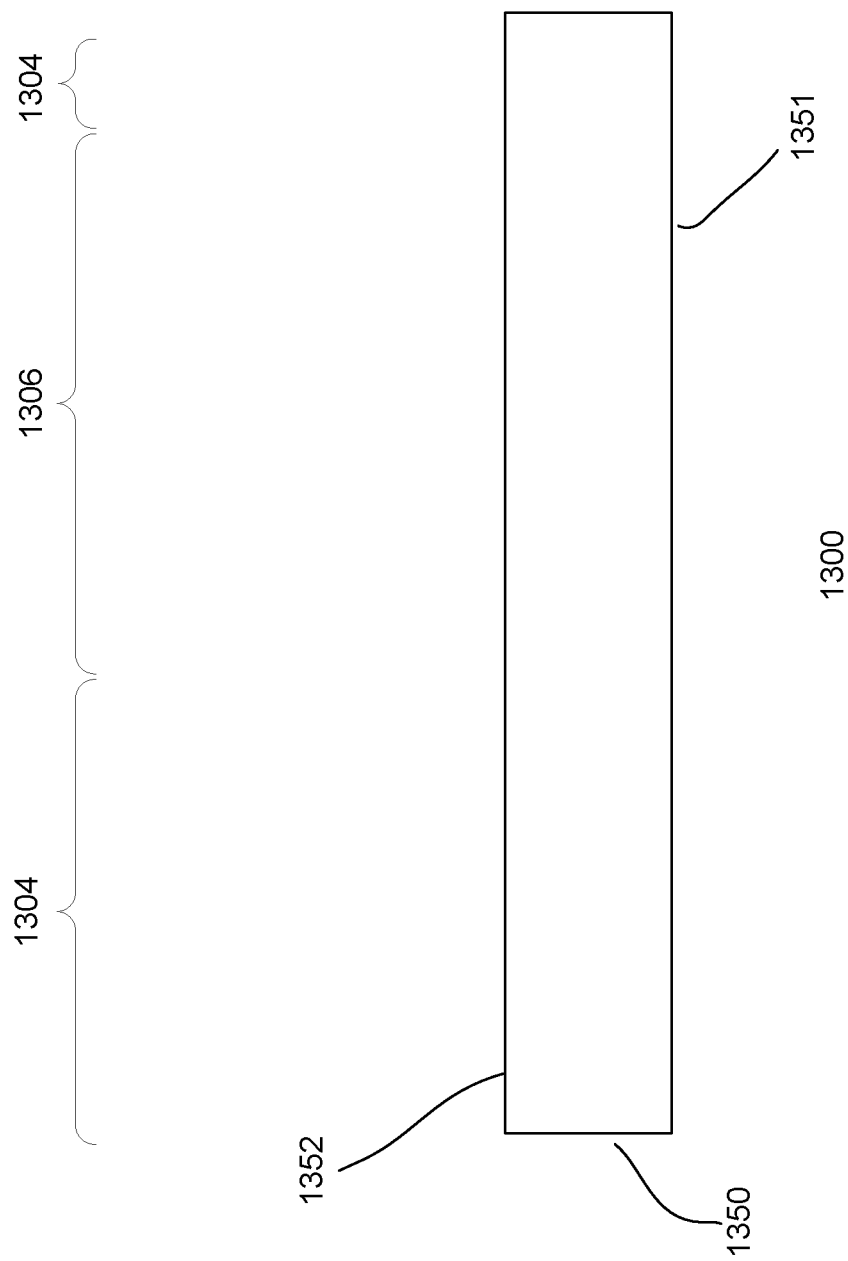
FIGS. 13a-f show a process for forming an embodiment of a cap with an integrated focusing system.

Referring to FIG. 13a, a cap substrate 1350 is provided. The substrate, for example, may be a part of a wafer on which caps corresponding to individual devices on another (device) wafer are formed. A cap wafer with processed caps is bonded to another wafer with the devices, encapsulating the devices at the wafer level in parallel and singulated into individual dies.

The cap, in one embodiment, is transparent to infrared radiation. For example, the cap is capable of transmitting infrared radiation to the sensor. The cap may be part of a cap wafer with a plurality of caps configured for WLVP with the device wafer with a plurality of devices. The cap includes a top cap surface 1351 and a bottom cap surface 1352. The cap is defined with a CMOS region 1304 and a MEMS region 1306. The CMOS and MEMS regions correspond to CMOS and MEMS regions on the device substrate. For example, the CMOS region, which includes the cap bonding region, surrounds the MEMS region.

The cap, for example, may be a silicon cap. The cap may be a lightly doped substrate with high resistance. Such substrates may include float zone (FZ), magnetic czochralski (M-Cz), or advanced magnetic czochralski (AM-Cz) substrates or wafers. Other types of wafers which are transparent to infrared radiation may also be used to form the cap. For example, the cap wafer may be a germanium wafer or a glass wafer. In one embodiment, the cap is a double-sided polished wafer. For example, the cap wafer is polished on both the front and back sides of the wafer. This provides a thinner wafer with a more smooth surface for improved transmission of infrared radiation.

Figure 13B:
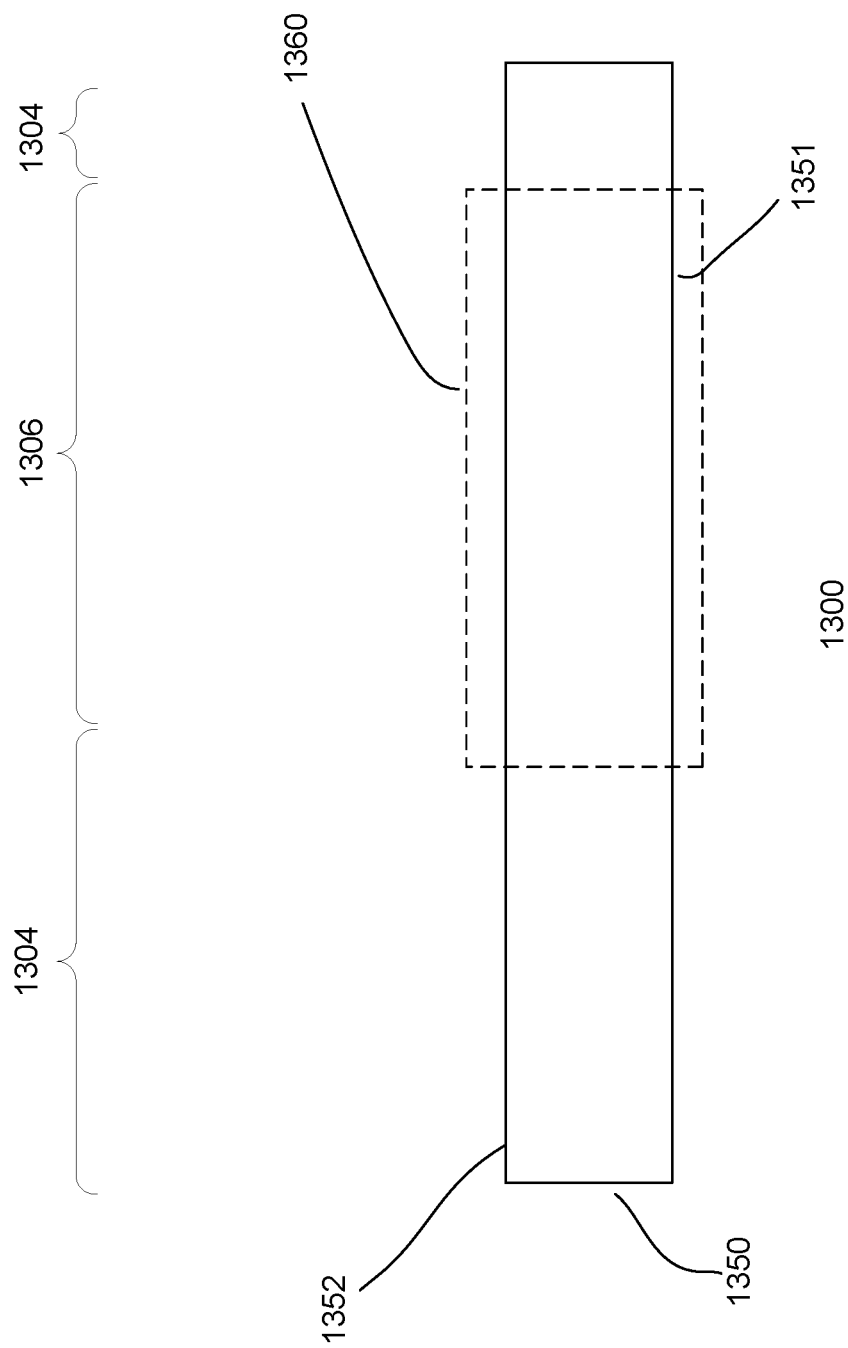

Referring to FIG. 13b, a focusing region 1360 on the cap may be processed to form a portion of the focusing system on the top cap surface 1351. For example, in the case that the focusing system includes a lens module on the top cap surface, the top cap surface is processed to form the lens module.

In one embodiment, the top cap surface may be processed to form a metalens module. The metalens module may include a metalens array or a global metalens, as described in FIGS. 4a-c, 5a-b, 6a-c, 7a-c, 8a-b, 9a-b, 10, and 11a-c. The metalens module may be formed on a multi-layered stack, such as a dual-layered stack, a single layer, or on the bare cap surface. The metasurface structures of the lens module may be formed by a patterning process, such as a masked or maskless etch process. A masked etch process may include an RIE using a resist mask to form the pattern as desired; a maskless etch process may include laser etching. Other patterning techniques to form the lens module may also be useful.

In the case of a lens module with a lens array, the lenses of the lens array may be configured with a matrix of lenses corresponding to the detectors of the detector array. The lens array may have the same dimension as the detector array. In such cases, the lenses may be identical. In another embodiment, the lens array may have a larger dimension than the detector array. In such cases, the lenses may be individually configured to focus IR radiation onto respective detectors. In either case, the lens may be configured with aberration correction to increase focusing sharpness. In the case where the lens module may include a global metalens, the aberration correction can be effected by an aperture on the bottom or opposite cap surface. The global lens may be configured to have the same dimension as the detector array or a larger dimension than the detector array.

In another embodiment, the top cap surface may be processed to form an anti-reflection module. For example, the focusing system is a single lens module focusing system. The single lens module focusing system may include an anti-reflection module on one cap surface and a lens module on the other cap surface. By providing a focusing system with a lens module on one surface and an anti-reflection module on the other, the focusing system enhances both focusing and transmission of IR radiation through the cap to the IR detectors. For example, the lens module provides a highly focusing cap surface while the anti-reflection module provides a highly transmissive cap surface.

The anti-reflection module may include an anti-reflection coating. The anti-reflection coating may be zinc sulfide (ZnS) or germanium (Ge). Providing other materials for the anti-reflection coating may also be useful. In another embodiment, the anti-reflection module may include multiple anti-reflection layers. The anti-reflection coating may be deposited on the surface or surfaces of the cap. The coating may be patterned to remain in the focusing region.

In yet another embodiment, the anti-reflection module includes anti-reflection surface structures on the cap surface. For example, the anti-reflection surface structures may be moth-eye structures. The anti-reflection surface structures can be tailored for both anti-reflection and filtering out light having specific or desired wavelengths. For example, in the case of IR sensors, light having wavelengths other than 4.62 um may be filtered out. To filter out light having an undesired wavelength, the surface pattern may include photonic crystals. Alternatively, the anti-reflection module may include surface structures for filtering purposes. The surface structures can be fabricated by, for example, reactive ion etching on the cap surface using a resist mask. Other techniques for forming the surface structures may also be useful. For example, maskless etch techniques, such as laser etching, may also be useful.

Although as described, the top cap surface is processed. In some embodiment, no processing is performed on the top cap surface. For example, neither an anti-reflection module or lens module may be formed on the top cap surface.

Figure 13C:
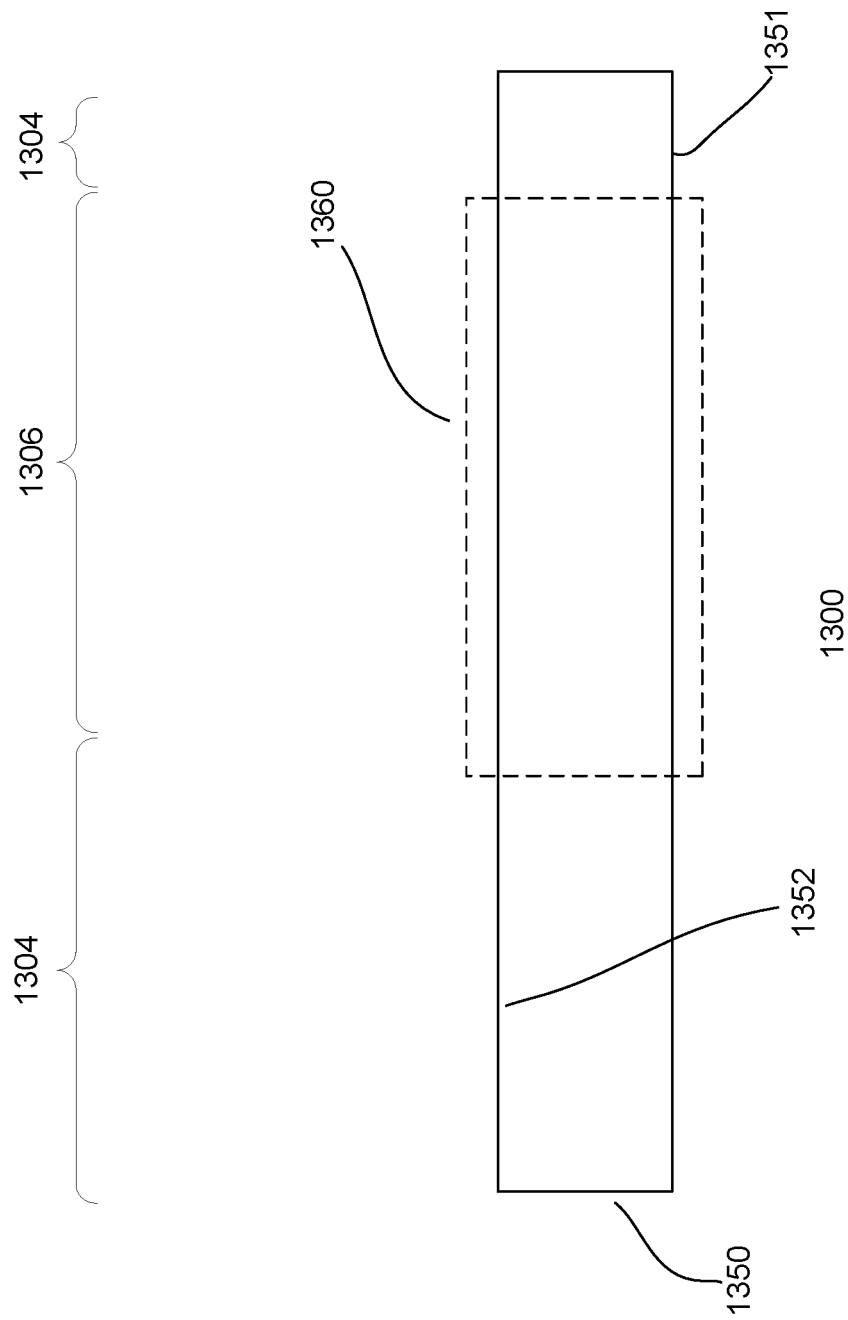

In FIG. 13c, the bottom cap surface 1352 is processed. The focusing region 1360 on the bottom cap surface is processed. In the case of a dual-lens focusing system, the bottom cap surface is processed to form a lens module, similar to the top cap surface. The lens module, for example, may be a metalens array. The metalens array may be configured with aberration correction. In another embodiment, the lens module may be processed to include a global metalens. It is understood that the lens modules may be any combination of lens modules. For example, the lens module may be the same type or of different types or formed from the same constitution or different constitutions. As an example, the top lens module may be a global metalens formed on the bare top cap surface while the bottom lens module may be a metalens array formed from a dual metasurface layered stack.

In one embodiment, the lens module on the top cap surface is configured to have a larger dimension than the lens module on the bottom cap surface. The lens module on the bottom cap surface may be configured to have the same dimension as the detector array or a larger dimension than the detector array.

In another embodiment, the focusing system is configured with a single lens module focusing system. For example, in the case that the focusing system includes a lens module on the top cap surface, the bottom cap surface may be processed to form an anti-reflection module. In some cases, such as when the lens module on the top cap surface is a global metalens, the bottom cap surface may be processed with an aberration correction aperture. The lens module may have the same dimension as the detector array or a larger dimension than the detector array. In other cases, the focusing region of the bottom cap surface is not processed.

In some embodiments, the single lens module focusing system may include a lens module on the bottom cap surface. In such cases, the top cap surface may be processed to form an anti-reflection module. In some cases, such as when the lens module on the bottom cap surface is a global metalens, the top cap surface may be processed with an aberration correction aperture. The lens module may have the same dimension as the detector array or a larger dimension than the detector array. In other cases, the focusing region of the top cap surface is not processed.

Figure 13D:
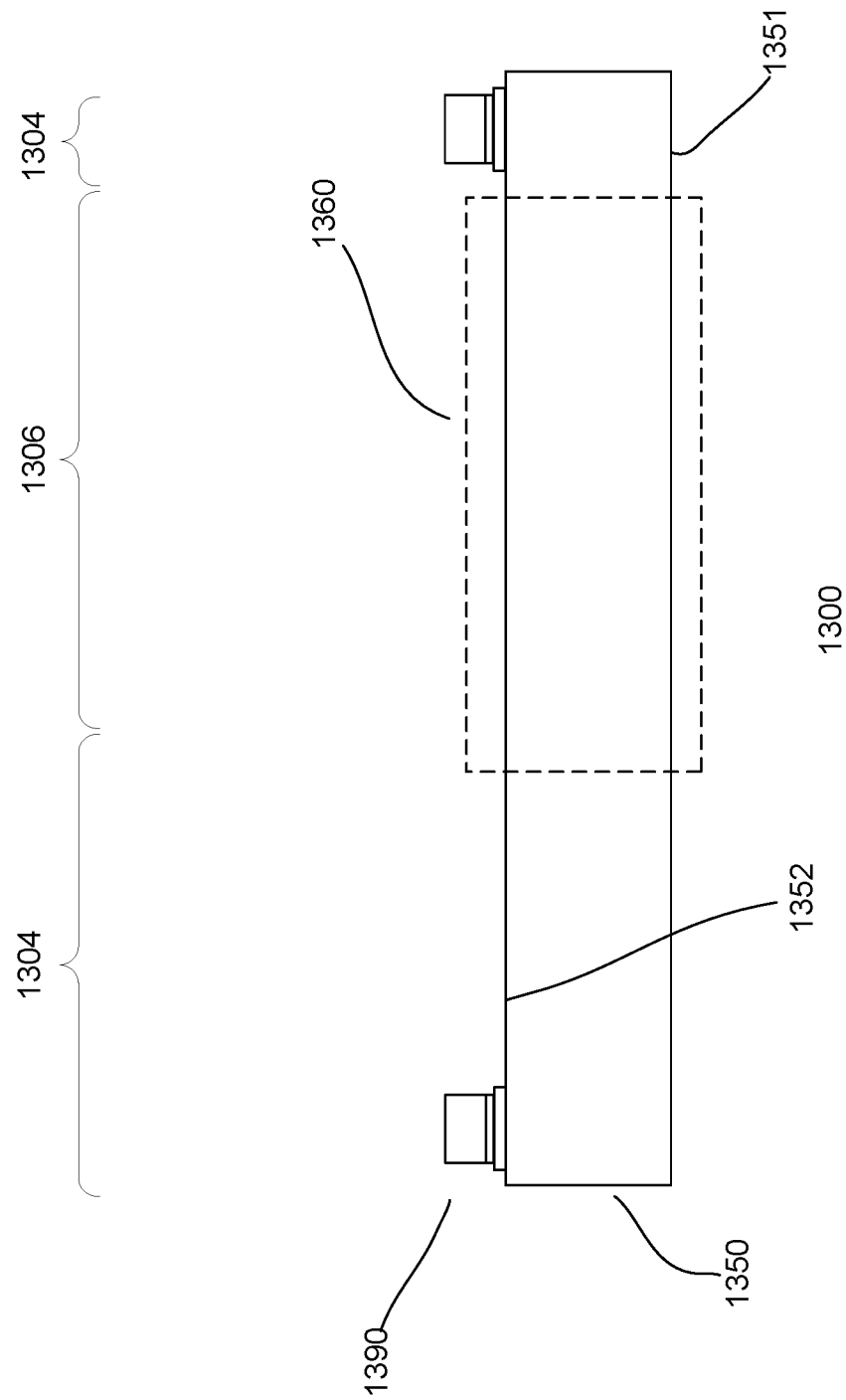

In FIG. 13d, a cap sealing ring 1390 is formed on the bonding region on the bottom cap surface. The cap sealing ring, for example, includes a cap sealing stack with multiple layers. Forming a sealing ring of a single layer may also be useful. The cap sealing ring stack may include a metal stack, a dielectric stack, or a combination of metal/dielectric stack. For example, the cap sealing stack may include gold-based metal, such as gold (Au) or gold-tin (AuSn), aluminum (Al), copper (Cu), silver (Ag), titanium (Ti), germanium (Ge), tin (Sn), titanium nitride (TiN), silicon dioxide, silicon nitride or a combination thereof. Providing other materials and structures for the sealing stacks may also be useful.

To form the cap sealing stack, the various layers may be deposited on the bottom cap surface and patterned to form the cap sealing ring. Patterning the layers may include, for example, an RIE using a resist mask. Other techniques for forming the cap sealing ring may also be useful. In some embodiments, the layers may be patterned to also form support columns. Forming the sealing ring and support columns may be achieved in the same patterning process.

Figure 13E:
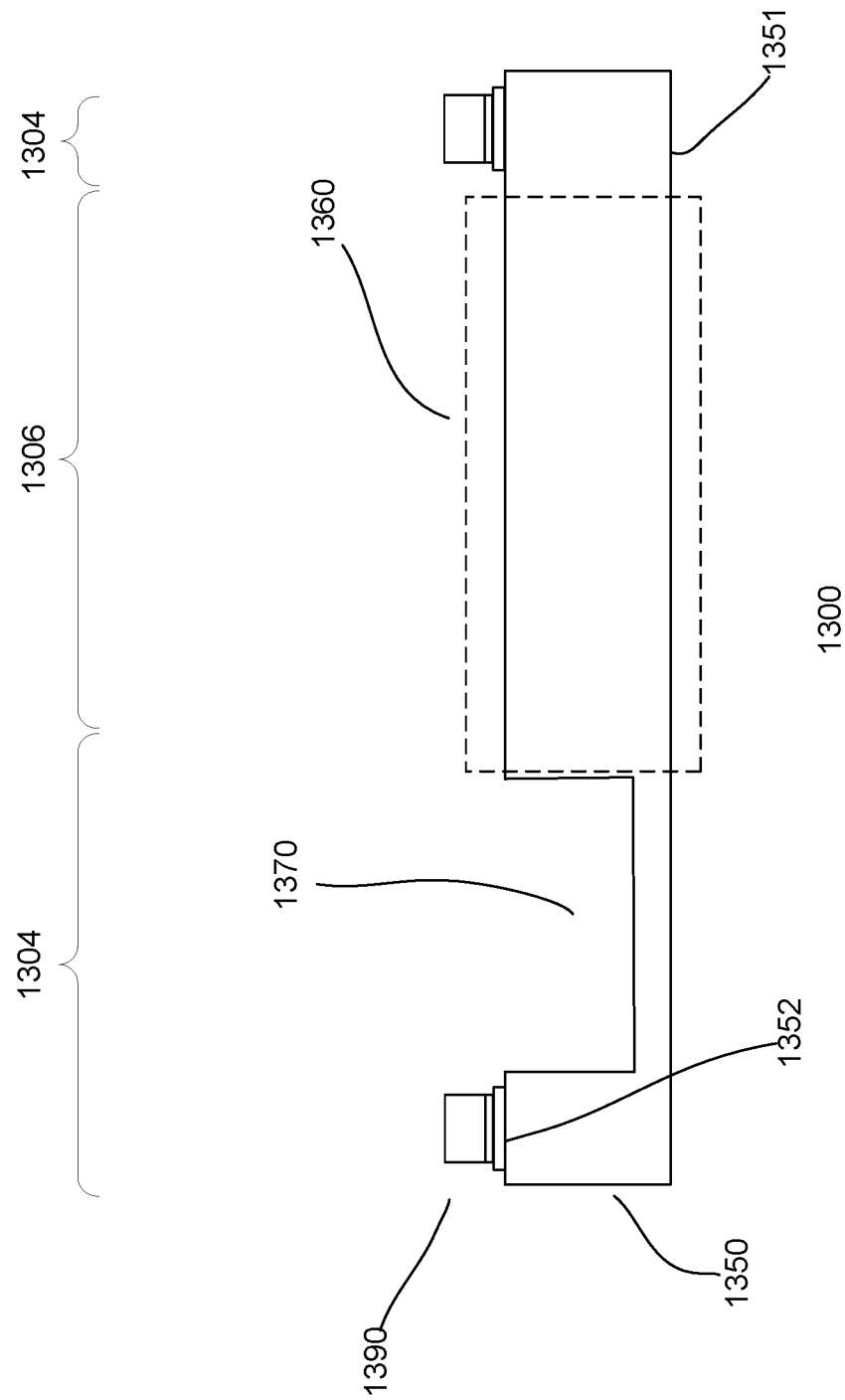

Referring to FIG. 13e, the bottom cap surface is then processed to form a cap recess 1370. The cap recess, for example, is a deep recess in the non-focusing region of the cap. Depending on a thickness of the cap wafer, the cap recess may have a depth ranging from 10, 20, 30, 100 to 500 um. Having a cap recess which is deeper than 500 um may also be useful. In one embodiment, the cap recess improves an overall vacuum level within the cap cavity. For example, the cap recess increases the overall volume of the cap cavity between the cap and the sensors in the MEMS region. The larger volume improves the overall vacuum level after bonding of the cap wafer to the device substrate. As such, better imaging qualities can be captured from the device.

A mask and etch process may be employed. For example, the substrate is etched at the inner surface of the wafer using a patterned mask with an opening corresponding to the cap recess. The mask may be a hard mask, such as a silicon oxide mask or a soft mask, such as a photoresist mask. The etch, for example, is a dry etch. Alternatively, etching may be achieved using a first wet etch utilizing etchants such as KOH.

Figure 13F:
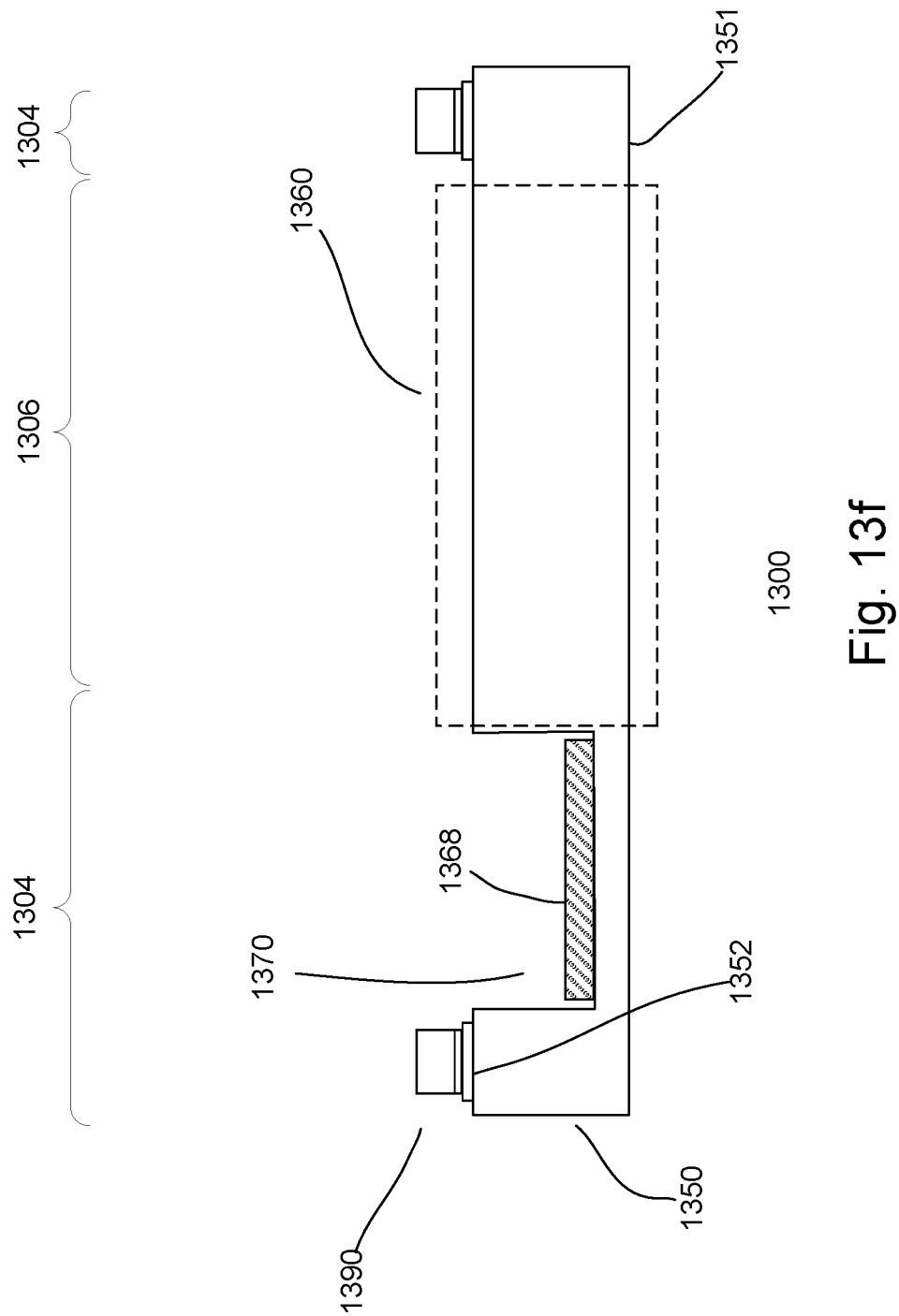

In FIG. 13f, a getter 1368 is deposited on the substrate and patterned to line the inner surface of the cap recess. The getter, for example, may be zirconium (Zr) alloys, titanium (Ti), nickel (Ni), aluminum (Al), barium (Ba) or magnesium (Mg). The getter absorbs moisture and outgassing within the encapsulated device and thereby facilitates the maintenance of the integrity of the vacuum in the overall cap cavity, improving reliability. Other various patterns for the getter, are also useful. Lift-off process can be employed to form the getter.

Although as shown, the bottom cap surface includes a cap recess in the non-focusing region, other configurations of the cap may also be useful. For example, the process can be easily modified to form a cap recess in the focusing region instead of the non-focusing region. This can be achieved by forming the cap recess before processing the focusing region. In other cases, the cap may include no recess. For example, the process for forming the cap recess can be skipped. In yet other cases, the cap may include two recesses, a shallow and a deep recess, which can either be in the non-focusing and focusing region. For example, the process can first form a shallow recess within the cap bonding region. After forming the shallow recess, the focusing system may be formed followed by forming the deep cap recess in the non-focusing region. Alternatively, the deep cap recess may be formed in the focusing region prior to processing the focusing system. In yet other cases, a single recess is formed on the bottom surface within the cap bonding region. Other configurations of the bottom cap surface may also be useful.

Figure 14B:
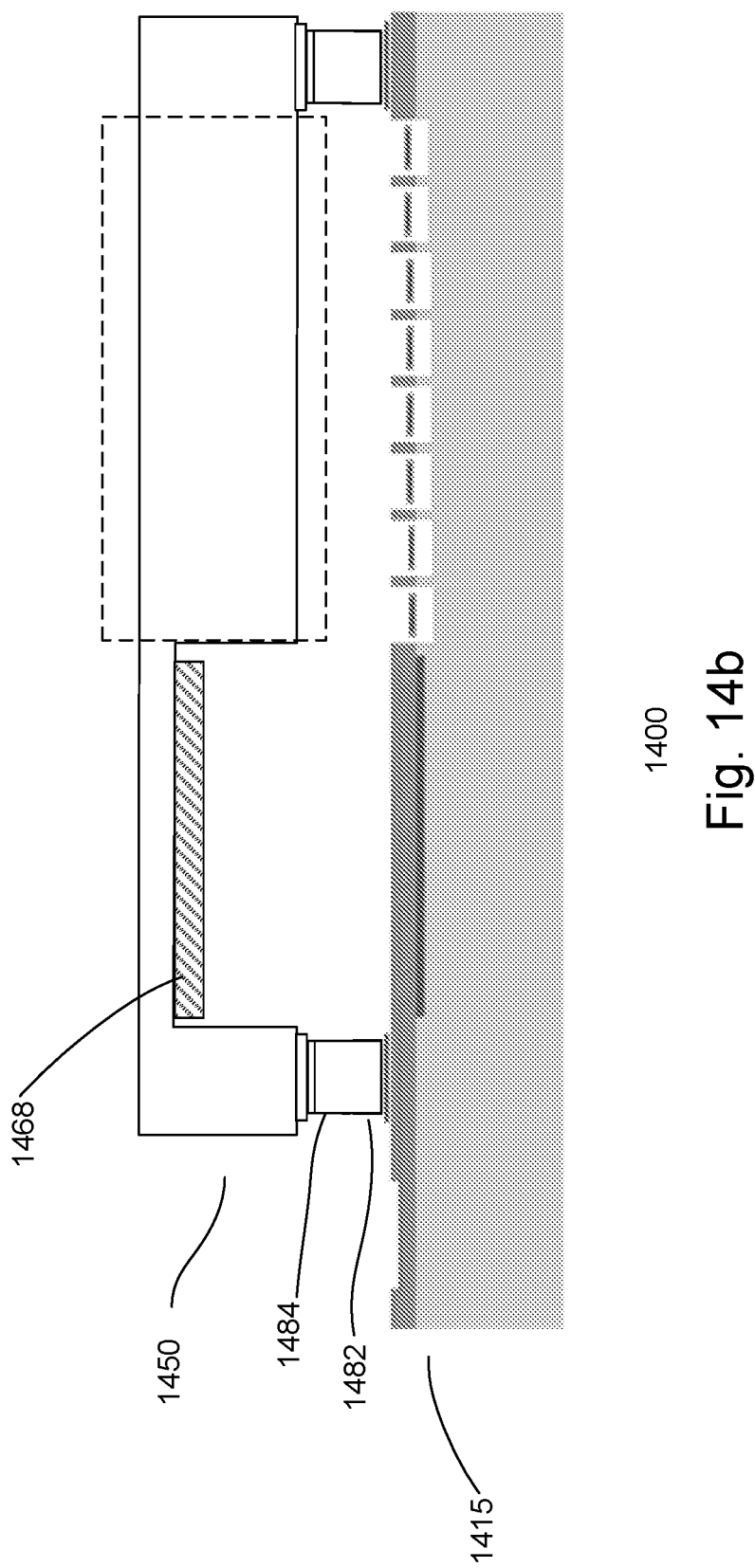

FIGS. 14a-b show simplified cross-sectional views of an embodiment of a process 1400 for bonding a cap wafer 1450 to a device wafer 1415. The device wafer includes devices, such as those described in FIG. 12 and the cap wafer include caps formed by a process as described in FIGS. 13a-f. Common elements may not be described or described in detail.

Referring to FIG. 14a, the cap wafer 1450 is configured for WLVP of the device wafer 1415. For example, the cap sealing rings 1484 of caps on the cap wafer are aligned to respective device sealing rings 1482 of devices on the device wafer. In one embodiment, a bottom surface of the caps faces a top surface of the devices. The wafers are aligned such that the cap sealing rings are aligned with respective device sealing rings.

In FIG. 14b, the wafers are bonded together by moving the wafers towards each other. Bonding between the sealing rings completes the hermetic sealing of the cap to the device wafer. For example, the cap sealing rings on the cap wafer 1450 are bonded to the device sealing rings on the device wafer 1415. In one embodiment, thermal compression bonding may be used to bond the cap wafer to the device wafer. Other techniques for bonding the cap wafer to the device wafer, such as eutectic bonding, may also be useful. In one embodiment, high temperature bonding may be utilized. For example, bonding process can be carried out at a temperature as high as 450° C. This creates a stronger and more reliable bonding interface between the cap and the device.

The getter 1468 disposed on the inner surface of the cap absorbs moisture and outgassing within the encapsulated device and thereby facilitates the maintenance of the integrity of the vacuum in the cavity, improving reliability. As such, better imaging qualities can be captured from the device.

After wafer bonding, the cap wafer is partially diced. For example, a partial dicing of the cap wafer is performed to expose a periphery region of the CMOS region with the bond pads. The pads provide external access to the internal components of the device. For example, input, output and power signals may be provided via the pads. The uncovered pads serve to provide for testing and wire bonding purposes. After partial dicing, another dicing process is performed on the wafer stack to singulate the individual encapsulated devices.

The present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

What is claimed is:

1. A device comprising:
a device substrate, wherein the device substrate is configured with a CMOS region with CMOS components and a MEMS region with a MEMS component, the CMOS region surrounds the MEMS region;
a backend (BE) dielectric disposed over the CMOS and MEMS region, the BE dielectric includes interconnects for interconnecting the CMOS components and MEMS components;
a device bonding region defined on the BE dielectric, the device bonding region surrounds the MEMS region and at least a portion of the CMOS region;
a cap having a top cap surface and a bottom cap surface, the bottom cap surface includes a cap bonding region corresponding to the device bonding region, the cap includes a focusing module which comprises a lens module on one of the top or bottom cap surfaces, wherein the lens module is configured to focus radiation to the MEMS component in the MEMS region and includes an annulus lens, the annulus lens comprises
a primary ring structure separated by primary annulus spaces to form concentric primary ring structures, and
secondary ring structures within the primary ring structures; and
a sealing ring, the sealing ring bonds the cap in the cap bonding region to the substrate in the device bonding region and forms a vacuum in a cap cavity within the sealing ring and between the cap and the substrate.

2. The device of claim 1 wherein:
a top lens module is disposed on the top cap surface;
a bottom lens module is disposed on the bottom cap surface; and
at least one of the top and bottom lens modules comprise the annulus lens.

3. The device of claim 2 wherein the top lens module has a larger surface area than the bottom lens module.

4. The device of claim 3 wherein the bottom lens module has a larger surface area than the MEMS region with the MEMS component.

5. The device of claim 3 wherein the bottom lens module has a surface area which is the same as the surface area of the MEMS region with the MEMS component.

6. The device of claim 1 wherein:
one of the top or bottom cap surfaces comprises the lens module; and
other of the top or bottom cap surfaces without the lens module comprises an anti-reflection module to improve transmission of light through the cap.

7. The device of claim 1 wherein the lens module comprises a lens array with metalens configured to focus radiation onto the MEMS component in the MEMS region.

8. The device of claim 1 wherein the lens module comprises a global metalens configured to focus radiation onto the MEMS component in the MEMS region.

9. The device of claim 1 wherein the primary ring structures comprise rectangular-shaped, circular-shaped, hexagonal-shaped ring structures or a combination thereof.

10. The device of claim 9 wherein the secondary ring structures comprise secondary nano-voids.

11. The device of claim 9 wherein the secondary ring structures comprise secondary nano-antennas.

12. The device of claim 1 wherein the secondary ring structures comprise secondary annuluses separating the secondary ring structures.

13. A method for forming a device comprising:
providing a device substrate, wherein the device substrate is configured to include
a CMOS region with CMOS components and a MEMS region with a MEMS component, the CMOS region surrounds the MEMS region,
a backend (BE) dielectric disposed over the CMOS and MEMS regions, the BE dielectric includes interconnects for interconnecting the CMOS components and the MEMS component, a device bonding region defined on the BE dielectric, the device bonding region surrounds the MEMS region and at least a portion of the CMOS region, and a device sealing ring on the device bonding region;

providing a cap comprising a top cap surface and a bottom cap surface, the bottom cap surface includes a cap bonding region corresponding to the device bonding region, a cap sealing ring on the cap bonding region, and a focusing module which comprises a lens module on one of the top or bottom cap surfaces, the lens module is configured to focus radiation to the MEMS component in the MEMS region and includes an annulus lens, the annulus lens comprises a primary ring structure separated by primary annulus spaces to form concentric primary ring structures, and secondary ring structures within the primary ring structures; and bonding the cap sealing ring to the device sealing ring to form a vacuum in a cap cavity within the sealing rings and between the cap and the substrate.

14. The method of claim 13 wherein the focusing module comprises:

a top lens module disposed on the top cap surface;

a bottom lens module disposed on the bottom cap surface; and both the top and bottom lens modules comprise the annulus lens.

15. The method of claim 13 wherein the primary ring structures comprise rectangular-shaped, circular-shaped, hexagonal-shaped ring structures or a combination thereof.

16. The method of claim 13 wherein the secondary ring structures comprise secondary annulusg spaees separating the secondary ring structures.

17. The method of claim 13 wherein the secondary ring structures comprise secondary nano-voids.

18. The method of claim 13 wherein the secondary ring structures comprise secondary nano-antennas.

19. The method of claim 13 wherein:

the secondary ring structures comprise secondary annuluses separating the secondary ring structures; and the secondary ring structures comprise secondary nano-voids, nano-antennas or a combination thereof.

\* \* \* \* \*